US009102258B2

(12) United States Patent
Nisbet et al.

(10) Patent No.: US 9,102,258 B2
(45) Date of Patent: Aug. 11, 2015

(54) FLOATING PARTITION, LOFT AND TROUGHS FOR A LIVESTOCK SHIPPING CONTAINER

(71) Applicant: ST REPRODUCTIVE TECHNOLOGIES, LLC, Navasota, TX (US)

(72) Inventors: Dale Nisbet, College Station, TX (US); Juan Moreno, College Station, TX (US); Maurice Rosenstein, Navasota, TX (US)

(73) Assignee: ST Reproductive Technologies, LLC, Navasota, TX (US)

( * ) Notice: Subject to any disclaimer, the term of this patent is extended or adjusted under 35 U.S.C. 154(b) by 281 days.

(21) Appl. No.: 13/866,627

(22) Filed: Apr. 19, 2013

(65) Prior Publication Data
US 2013/0276716 A1 Oct. 24, 2013

Related U.S. Application Data

(63) Continuation-in-part of application No. 13/087,583, filed on Apr. 15, 2011, which is a continuation of
(Continued)

(51) Int. Cl.
*B60P 3/04* (2006.01)
*A01K 1/00* (2006.01)
(Continued)

(52) U.S. Cl.
CPC ............ *B60P 3/04* (2013.01); *A01K 1/0052* (2013.01); *A01K 1/0058* (2013.01); *A01K 1/0236* (2013.01); *A01K 1/0245* (2013.01); *A01K 1/0272* (2013.01); *B63B 25/004* (2013.01)

(58) Field of Classification Search
CPC . A01K 1/0236; A01K 1/0245; A01K 1/0272; B60P 3/04
USPC ........................................ 119/400–415, 496
See application file for complete search history.

(56) References Cited

U.S. PATENT DOCUMENTS

| 106,888 A | * | 8/1870 | Street ............................. 119/412 |
| 215,855 A | | 5/1879 | Albee |

(Continued)

FOREIGN PATENT DOCUMENTS

| AU | 646925 B | 9/1992 |
| GB | 1352991 A | 5/1974 |

(Continued)

OTHER PUBLICATIONS

New Zealand Further Examination Report dated Feb. 7, 2014, issued in related NZ Patent Application No. 607068 (1 pp).
Australian 1st Examination Report dated Feb. 11, 2014, issued in related AU Patent Application No. 2013201956 (4 pp).
Australian Notice of Acceptance dated Feb. 12, 2014, issued in related AU Patent Application No. 2011285854 (3 pp).
New Zealand Further Examination Report dated Feb. 24, 2014, issued in related NZ Patent Application No. 607063 (1 pp).
(Continued)

*Primary Examiner* — David Parsley
*Assistant Examiner* — Marc Burgess
(74) *Attorney, Agent, or Firm* — Ryan Christensen

(57) ABSTRACT

A shipping container for livestock having a plurality of walls, a container roof and a container floor enclosing an interior storage space. The front wall may include a container door and one or more of the sidewalls may be mounted with one or more column support plates that support web support plates. A floating partition, end wing, loft and feed troughs may be mounted with the web support plates. Additionally, the floating partition may be tilted inward to efficiently divide space and provide access to the loft. A catwalk may also be mounted with the floating partition.

39 Claims, 26 Drawing Sheets

Related U.S. Application Data application No. PCT/US2011/024602, filed on Feb. 11, 2011.

(60) Provisional application No. 61/636,397, filed on Apr. 20, 2012, provisional application No. 61/371,123, filed on Aug. 5, 2010, provisional application No. 61/378,473, filed on Aug. 31, 2010, provisional application No. 61/434,366, filed on Jan. 19, 2011.

(51) Int. Cl.
*A01K 1/02* (2006.01)
*B63B 25/00* (2006.01)

(56) References Cited

U.S. PATENT DOCUMENTS

| | | | |
|---|---|---|---|
| 230,940 A | 8/1880 | Howard | |
| 233,129 A | 10/1880 | Woodruff | |
| 236,332 A | 1/1881 | Hunt | |
| 260,009 A | 6/1882 | Edmands | |
| 272,451 A | 2/1883 | Mather | |
| 371,928 A | 10/1887 | Davis | |
| 375,989 A | 1/1888 | Davis | |
| 1,872,703 A | 11/1928 | Edgerton | |
| 2,498,647 A | 8/1932 | Burnam | |
| 2,593,161 A | 4/1952 | Manger | |
| 2,595,337 A | 5/1952 | Coyner | |
| 2,621,070 A | 12/1952 | Crivella | |
| 2,898,884 A | 8/1959 | Messersmith | |
| D218,174 S | 7/1970 | Kitson | |
| 3,530,830 A | 9/1970 | Smith | |
| 3,602,730 A | 8/1971 | Cushing | |
| 3,674,303 A * | 7/1972 | Doonan et al. | 119/407 |
| 3,755,974 A | 9/1973 | Berman | |
| 3,782,566 A | 1/1974 | McWilliams | |
| 3,824,958 A | 7/1974 | Parady | |
| 3,885,524 A | 5/1975 | Gregory | |
| 4,123,991 A | 11/1978 | Kinrade | |
| 4,158,416 A | 6/1979 | Podesta | |
| 4,168,494 A | 9/1979 | Hummel | |
| 4,252,906 A | 2/1981 | Hosokawa et al. | |
| 4,339,147 A | 7/1982 | Kimzey | |
| 4,416,493 A | 11/1983 | Sumner | |
| 4,498,418 A | 2/1985 | Chumley | |
| 4,592,175 A | 6/1986 | Werner | |
| 4,604,838 A | 8/1986 | Remington et al. | |
| 4,699,088 A | 10/1987 | Murray et al. | |
| 4,819,955 A * | 4/1989 | Cobb | 280/837 |
| 5,005,521 A | 4/1991 | Strong | |
| 5,205,241 A | 4/1993 | Halpin | |
| 5,524,781 A | 6/1996 | Podd et al. | |
| 5,651,330 A | 7/1997 | Jewett | |
| 5,950,565 A | 9/1999 | Guyot | |
| 6,016,846 A | 1/2000 | Knittel | |
| 6,021,739 A | 2/2000 | Allen | |
| 6,209,490 B1 | 4/2001 | Schwede | |
| 6,401,983 B1 | 6/2002 | McDonald et al. | |
| 6,439,825 B1 * | 8/2002 | Bonsall | 119/400 |
| 6,463,419 B1 | 10/2002 | Kluss | |
| 6,536,832 B1 | 3/2003 | Grimm | |
| 6,792,892 B2 | 9/2004 | Craig | |
| 6,817,316 B1 * | 11/2004 | Roussy | 119/401 |
| 6,895,897 B1 | 5/2005 | Culp et al. | |
| 7,044,081 B1 | 5/2006 | Bridges | |
| 7,124,711 B1 | 10/2006 | Bearden | |
| D579,609 S | 10/2008 | Hirokawa | |
| D630,803 S | 1/2011 | Lee | |
| 7,913,651 B1 | 3/2011 | Schiebout | |
| 7,921,609 B2 | 4/2011 | Kordelin | |
| 8,075,033 B1 | 12/2011 | McElroy | |
| 2001/0052327 A1 | 12/2001 | Craig | |
| 2002/0197688 A1 | 12/2002 | Pandolfino | |
| 2003/0101106 A1 | 5/2003 | Mizushima | |
| 2005/0112541 A1 | 5/2005 | Durack | |
| 2005/0177883 A1 | 8/2005 | Rebholtz et al. | |
| 2005/0241593 A1 | 11/2005 | Kaura | |
| 2007/0044724 A1 | 3/2007 | Kvols | |
| 2007/0079765 A1 | 4/2007 | Carter et al. | |
| 2008/0017591 A1 | 1/2008 | Ranade et al. | |
| 2008/0213073 A1 | 9/2008 | Benedict et al. | |
| 2009/0164234 A1 | 6/2009 | Sinn et al. | |
| 2010/0012038 A1 | 1/2010 | Petersen | |
| 2010/0242853 A1 | 9/2010 | Web | |
| 2011/0120380 A1 | 5/2011 | Sladkowski et al. | |
| 2011/0265396 A1 | 11/2011 | Heather | |
| 2012/0037082 A1 | 2/2012 | Rosenstein et al. | |
| 2012/0302150 A1 | 11/2012 | Schmitt | |
| 2014/0026965 A1 | 1/2014 | Barrett et al. | |

FOREIGN PATENT DOCUMENTS

| | | |
|---|---|---|
| GB | 2053808 A | 2/1981 |
| GB | 2393631 A | 4/2004 |
| JP | 58-167286 | 10/1983 |
| JP | 59-216784 A | 12/1984 |
| WO | 9009098 A1 | 8/1990 |

OTHER PUBLICATIONS

New Zealand Notice of Acceptance dated Mar. 31, 2014, issued in related NZ Patent Application No. 607063 (1 pp).

US Notice of Allowability dated Mar. 4, 2014, issued in related U.S. Appl. No. 13/051,754 (2 pp).

US Notice of Allowability dated Mar. 18, 2014, issued in related U.S. Appl. No. 13/051,754 (2 pp).

US Non Final Office Action dated Apr. 11, 2014, issued in related U.S. Appl. No. 13/087,583 (15 pp).

See IDS filed on Jun. 13, 2012 in corresponding U.S. Appl. No. 13/087,583.

See IDS filed on Oct. 17, 2011 issued in corresponding U.S. Appl. No. 13/087,583.

See IDS filed on Jun. 6, 2011 in corresponding U.S. Appl. No. 13/087,583.

See IDS filed on Nov. 2, 2012 in corresponding U.S. Appl. No. 13/087,583.

US Office Action dated Feb. 12, 2013 issued in corresponding U.S. Appl. No. 13,052,159 (14 pages).

US Office Action dated Dec. 4, 2012 in corresponding U.S. Appl. No. 13,051,907 (20 pages).

US Office Action dated Apr. 11, 2013 in corresponding U.S. Appl. No. 13,051,845 (19 pages).

US Office Action dated Nov. 23, 2012 in corresponding U.S. Appl. No. 13,051,845 (18 pages).

Andersen, John, "Shipment of 18,000 Bond for Indonesia Cattle Export Hub," Townsville Bulletin, 1 Edition, Townsville, Queensland, Apr. 17, 2007, (2 pages).

AU Patent Examination Report dated Apr. 16, 2013 in corresponding AU Application No. 2011286413 (8 pages).

AU Patent Examination Report dated Apr. 22, 2013 in corresponding AU Application No. 2011285854 (8 pages).

De Cordoba, J., and Spiegel, P., "Earthquake in Haiti: Some Aid Heads to Damaged Port." Wall Street Journal, Jan. 20, 2010 (3 pages).

Federal Information & News Dispatch, "Standards for Privately Owned Quarantine Facilities for Ruminants," Lanham, United States, 2006 (15 pages).

Goodell, Gregory M., "A Practitioner Approach to Consulting and Monitoring a Dairy Heifer Replacement Operation," American Association of Bovine Practitioners. Conference. Proceedings of the . . . Annual Conference, 2009, p. 62 (3 pages).

McCarthy, David, "Lyell Creek on the Move," The Press, 2 Edition, Christchurch, New Zealand, Jun. 6, 2001, p. 29 (2 pages).

New York Times, "New Matson Cattle Boats Offer Air-Cooled 'Cabins' for Cows," May 10, 1964, p. S24 (1 page).

PA Examination Report dated Jan. 22, 2013 in related PA Application No. 89393-01 (10 pages).

PA Examination Report dated Nov. 30, 2012 in related PA Application No. 89190-01 (8 pages).

(56) References Cited

OTHER PUBLICATIONS

Shah, Saeed, "First Greek Shipping Company to Float in London," Independent, First Edition, London, UK, Nov. 3, 2005, 65 (2 pages).
Sweeney, Charlene, "Queen Returns to the Islands in Ship That Once Ferried Crofters," The Times, Scot Region, London, Jul. 24, 2010, 21 (2 pages).
US Office Action dated Dec. 11, 2012 issued in corresponding Design U.S. Appl. No. 29/384,300 (12 pages).
Yenkel, James T., "Keeping the cat in the Bag & Other Tips on Pets Aloft," Washington Post, Final Edition, Washington, DC, Sep. 11, 1994, e01 (4 pages).
AU Patent Examination Report #2 dated May 30, 2013, issued in corresponding Australian Application No. 2011286413. (3 pages).
Australian first Examination Report dated Apr. 7, 2014, issued in related AU Application No. 2013201954 (4 pp).
Australian Examination Report dated May 29, 2014, issued in related AU Application No. 2013201952 (5 pp).
United States Office Action dated Jun. 18, 2014, issued in related U.S. Appl. No. 13/087,583 (13 pp).
International Search Report and Written Opinion dated May 14, 2012 issued in corresponding PCT Application No. PCT/US2011/046237 (16 pages).
International Search Report and Written Opinion dated Nov. 24, 2011 issued in corresponding PCT Application No. PCT/US2011/024602 (13 pages).
U.S. Appl. No. 13/051,754, filed Mar. 18, 2011.
U.S. Appl. No. 13/051,845, filed Mar. 18, 2011.
U.S. Appl. No. 13/051,943, filed Mar. 18, 2011.
U.S. Appl. No. 13/051,907, filed Mar. 18, 2011.
Design U.S. Appl. No. 29/388,682, filed Mar. 31, 2011.
U.S. Appl. No. 13/052,159, filed Mar. 21, 2011.
Australian First Examiner's Report dated May 24, 2011 issued in corresponding Australian Application No. 2011100193 (3 pages).
New Zealand First Examiner's Report dated Mar. 14, 2011, issued in corresponding New Zealand Application No. 414638 (2 pages).
New Zealand Second Examiner's Report dated Jun. 3, 2011, issued in corresponding New Zealand Application No. 414638 (1 page).
Mooving Through Eastport: http://www.youtube.com/watch?v=7FmShwq_9ao; posted Oct. 30, 2010, 1 pgs.
Port of Eastport, 3rd Cattle Shipment: http://www.youtube.com/watch?v=G4IwLRnBAkE; posted Nov. 6, 2010, 3 pgs.
Design U.S. Appl. No. 29/384,300, filed Jan. 28, 2011, 8 pgs.
Design U.S. Appl. No. 29/388,682, filed Mar. 31, 2011, 8 pgs.
International Application No. PCT/US2011/024602 filed Feb. 11, 2011, 84 pgs.
World Wide Livestock Express;http://www.livestockexpress.us, 2 pgs.
Batca Brothers LLC; http://www.Batcalivestock.com, 1 pg.
US Office Action dated Aug. 13, 2012 issued in related U.S. Appl. No. 13,051,845 (17 pages).
US Office Action dated Sep. 25, 2012 issued in related U.S. Appl. No. 13/052,159 (12 pages).
Canadian Office Action dated May 6, 2014, issued in related CA Application No. 2,807,313 (3 pp).
Australian 1st Office Action dated Jun. 24, 2014, issued in related AU Application No. 2013201950 (6 pp).
US Office Action dated Jul. 3, 2014, issued in related U.S. Appl. No. 13/051,907 (16 pp).
Braga, M., "Cuba to Get More Florida Cattle," Sarasota Herald Tribune, All Edition, Mar. 24, 2004, (2 pp).
Treen, Dana, "Brakes on Truck Did Work," Florida Times Union, State Edition, Jacksonville, Florida, Feb. 27, 2003, (2 pp).
Australian Notice of Acceptance dated Dec. 6, 2013, issued in corresponding AU Application No. 2011286413 (2 pages).
US Notice of Allowance dated Jan. 29, 2014, issued in corresponding U.S. Appl. No. 13/051,754 (12 pages).
US Final Office Action dated Feb. 11, 2014, issued in corresponding U.S. Appl. No. 13/051,943 (9 pages).
EPO Extended European Search Report dated Jan. 30, 2014 issued in corresponding EP Application No. 11814922.8 (7 pages).
EPO Extended European Search Report dated Feb. 3, 2014 issued in corresponding EP Application No. 11815174.5 (6 pages).
New Zealand Notice of Acceptance dated Sep. 5, 2014, issued in related NZ Application No. 607068 (2 pp).
Panamanian Office Action dated Oct. 7, 2014, issued in related PA Application No. 89981-01 (8 pp).
Australian 2nd Examination Report dated Aug. 12, 2014, issued in related AU Application No. 2013201956 (2 pp).
Canadian Office Action dated Sep. 30, 2014, issued in related CA Application No. 2,807,297 (3 pp).
Australian 3rd Examination Report dated Nov. 5, 2014, issued in related AU Application No. 2013201956 (2 pp).
EP Intent to Grant dated Nov. 14, 2014, issued in related EP Application No. 11814922.8 (8 pp).
Australian 2nd Examination Report dated Oct. 10, 2013, in related AU Patent Application No. 2011285854 (3 pp).
Australian 3rd Examination Report dated Oct. 22, 2013, in related AU Patent Application No. 2011286413 (4 pp).
New Zealand 1st Examination Report dated Oct. 23, 2013, in related NZ Patent Application No. 607063 (2 pp).
US Corrected Notice of Allowability dated Sep. 9, 2013, in related U.S. Appl. No. 13/051,845.
New Zealand 1st Examination Report dated Oct. 23, 2013, in related NZ Patent Application No. 607068 (2 pp).
CA Notice of Allowance dated Dec. 17, 2014 issued in corresponding CA Application No. 2,807,313.
AU Notice of Acceptance dated Dec. 19, 2014 issued in corresponding AU Application No. 2013201952.
AU Examination Report dated Jan. 6, 2015 issued in corresponding AU Application No. 2013201950.
AU Notice of Acceptance dated Jan. 8, 2015 issued in corresponding AU Application No. 2013201956.
US Office Action dated Jan. 29, 2015 issued in corresponding U.S. Appl. No. 13/051,907.
MX Examination Report dated Feb. 27, 2015 issued in corresponding MX Application No. MX/a/2013/001435.
EP Intent to grant dated Mar. 18, 2015 issued in corresponding EP Application No. 11814922.8.
US Office Action dated Jul. 29, 2013 in related U.S. Appl. No. 13/051,754.
International Search Report dated Jul. 24, 2013 in related PCT Application No. PCT/US2013/037179.
US Office Action dated Jul. 19, 2013 in related U.S. Appl. No. 13/051,907.
US Office Action dated Jul. 18, 2013 in related U.S. Appl. No. 13/051,943.
US Notice Of Allowance dated Jun. 18, 2013 in related U.S. Appl. No. 13/052,159.
US Notice of Allowance dated Aug. 23, 2013 in related U.S. Appl. No. 13/051,845.
Australian Maritime Safety Authority, Marine Orders, Part 43, Cargo and Cargo Handling—Livestock, Issue 6, 2006, pp. 1-70. http://www.comlaw.gov.au/Details/F2006L03643.
Australian Chamber of Shipping, Stowage of Cargo in Containers, Fact Sheet 01/96, 1996. https://shippingaustralia.com.au/Portals/57ad7180-c5e7-49f5-b282- c6475cdb7ee7/011996FactSheet.pdf.
Transport Information Service, Permissible Loading Capacity of Containers. published on Jan. 27, 2010 https://web.archive.org/web/20100127095524/http://www.tisgdv.de/tis_e/containe/belast/belast.htm.
Australian Examination Report dated Apr. 24, 2015, in related AU Patent Application No. 2013201954.
EPO Intention to Grant dated May 8, 2015 issued in corresponding EP Application No. 11815174.5.
EPO Decision to Grant dated May 15, 2015 issued in corresponding EP Application No. 1814922.8.

* cited by examiner

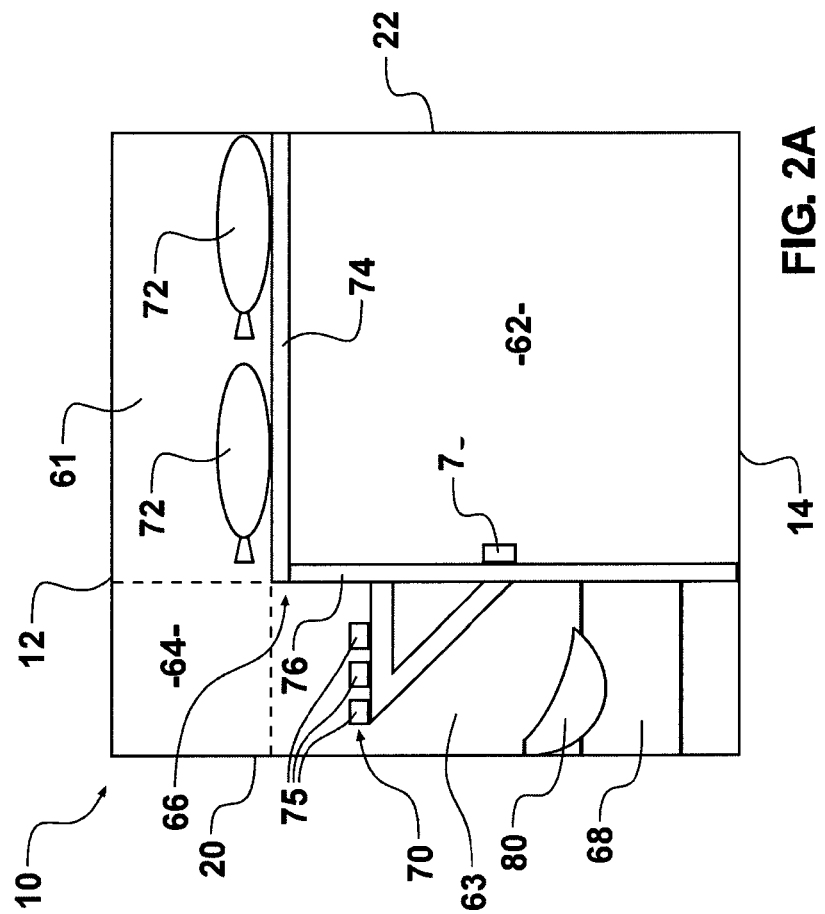

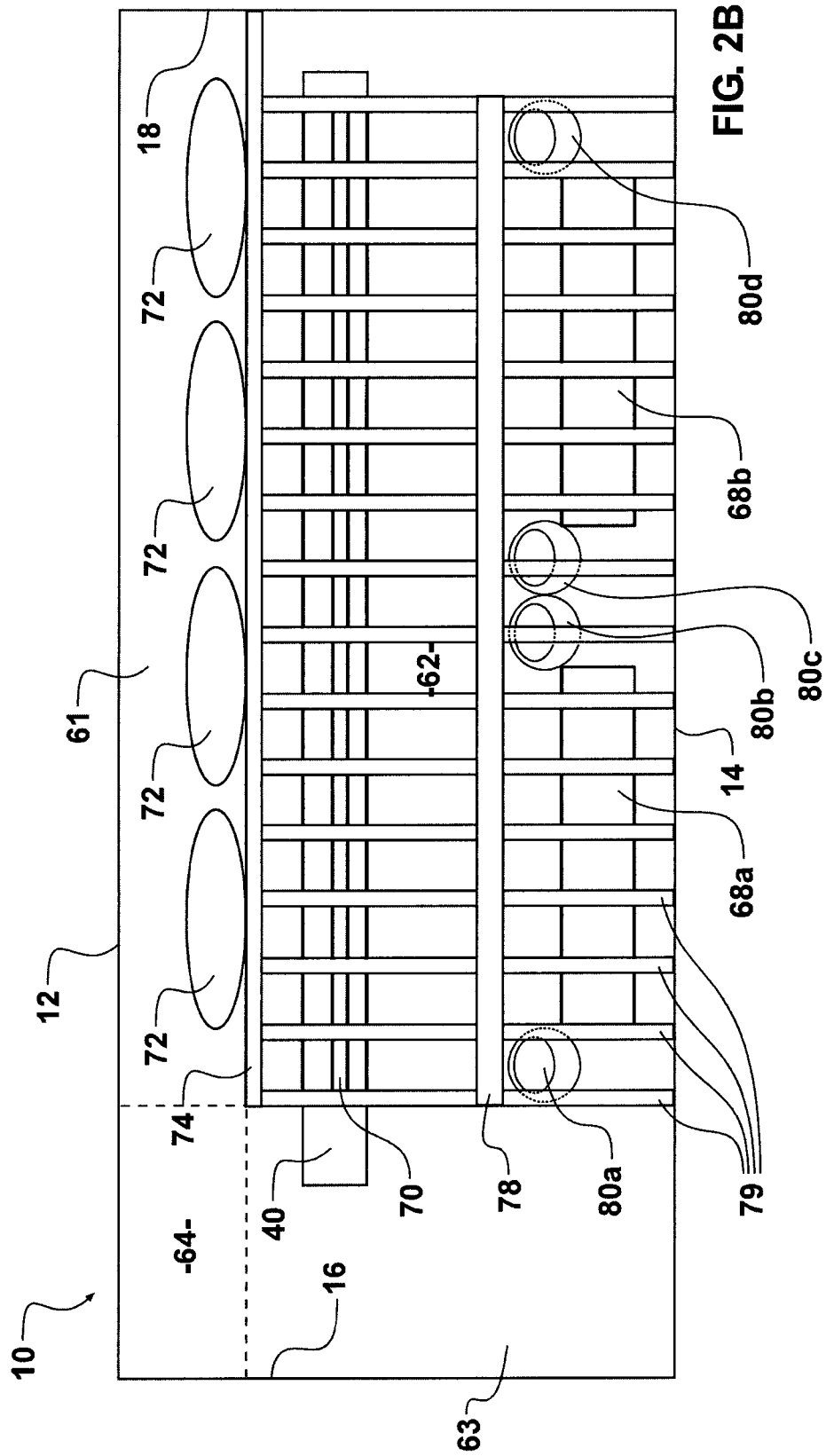

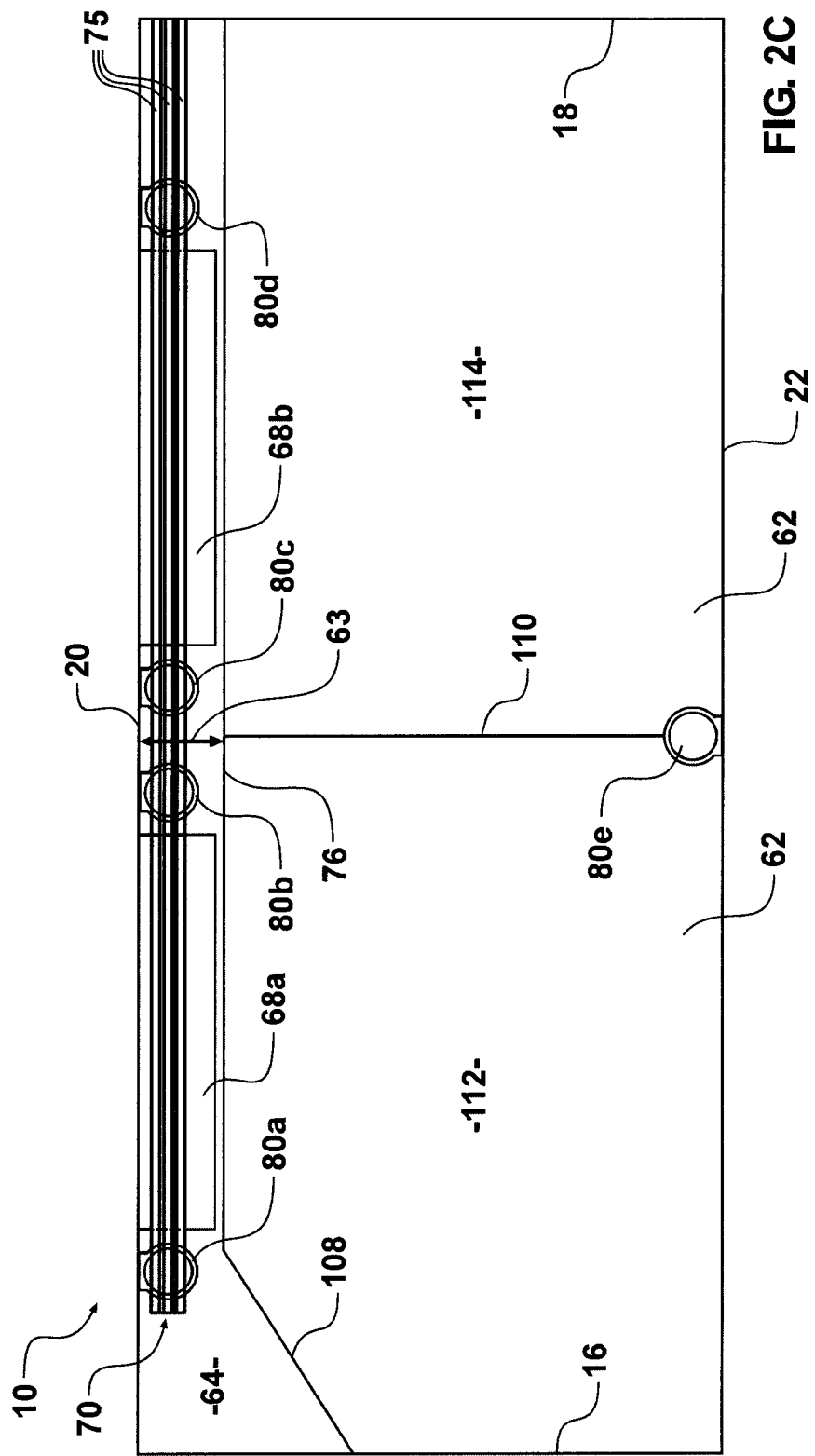

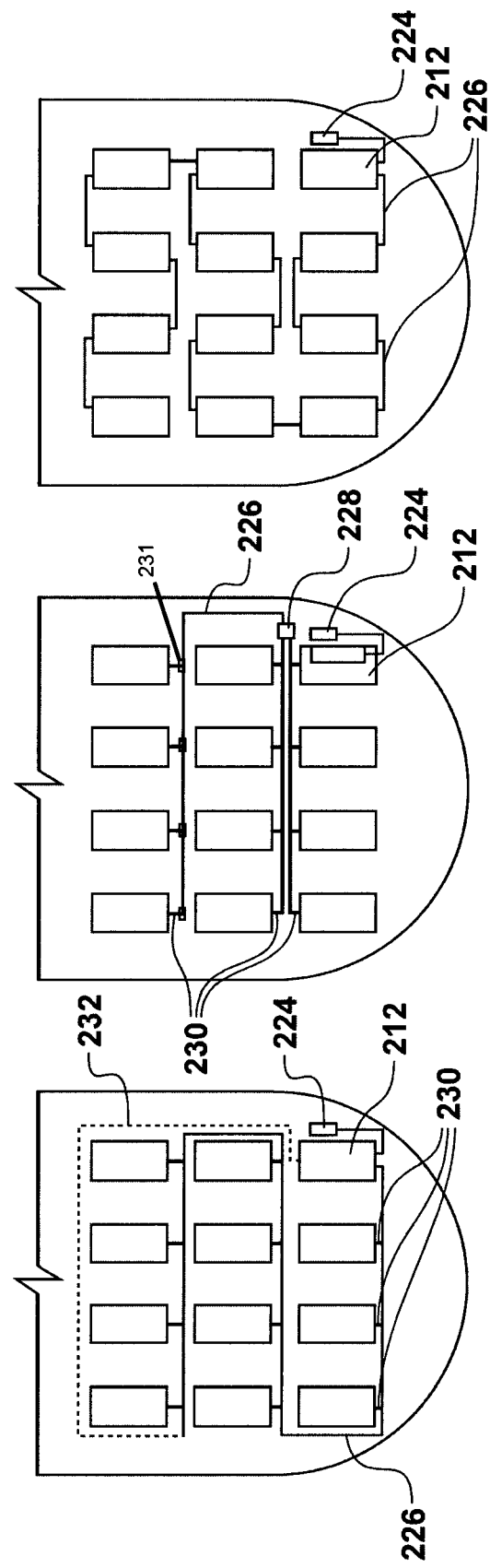

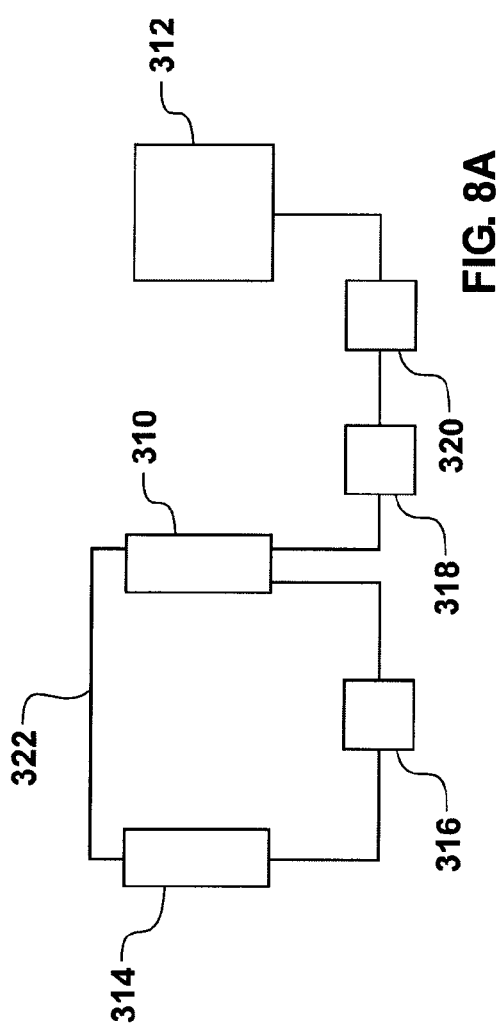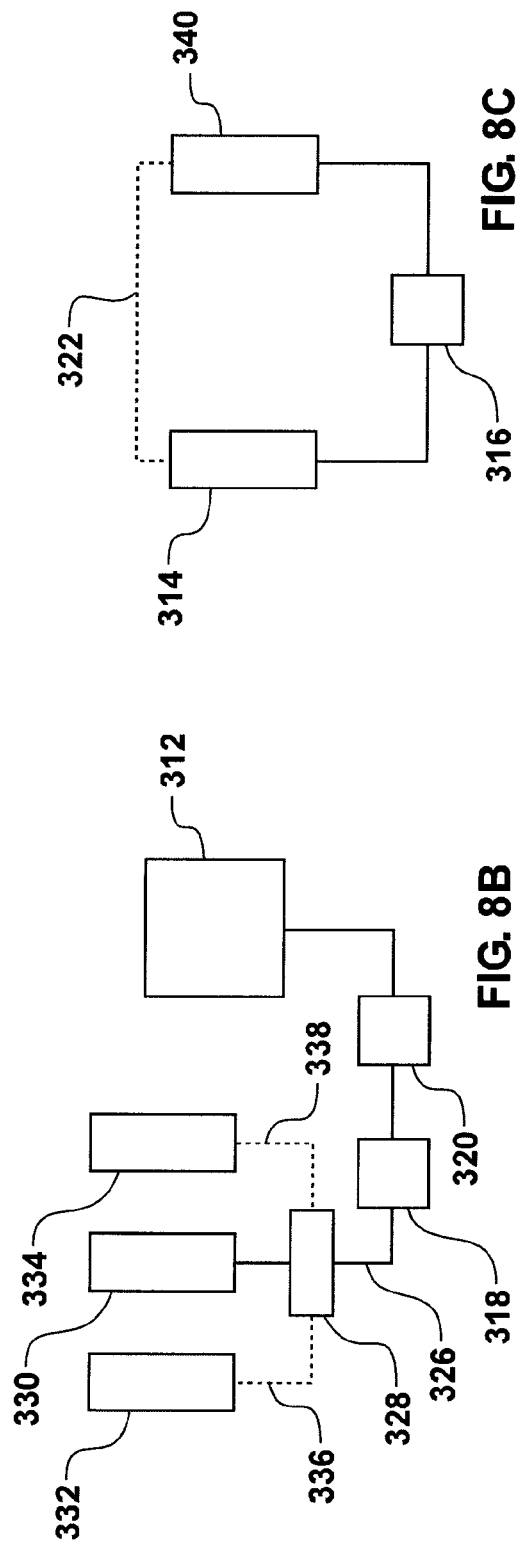

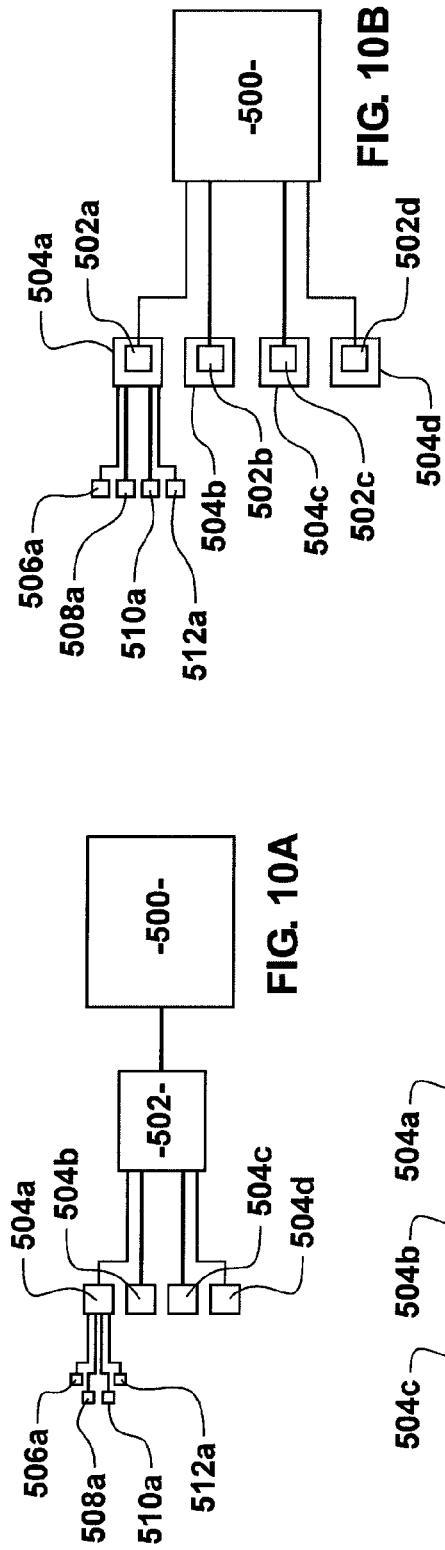
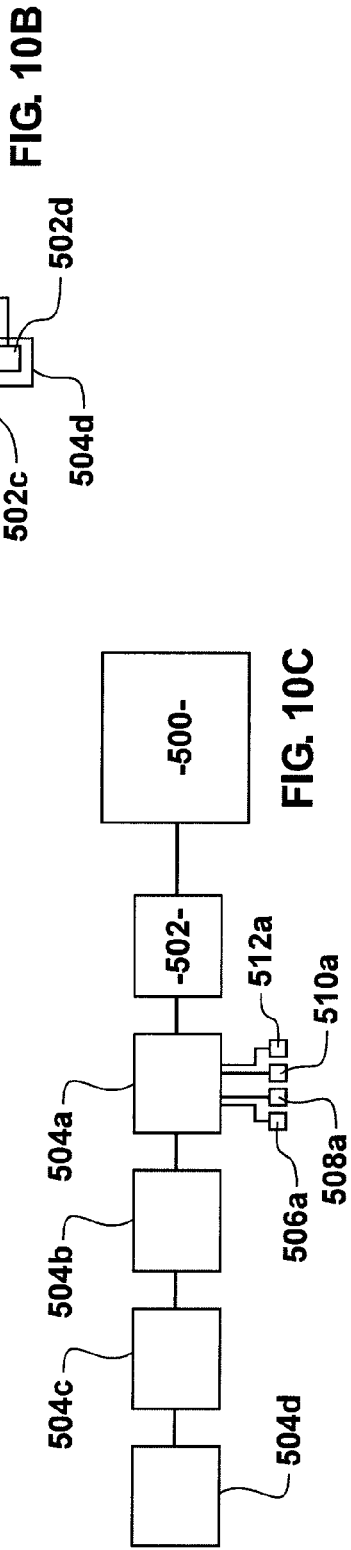
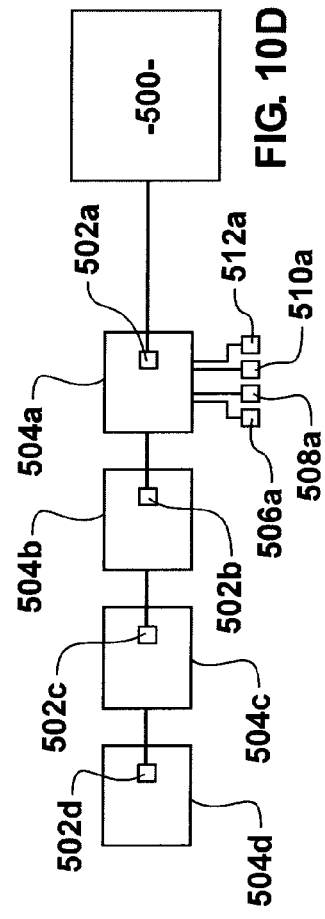
FIG. 10A
FIG. 10B
FIG. 10C
FIG. 10D

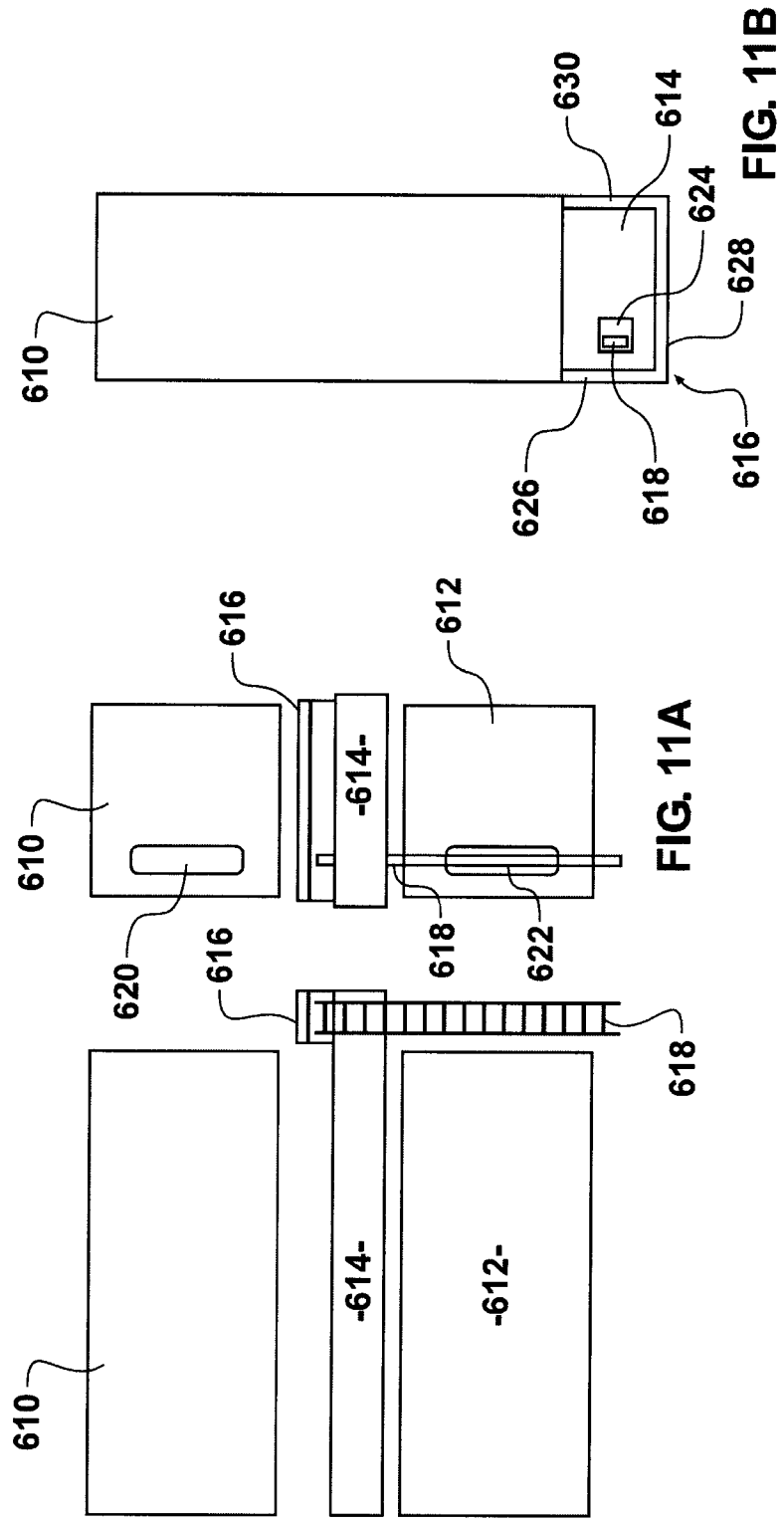

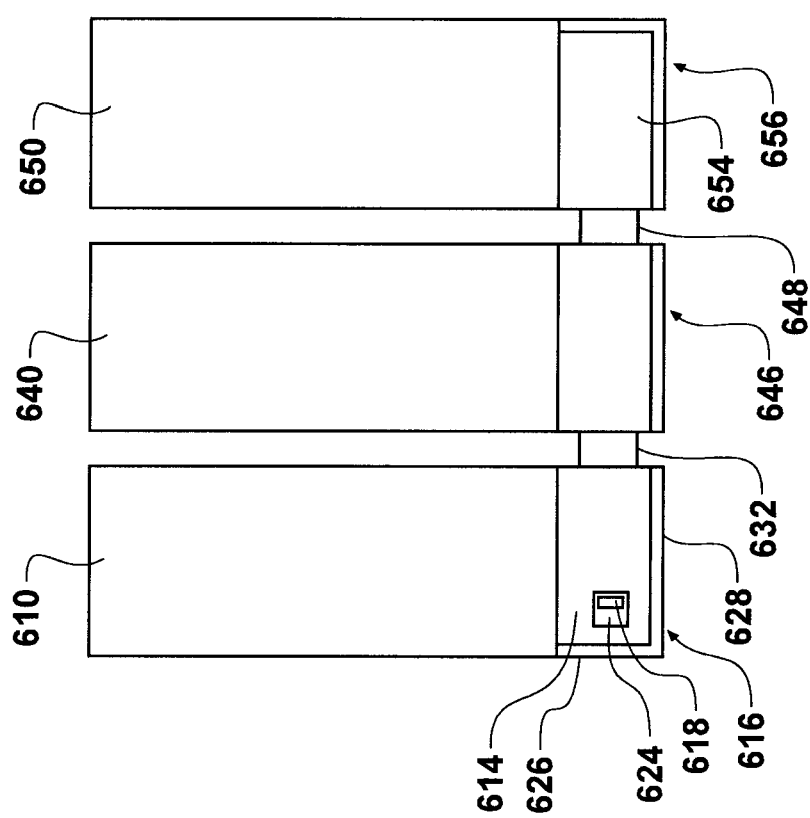

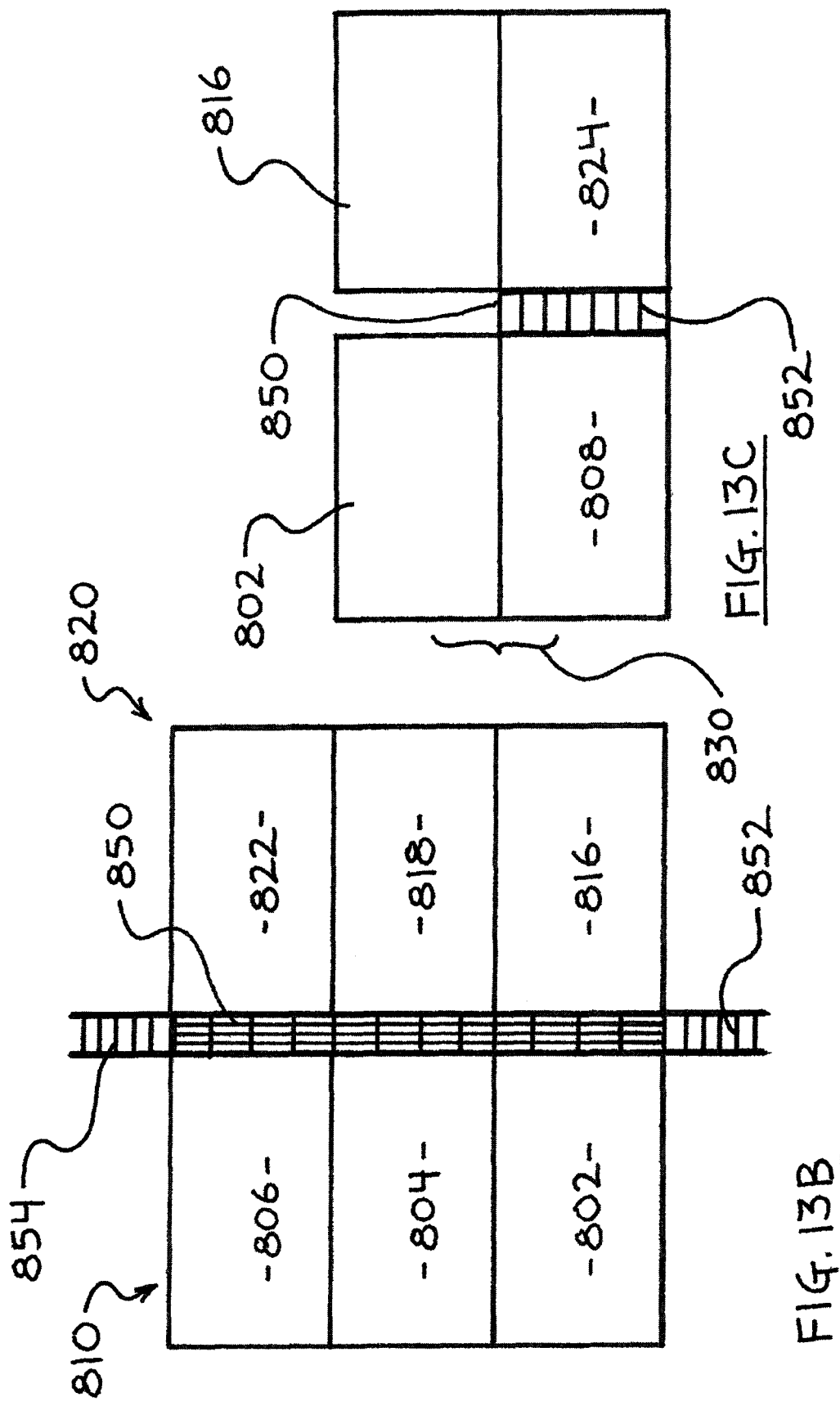

FLOATING PARTITION, LOFT AND TROUGHS FOR A LIVESTOCK SHIPPING CONTAINER

This U.S. Non-Provisional patent application claims the benefit of U.S. Provisional Application No. 61/636,397, filed on Apr. 20, 2012. This application is also is a continuation-in-part of, and claims priority to, U.S. patent application Ser. No. 13/087,583, filed on Apr. 15, 2011, which in turn claims the benefit of International Patent Cooperation Treaty Patent Application PCT/US11/24602, filed on Feb. 11, 2011; U.S. Provisional Patent Application No. 61/371,123, filed Aug. 5, 2010; U.S. Provisional Patent Application No. 61/378,473, filed Aug. 31, 2010; and U.S. Provisional Patent Application No. 61/434,366, filed Jan. 19, 2011. Each application is hereby incorporated by reference herein.

FIELD OF INVENTION

Generally, embodiments described herein relate to shipping containers for transporting livestock on shipping vessels, and more particularly relate to shipping containers having floating partitions, as well as, floating feed troughs and lofts.

BACKGROUND

As beef, dairy and other livestock industries continue to develop around the world; various market demands generate a need to transport livestock over great distances. In some cases, transoceanic and intercontinental shipments may be desirable. These shipments can be made relatively quickly by airborne transport, but at a great expense. Heavier cargo, such as livestock, can be particularly expensive creating a need for waterborne transport, which can take between four days and forty-five days, or more, to arrive at a final destination. Living animals present a number of issues that are unique to shipping and which become increasingly problematic over extended shipment periods. Therefore, a need exists for a specialized shipping container for the oceanic transport of livestock.

Unlike typical cargo, livestock require a steady supply of suitable food, water, air and at least some level of climate or temperature control in order to promote good health. These basic requirements are further complicated by the fact that livestock produce waste during their confinement in shipping containers. Therefore, an unresolved need exists for a shipping container that promotes livestock health over the course of long shipments, and for a spatially efficient configuration to transport livestock and feed together.

At least one previous container indicated for the transport of livestock provides an external means for accessing stored feed for distribution to livestock within the container. Such an arrangement may present safety hazards to an operator and requires additional spacing between containers. For example, some previously described shipping containers include compartments which are accessible from the exterior of the container through outwardly opening panels. These panels require a certain clearance in order to provide access to feed during the course of shipment, which increases the required space for each container. Further, these configurations require an operator or attendant located on the exterior of the container for distributing feed. The attendant may be exposed to weather elements and may be within the reach of livestock presenting opportunities for injury while performing these tasks. As such, a further need exists for shipping containers which are spatially efficient and which include features for enhancing the health and safety of livestock and attendants.

SUMMARY OF INVENTION

Certain embodiments of the claimed invention are summarized below which meet the needs set forth above. These embodiments are not intended to limit the scope of the claimed invention, but rather serve as brief descriptions of possible forms of the invention. The invention may encompass a variety of forms which differ from these summaries.

One embodiment relates to a shipping container having a front wall, back wall, first sidewall and second sidewall connecting a container roof to a container floor enclosing an interior storage space. A floating partition may be mounted with one or more of the first and second sidewalls separating the interior storage space into a first portion and a second portion without touching the container floor. A loft may also be connected to the floating partition and mounted with one or more of the first and second sidewalls.

Another embodiment relates to a shipping container having a front wall, back wall, first sidewall and second sidewall connecting a container roof to a container floor enclosing an interior storage space. One or more column support plates mounted with the first sidewall and one or more web support plates mounted at the column support plates at the first sidewall. The one or more web support plates may have distal ends extending away from the column support plates mounted at the first sidewall. A floating partition may be mounted with the web support plates. One or more feed troughs and a catwalk may be mounted with the floating partition. A loft in communication with the floating partition may be supported by one or more of the plurality of sidewalls. An end wing may be connected to the floating partition.

BRIEF DESCRIPTION OF THE DRAWINGS

FIG. 2A-D illustrates internal and cross-sectional views of a shipping container in accordance with certain aspects of the present invention.

FIG. 7A-C illustrates schematic configurations of arrays of interconnected shipping containers on a shipping vessel in accordance with certain aspects of the present invention.

FIG. 8A-C illustrates schematic configurations of arrays of interconnected of shipping containers and water delivery systems on a shipping vessel in accordance with certain aspects of the present invention.

FIG. 10A-D illustrates schematics of electrical systems for multiple shipping containers on a shipping vessel in accordance with certain aspects of the present invention.

FIG. 11A-C illustrates an embodiment of stackable containers along with a spacer and a catwalk for accessing stacked containers.

FIG. 13B provides a top view of a plurality of stacked containers sharing a catwalk.

FIG. 13C provides a side view of a plurality of stacked containers sharing a catwalk.

While the present invention may be embodied with various modifications and alternative forms, specific embodiments are illustrated in the figures and described herein by way of illustrative examples. It should be understood the figures and detailed descriptions are not intended to limit the scope of the invention to the particular form disclosed, but that all modifications, alternatives, and equivalents falling within the spirit and scope of the claims are intended to be covered.

MODES FOR CARRYING OUT THE INVENTION

Figure 1:
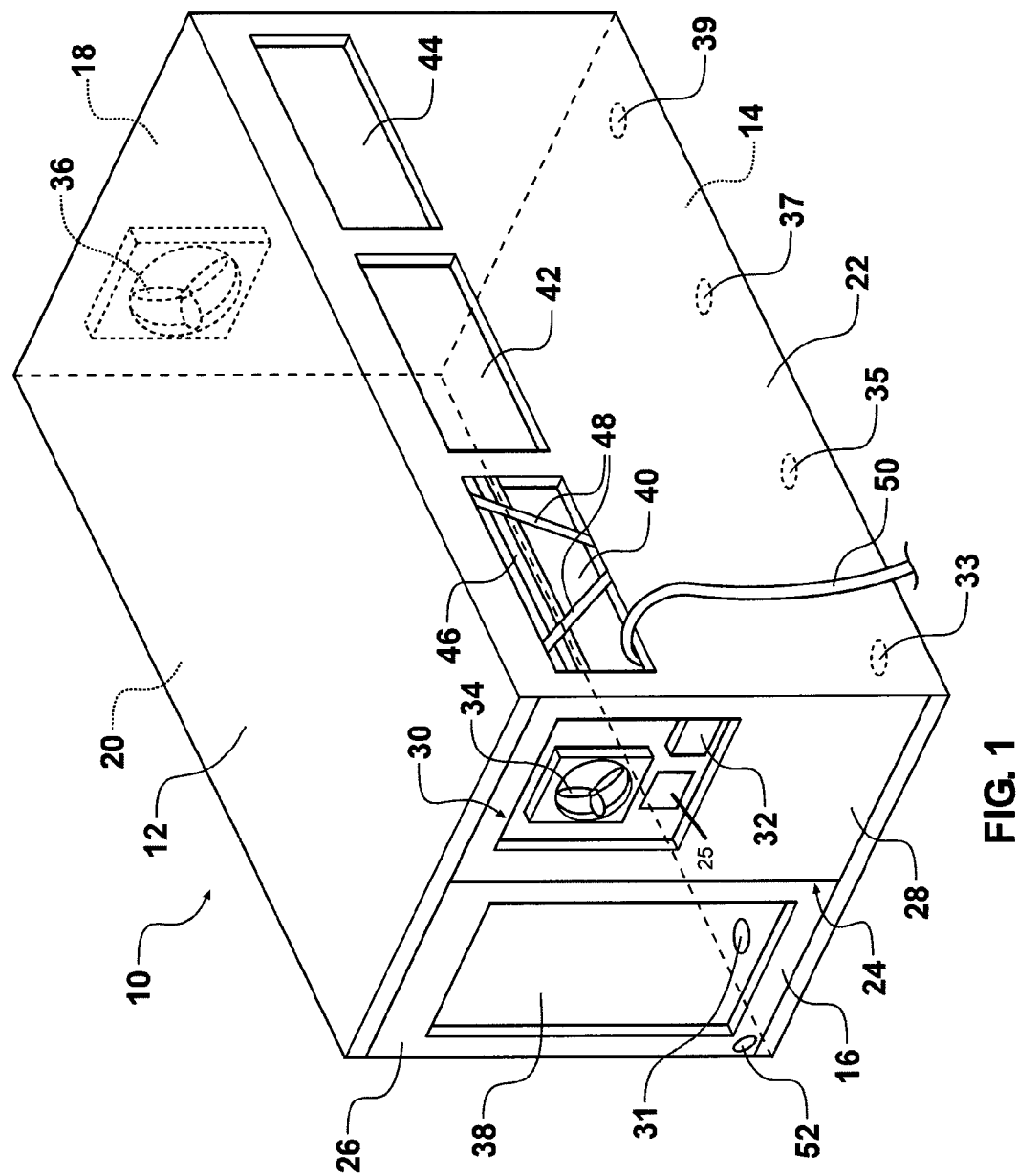
FIG. 1 illustrates an external isometric view of a shipping container in accordance with certain aspects of the present invention.

Now referring primarily to FIG. 1, an external view of an embodiment of a shipping container 10 is illustrated. Particular embodiments relate to a shipping container 10 for transporting livestock, where the livestock can include one or more cattle, horses, sheep goats, pigs, other domestic livestock, or exotic animals. The exterior of the shipping container 10 is illustrated with roof 12, a bottom 14, a front wall 16, a back wall 18, a first sidewall 20 and a second sidewall 22 forming an interior storage space. The front wall 16, back wall 18, first sidewall 20 and second sidewall 22 may be collectively referred to as the sides or a plurality of sidewalls, and it should be appreciated the terms, "top," "bottom," "front," and "back" are used as relative terms for identification relative to the other sides and that shipping containers can be configured with any number of sides or in any number of orientations.

Each of the sides can be constructed from metal connected to a metal frame, or from other materials known in the industry for shipping containers. As one non-limiting example, the shipping container 10 can be constructed from corrugated steel on a metal framework. As another non-limiting example, the sides can be constructed from other suitable materials, such as fiberglass, plastics, alloys, or combinations thereof. The shipping container 10 can be dimensioned as a typical cargo shipping container.

By way of a non-limiting example, the shipping container 10 can be twenty, forty, forty five, forty eight, or fifty three feet long, eight feet wide, and nine and a half feet high. Shipping containers can be eight or eight and one half feet tall, and these containers are also contemplated for use herein. In various countries containers can be slightly wider to accommodate different sized pallets. Each of the dimensional relations of containers for this purpose are also contemplated for use in the aspects presented herein, as well as other standard or useful dimensions, which have not been specifically identified. For example, the shipping container 10 can be about ten to about sixty feet long, about seven to about twelve feet wide, and about seven to about twelve feet tall.

The sides can be insulated, or coated, on their interior for the purpose of regulating the temperature of the shipping container. The coating can be water resistant and non-absorbent so livestock waste and fluids remain easy to clean from the container and so the shipping container is easy to disinfect. For example, the interior surface, or exterior surface, or both surfaces of the shipping container 10 can be coated with a reflective material for the purpose of reflecting light, as opposed to generating heat. Similarly, the interior of the shipping container 10 can be coated with foam or another insulating material, such as a paint or film. The insulating material selected for the interior of the container can be water tight and non-absorbent so the interior surfaces remain easy to clean and disinfect in view of waste produced by livestock in transit. In another embodiment, the interior surfaces can be padded with cushioning elements for the safety and comfort of the livestock The bottom 14 can be sealed to form a water tight bottom, or to make at least a portion of the bottom watertight. The watertight bottom can provide the benefit of preventing urine and other waste from leaking onto a transport vessel, a dock, other shipping containers, or other locations. For example, the bottom 14 can be lined with a plastic or a rubber material which can be configured to overlie the bottom and portions of the front wall 16, back wall 18 and sidewalls. As one example, the bottom 14 can optionally include drain ports 31, 33, 35, 37 39. The drain ports can be sealed by a wing nut, a rubber plug, or by other sealing elements for draining waste fluids at a designated times and locations. As few as a single drain port can be used, and as many as sixteen or more drain ports can be configured symmetrically or asymmetrically on the bottom 14 of the shipping container 10. In one embodiment, a sealing foam can be used, around openings formed on the exterior of the container.

A bedding layer can be formed on the bottom 14 of the interior storage space. The bedding can include saw dust, wood shavings, pine chips, rice chips, hay, straw, powder and combinations thereof, which can be layered or can be mixed. The bedding can be formed over a generally water tight structure, which can include a concrete layer and/or a plastic and/or rubber, as well as, the drain ports described above. In one embodiment, the bedding layer can be selected for its ability to absorb fluid waste and reduce odors and can include, for example, sawdust and pine chips. In another embodiment the bedding layer can be formed to provide livestock cushioning within the container, such as hay or straw. Other suitable materials can be used for confining urine and other waste produced by livestock within the shipping container.

On the interior of the container 10, the bottom 14 can include a traction surface to assist livestock in movement within the shipping container in light of the relative motion the shipping container 10 undergoes on the open sea. For example, the interior of the bottom 14 can include rubber matting, a metallic grid, a metallic mesh, a rubber grid, a corrugated surface, crossbars and combinations thereof. Similarly, other surfaces can be used on the bottom 14 of the shipping container 10 in order to provide livestock with improved traction. Other materials and shapes can be used, so long as the shape allows livestock to gain footholds in the face of the pitch, roll and yaw of shipping vessels.

The front wall 16 can include a cargo gate 24, through which livestock can be loaded like any other cargo before the shipping container 10 is loaded onto a shipping vessel. The cargo gate 24 can have a first side 26 and a second side 28. The first side 26 of the cargo gate 24 can have an control box 30 including an electrical connection 32 for receiving power from a power source, can be a 220 volt source or a 440 volt source. The control box 30 is illustrated connected to a first ventilation fan 34 for promoting circulation within the shipping container 10. A second ventilation fan 36 illustrated on the back wall 18 of the shipping container 10 and can also be connected to the control box 30. The control box 30 can include a transformer to step down voltage from the external source for consumption within the shipping container 10, as well as a controller for operating various electrical devices within the shipping container 10, such as the fans. The control box 30 can also include breakers and switches for each of the devices in the shipping container 10. Additionally, electronic components, such as a timer 25, for controlling, regulating or powering any electric devices within the shipping container 10 can be included in the control box 30. The control box 30 can include an electrical connection 32, which can be a weather proof female connection for receiving power, such as three phase 440 volts. Suitable weather proof electrical connections 32 are available from ESL power systems out of Corona Calif., US. Additionally, weather proof connections can be used on the interior of the shipping container 10 for each electrical device, in order to ensure the continuous operation of lights, fans, and other equipment during shipment. Lights may particularly require more water proofing than typical in these shipping containers 10.

First and second ventilation fans 34 and 36 are illustrated generally opposing each other on opposite sides of the shipping container 10 in order to maximize the air flow through the shipping container 10. In such an arrangement one of the two fans can be configured to push air through the shipping container 10, while the other can be configured to pull air through the shipping container 10. Such a cooperation between the fans permits an improved air exchange. The first ventilation fan 34 and second ventilation fan 36 can be provided in conjunction with the ventilation openings 40, 42, 44 to promote circulation in the shipping container 10. In one embodiment, the fans can be mounted in a configuration which promotes two-way air flow. In another embodiment, the one or more of the fans can be mounted at angles in order to promote circulation. In either arrangement, the fans and ventilation openings can provide between about 0.4 air exchanges per minute to about 12 air exchanges per minute, or greater than 2.5 air exchanges every minute. In another embodiment, shipping containers 10 can be stored in the hull of a shipping vessel, but may require as many as 30 air exchanges per minute.

Other configurations of fans are contemplated for use with embodiments of the shipping container 10, but the power and arrangement of the fans can be sufficient for maintaining air flow through the entire shipping container 10. In one embodiment a fan for pushing air can be fluidically connected to a fan pulling air by a conduit, such as a plastic tunnel. The conduit can include openings facing the livestock in order to ensure an even distribution of air movement. In some embodiments, widow air conditioning units can be used in place of fans to control temperatures and air circulation. In one embodiment, one air conditioning unit can be located towards the front of the shipping container 10 and a second can be located towards the back of the shipping container 10. The air conditioning units can be powered in similar fashion as described for the fans from an external power source such as a generator.

The second side 26 of the cargo gate 24 can have a personnel opening 38. In order to compensate the shipping container 10 for the structural integrity loss due to this opening, the personnel opening 38 can be reinforced by a frame of tubular metal, metal plates, or other suitable material. This personnel opening 38 provides access to the interior of the shipping container 10 and can be accessed by an attendant during the shipment of the shipping container 10 while housing livestock. The personnel opening 38 can be configured with a latchable door (not illustrated).

The first sidewall 20 and the second sidewall 22 can each provide a plurality of ventilation openings, for example three ventilation openings 40, 42, and 44 are illustrated on the second sidewall 22. The ventilation openings 40, 42, 44 in conjunction with fans, or other means of circulating air, can be used for the purpose of maintaining a desired air exchange rate within the shipping container 10. In one embodiment, the first sidewall 20 and the second sidewall 22 each include one or more ventilation openings 40, 42, 44 to prevent ammonia or carbon dioxide from waste from impacting the health of livestock. Each ventilation opening can be reinforced with a frame of tubular metal or plates, or the like, along the interior of the opening. As one example, the ventilation openings 40, 42, and 44, can be reinforced with steel plates to ensure the overall integrity of the shipping container 10.

While the ventilation openings 40, 42, and 44 can provide a benefit regarding air circulation, they may present a problem in that inclement weather, such as rain, can add additional stress to already stressed, confined livestock. In order to address this, the first ventilation opening 40 is illustrated with a shutter 46 which can travel from an open position to a closed position. The ventilation openings 42, 44 can also include similar shutters or other means for covering closing. These shutters 46 can be open in order to promote air circulation or, in the event of inclement weather, can be closed to reduce rainwater and other elements from entering the shipping container 10 through the ventilation openings 40, 42, and 44.

Guides 48 can be welded across each ventilation opening 40, 42, 44 in order to further reinforce each opening, as well as for keeping the shutters 46 in place. These ventilation openings 40, 42, and 44, in combination with the fans 34 and 36 promote air movement sufficient to reduce or prevent the accumulation of ammonia, carbon dioxide, and other gases in the shipping container 10. In order to promote circulation further, a plurality of shipping containers 10 can be placed in side-to-side relationship and spaced by between about 6 inches and about 12 inches or more. In another embodiment the roof 12 can have an air inlet opening, which can be any number of shapes or sizes in order to promote air circulation. The air inlet can also be adjustable, or sealable.

Water can be supplied to the shipping container 10 through one or more water hoses 50, or water delivery lines, which is illustrated entering the shipping container 10 through a ventilation opening 40. The hose 50 can include piping and can be constructed from rubber, plastic, polyvinyl chloride ("PVC"), cross-linked polyethylene, another cross-linked polymer, or another appropriate material. The hose can also be replaced with a rigid piping system constructed from galvanized metal or another material. The hose 50 can also enter the shipping container 10 through a water connection 52 formed in a side of the shipping container 10. The water connection 52 can be an inlet which is covered when not in use, or a threaded connection for receiving piping or hoses. As an example, the water connection 52 can comprise a threaded water connection on the exterior of the shipping container in communication with an internal water connection for communication with internal plumbing in the shipping container 10. A valve can be used to actuate the water connection 52 into open and closed positions. In the open position, the interior of the shipping container can be supplied a pressurized source of water through the water connection 52. The internal plumbing can include hoses or piping connected to water troughs, nose operated water bowls, or the like, through fittings, such as a brass fittings. Alternatively, the hose 50 can be connected directly to fittings for water bowls. The first water trough or nose operated water bowl can be connected in series to additional water bowls or water troughs located in the same shipping container or in subsequent shipping containers. The water hoses 50 on the interior of the shipping container 10 can be contained within a PVC, plastic, or rubber sheath which serves to prevent kinking in the line to help ensure an uninterrupted supply of water to the livestock. Any hoses or water delivery lines can be secured flush within the shipping container 10 and with durable fittings in order to avoid damage to the water system and potential injury to livestock being transported. The water connections and any water lines can be padded or insulated to prevent freezing, as well as, to prevent animals from damaging the lines by chewing on them.

Figure 2D:
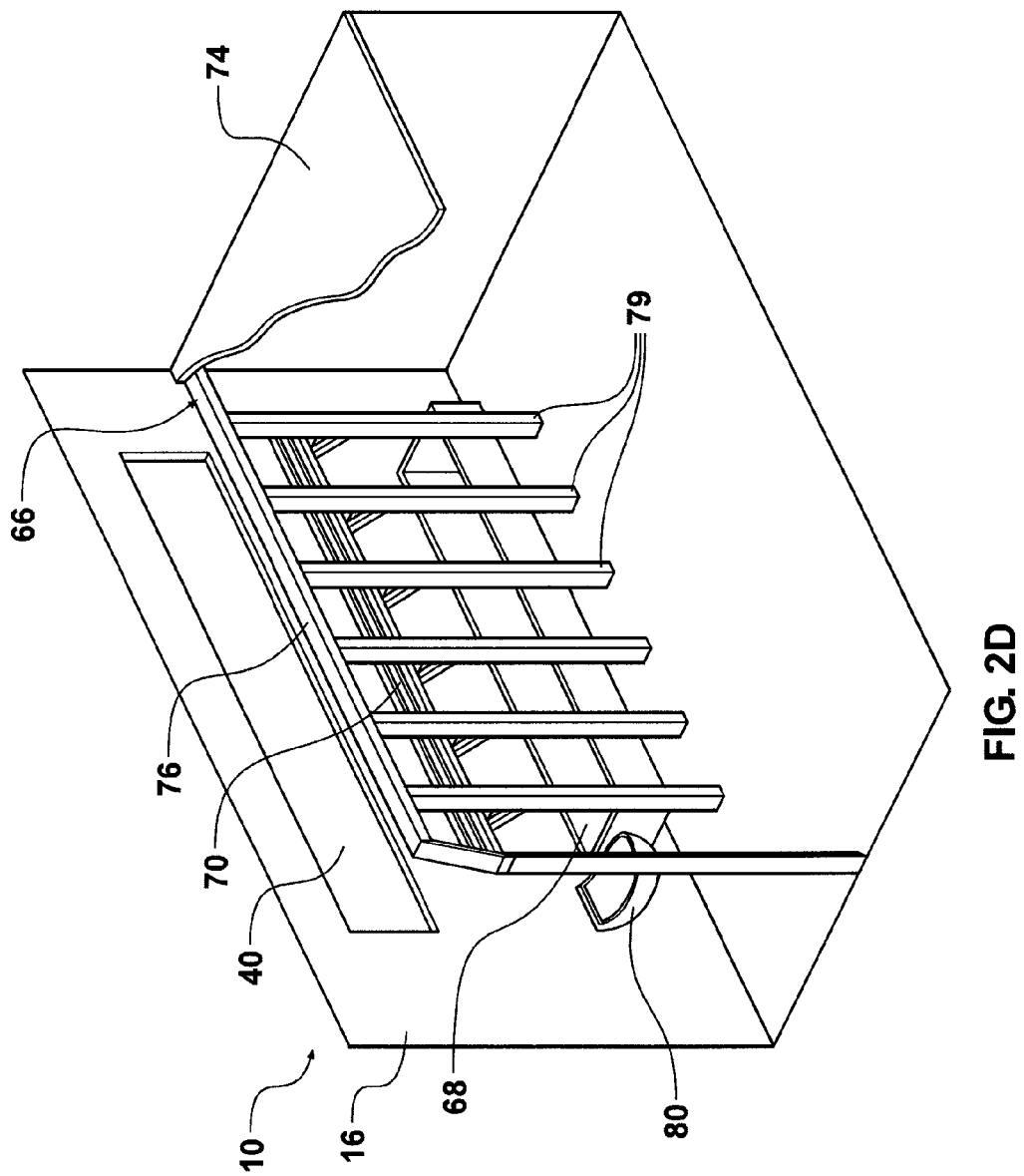

Now referring primarily to FIGS. 2A-D, four internal views of a shipping container 10 similar to the embodiment portrayed in FIG. 1 are illustrated, whereby similar elements are identified with the same reference numbers. FIG. 2A illustrates a sectional view of the shipping container 10 having a roof 12 a bottom 14 and four sides, including a front wall 16, a back wall 18, a first sidewall 20 and a second sidewall 22. The embodiments illustrated in FIG. 2A-D can incorporate exterior features illustrated in FIG. 1. The shipping container 10 includes an internal structure for separating a livestock storage area 62 from a feed storage area 64, whereby the livestock storage area 62 comprises the area enclosed by this internal structure within the interior storage space and the feed storage area 64 comprises a continuous opening formed between the exterior of the internal structure and the interior surface of the shipping container 10.

The internal structure can be a feed partition 66 as illustrated in FIG. 2A-D physically separating the livestock storage area 62 from the feed storage area 64. Although, other configurations, such as a floating feed partition may also be used. The livestock storage area 62 can also be considered an enclosure formed by the feed partition 66. The feed storage area 64 can be considered the continuous opening outside the livestock storage area 62, or the remaining interior storage space which is defined by the interior of the shipping container 10 and the exterior of the feed partition 66.

The feed partition 66 can include a horizontal partition 74 and a vertical partition 76 for creating the boundaries of the livestock storage area 62 and the feed storage area 64. The horizontal partition 74 can adjoining both the vertical partition 76 and the second sidewall 22; defining, at least in part, the substantially horizontal overhead space 61 above the feed partition 66. Feed 72 can be stored in the substantially horizontal overhead space 61 of the feed storage area 64 above the livestock storage area. The vertical partition 76 can connect the bottom 14 of the shipping container 10 to the horizontal partition 74 and define, at least in part, the substantially vertical sidewall space 63. In another embodiment described in further detail later, the vertical partition 76 need not contact the container floor 14, but may be suspended from the container sidewalls. Such a configuration may be considered a floating partition and can be seen in more detail in FIGS. 14-18. The vertical partition 76 can comprise vertical spaced members 79 (seen in FIG. 2B) according to the livestock to be transported. By way of a non-limiting example, the vertical spaced members 79 can be spaced between about a foot and about two feet for bovine. The spacing provides livestock, such as bovine, sufficient room to access some portion of the feed storage area 64. The feed storage area 64 can include both the substantially horizontal overhead space 61, which can be defined, at least in part, by the interior of the top 12 of the shipping container 10 and the horizontal partition 74 and a substantially vertical sidewall space 63, which can be defined, at least in part, by the interior of the shipping container 10 at the first sidewall 20 and the vertical partition 76.

The feed storage area 62, stated differently, can include both the substantially horizontal overhead space 61, which can be defined, at least in part, by the interior of the top 12 of the shipping container 10 and the horizontal partition 74 and a substantially vertical sidewall space 63, which can be defined, at least in part, by the interior of the shipping container 10 at the first sidewall 20 and the vertical partition 76.

In the illustrated embodiment the substantially vertical sidewall space 63 defined by the vertical partition 76 can include a trough 68 and a catwalk 70, while in another embodiment the vertical partition 76 can run the height of the shipping container 10 forming a sidewall space which can store hay or sacks of pelletized feed, or grains (See FIG. 4). In yet another embodiment, the horizontal partition 74 can include openings allowing livestock to access feed such as hay, stored in the substantially horizontal overhead space 61. While in another embodiment, the horizontal partition 74 can be a solid surface isolating the substantially horizontal overhead space 61 from the livestock. In this embodiment, feed can be moved periodically into the trough 68 in the substantially vertical sidewall space 63 of the feed storage area 64 for access by livestock. In another embodiment, the horizontal partition can be solid, but with a few cut away portions for moving hay or bedding into the livestock storage area from the substantially horizontal overhead space 61. In yet another embodiment, the horizontal partition 74 can include a railing around the edges in order to prevent items stowed above the livestock storage area 64 from falling during transit.

FIGS. 2A and B illustrate a crossbeam 78 that can provide stability between the vertical spaced members 79. The crossbeam 78 can be located at an elevation permitting livestock access to a trough 68. In another embodiment, a plurality of crossbeams 78 can prevent livestock from accessing certain portions of the substantially vertical sidewall space 63 of the feed storage area 64. The exception being a space left open near the bottom 14, for access to the trough 68. The spacing of any plurality of crossbeams 78 can provide enough room for livestock to access the trough 68 on the other side of the feed partition 66, while preventing livestock from reaching spaces that might be used by attendants.

The trough 68 can be located at the bottom 14 of the container 10 in the substantially vertical sidewall space 63 of the food storage area 64 and can remain accessible to livestock in the livestock storage area 62. The trough 68 can be filled with hay, grain, pelletized feed, or compressed hay and combinations or rotations thereof. The trough 68 can hold a specific volume of feed for periodically feeding the transported livestock in measured portions. In one embodiment, the trough 68 can be mounted along the first sidewall 20 or second sidewall 22, either directly to the sidewall or along the bottom 14 adjacent to the sidewall.

In one embodiment, the feed 72 can be separate from the livestock and distributed into the trough 68 in measured portions. Such portion control can help prevent excessive waste from being produced, which can adversely affect health of the confined livestock. In one non-limiting embodiment the feed 72 can comprise pelletized feed. The pelletized feed can be fortified with nutrients, antibiotics, antidiuretics, or the like, to help ensure the health of the livestock. Similarly, the livestock drinking water can be fortified with electrolytes in order to promote hydration. The feed 72 can be stored in the substantially horizontal overhead space 61, which can be loaded with enough feed 72 for between four and forty five days.

A catwalk 70 can be formed above the trough 68 generally on the exterior of the enclosure formed by the feed partition 66 in the substantially vertical sidewall space 63 of the feed storage area 64. The catwalk 70 can extend across a portion of the trough 68 or along the entire length of the trough 68. The catwalk 70 provides sufficient room for livestock to access feed in the trough 68 and can be sufficiently wide for an attendant to walk on, thereby providing access to feed located above the horizontal partition 74. Further, the catwalk 70 can be constructed from elongate members 75 spaced apart and secured to a frame. In one embodiment, the elongate members 75 can be spaced apart in a side-by-side relationship. The spacing of the elongate members 75 can allow grain or other feed to pass through into the trough 68 below while being poured from bags stored above the livestock storage area 62. In this way, an attendant can enter the interior storage space, separated from the livestock, reach feed stored above the enclosure of the feed partition 66, and transfer feed 72 into the trough 68, where the trough 68 is accessible by the livestock. This combination of a feed partition 66 and catwalk 70 provides an efficient use of space with improved safety for personnel, such as attendants responsible for feeding livestock.

In a non-limiting alternative embodiment, a catwalk 70 can comprise at least one plank supported on top of the trough 68, or suspended above the trough 68. The planks can comprise openings, such as holes or slots for the passage of feed into the trough 68. Other catwalk 70 configurations are contemplated for use herein, so long as the configuration is sturdy enough to support an attendant, with sufficient openings for filling a trough 68 from above. Regardless of the configuration of the openings in the catwalk 70, the openings can be configured to avoid feet, other body parts, or articles of clothing from becoming stuck.

Water bowls 80 can be placed adjacent to the trough 68, such that livestock can access water stored therein. Water bowls 80 can be placed at either end of the trough 68 as well as between two troughs. The water bowls 80 can be placed in any configuration to provide access to water for livestock in the shipping container 10. FIG. 2C, illustrates one embodiment, where the water bowls 80 comprise a first nose operated water bowl 80*a* and a second nose operated water bowl 80*b* placed on either side of a first trough 68*a*. A third nose operated water bowl 80*c* and a fourth nose operated water bowl 80*d* can be placed on either side of a second trough 68*b*, each along the first sidewall 20. A fifth nose operated water bowl 80*e* is illustrated on the opposite second sidewall 22. Nose operated water bowls can provide the benefit of a constantly available water supply, and can utilize a pressurized source of water. As described below, the shipping containers 10 can include water lines in series, in parallel or in a combination thereof. A pump can be utilized to pressurize water lines. The water bowls can also be operated with a float valve, which automatically retains a certain level of water in the bowl. In this way, livestock can always have water available, while keeping the majority of the water supply fresh and without recirculating exposed water. Other valves and livestock water delivery devices known to those in agriculture and livestock can also be incorporated herein.

Water troughs or other water containers can also be used in place of the water bowls 80. In a particular embodiment an external source of water serially supplies each bowl in a shipping container, while in another embodiment water can be stored within each shipping container and supplied to the water bowls therein. In another embodiment, brass fittings can be used to connect each water bowl to a waterline; preventing livestock from damaging the connection; however, the invention is not so limited, and PVC or other materials can be utilized for connecting the water supply.

In another embodiment, each shipping container 10 can include a water tank. For example, a water tank can be located inside the shipping container 10 which can contain about 100, about 200, about 400, or even up to about 1000 gallons of water. Smaller water tanks can be used to supply individual livestock or groups of livestock within the shipping container 10. Each of the water tanks, or even a bladder, can be filled prior to departure from a first port, or can be filled during the voyage from a water supply on the shipping vessel. A heating element can be coupled to the water tank in order to prevent water from freezing. The heating element can include a propane unit, a solar unit, or an electric unit. In another embodiment, the proximity of the livestock to the tank, and any water lines connected to the water tank, can provide body heat helping to prevent water from freezing in the water tank or in the water lines.

In order to maximize both the livestock storages area 62 and the feed storage area 64, the interior of the shipping container 10 can form the remaining sides of the livestock storage area 62. This feed partition 66 can be constructed from materials such as metal, tubular steel, tubular aluminum, wood, plastic or the like.

FIG. 2B provides a sectional view of the shipping container 10 highlighting a ventilation opening 40. This ventilation opening 40 permits air flow, which can vent away ammonia, carbon dioxide, and other gases produced by livestock or other sources during transport. The efficiency of the ventilation opening 40 can be increased with the use of a ventilation fan or multiple ventilation fans. The ventilation opening 40 while illustrated as a single opening is not intended to be limiting, and embodiments can provide a series of openings in the sidewalls of the shipping container 10. Regardless of the configuration of the ventilation opening 40, any openings in a shipping container 10 can be sufficiently reinforced to offset removed portions of the shipping container. Embodiments having a single continuous opening along one side of the shipping container can be reinforced accordingly with materials such as metallic tubing, aluminum or steel, plastics, or the like.

Two or more ventilation fans can be arranged to promote ventilation by providing more than one air flow path in the shipping container 10. Referring back to FIG. 1, a circulation fan or a first fan 34 is located opposite a second fan 36. In such an embodiment one can be configured to push air, while the other fan can be configured to pull air to achieve a desired exchange rate of air within the shipping container 10. In other embodiments, the fans can be located on the same side. Both fans can be configured to push air through the shipping container 10, or both fans can both be configured to pull air through the shipping container. In one embodiment, fans can be connected by a conduit, such as a plastic conduit, that has holes for evenly distributing airflow throughout a shipping container. External curtains or shutters, (as shown in FIG. 1) can be placed on the exterior of the ventilation opening 40 to adjustably prevent precipitation and other elements from disturbing livestock within the shipping container 10. At a minimum, the shutters can greatly reduce the exposure of livestock to the weather.

FIG. 2C provides a top view of the interior of the shipping container 10 which demonstrates the separation between the livestock storage area 62 and the feed storage area 64. The livestock storage area 62 can further be divided into a first compartment 112 and a second compartment 114 by an enclosure gate 110, which can be located midway between the opposing end walls. The enclosure gate 110 can serve to divide livestock in the livestock storage area 62 into to roughly equal groups for the purpose of weight distribution and feed distribution within the shipping container 10 and can further provide a more predicable center of gravity of lifting the shipping container 10. The weight of some livestock in combination with the motion of the open sea provides an incentive to provide secure latches on the enclosure gate 110, as heavy livestock can generate significant momentum in response to the motion of a shipping vessel. In one embodiment a plurality of enclosure gates can be incorporated to partition the livestock in numerous spaces. For example, the livestock can be partitioned into individual spaces. The enclosure gate 110 can be hinged at either the second sidewall 22 or at an interior portion of the feed partition 66. Alternatively, the enclosure gate 110 can be provided on its own frame. The enclosure gate 110 can further include a cut away portion for the fifth nose operated water bowl 80e, so livestock in both the first compartment 112 and the second compartment 114 can access a common water bowl 80e.

Feed partition 66 can have a vertical partition 76 adjacent and generally parallel to the first trough 68a and second trough 68b, as well as first sidewall 20 and second sidewall 22. The feed storage area 64 can be widened towards the front wall 16 in order to accommodate a personnel opening 38 (seen in FIG. 1). Widening portion 108 can about the front wall 16, but generally still permit the opening and closing of the cargo gate doors, or the widening portion 108 can be separated from the front wall 16 by space. Generally, if the widening portion 108 is included, any gap can be configured to be smaller than any livestock carried in the first compartment 112. In this way, personnel, such as attendants, can enter the shipping container 10, access the catwalk 70 above the trough 68 in substantially vertical sidewall space 63 between the first sidewall 20 and the feed partition 66 in order to access feed stored above the livestock storage area 62 for filling troughs 68a and 68b. In one embodiment, the widening portion 108 can be angled relative to the vertical partition 76. In another embodiment, the widening portion 108 can be omitted and the vertical partition 76 can be extended slightly further than illustrated. In another embodiment, the widening portion 108 can be a gate hinged to the feed partition 66 or hinged to an additional structure provided in the vicinity of the widening portion 108.

Now referring primarily to the embodiment illustrated in FIG. 2C, a first water bowl 80a and a second water bowl 80b are located on opposite sides of the first trough 68a and are accessible to livestock when occupying the first compartment 112 of the livestock storage area 62. Third and fourth water bowls 80c and 80d can be similarly located on opposite ends of the second trough 68b accessible to animals in the second compartment 114 of the livestock storage area 62. A fifth water bowl 80e can be located in an opening in the enclosure gate 110 allowing access from both the first and the second compartments. Other configurations of water bowls are contemplated for use with embodiments herein. For example, the second and third water bowls 80b and 80c could be replaced with a single water bowl accessible from each of the first compartment and the second compartment. Similarly, additional water bowls are contemplated herein, such as six, eight, ten, or more water bowls. The water bowls can be supplied in series and can be fitted with brass or metal connectors, although the invention is not so limited.

FIG. 2D illustrates a perspective view of the shipping container 10, in certain respects providing a more detailed view of a particular embodiment of the feed partition 66, however, the feed partition 66 can be constructed in any number of configurations. In one aspect, the feed partition 66 provides sufficient separation between the livestock storage area 62 and the feed storage area 64 with sufficient access to the trough 68 from the livestock storage area 62. The illustrated embodiment provides an area for the livestock separated from an area for the trough 68. The feed partition 66 creating these areas within the shipping container can be constructed of tubular metal such as steel or aluminum in a pen like configuration within the shipping container 10; however the invention is not so limited, and other materials and configurations can be utilized. Crossbeam 78 can be omitted, as shown in figure, FIG. 2D, however, any number of crossbeams could be used to both reinforce the feed partition 66 and limit the access of livestock into other compartments.

Front wall 16 can have a personnel opening 38 (as shown in FIG. 1) to the exterior of the shipping container 10. This personnel opening 30 can serve as an entrance for attendants responsible for filling the trough 68 by providing direct access to the feed storage area 64. Vertical partition 76 can provide support for horizontal partition 74. The horizontal partition 74 can comprise a metal or wood framework in combination with a surface such as plywood. While the horizontal partition 74 can extend all the way to the vertical partition 76, the horizontal partition 74 may also be constructed with cut away sections. The cut away sections can be located directly over the livestock storage area 62, so bedding can be stored on the horizontal partition 74 and subsequently dropped directly into the livestock storage area 62. Plywood, or another flat solid material, can prevent livestock from accessing the feed stored overhead.

Separating livestock in the livestock storage area 62 can help ensure the even distribution of feed, as well at the even distribution of weight within the shipping container 10. Depending on the size of the shipping container 10 and on the type of livestock, multiple gates can be included. The enclosure gate 110 provides a means for ensuring a more even distribution of livestock for feeding purposes and for weight distribution. In particular, some embodiments described herein relate to feeding livestock measured portions in order to reduce the amount of wasted produced during shipment. As such, an uneven distribution of livestock within a single container may result in some livestock receiving less nourishment than intended. Additionally, given that livestock, such as cattle, can easily weigh over a thousand pounds apiece, and that a shipping container can hold roughly sixteen cattle, the weight distribution on a shipping container can easily be thrown off balance by the movement of a few animals. The uneven, or unpredictable, distribution of weight can be problematic for loading these shipping containers onto the shipping vessels depending on the type of mechanism used for lifting. Even a single enclosure gate 110 goes a long way to balance the weight of the livestock by ensuring that each half of the container has roughly the same weight of livestock.

In one non-limiting embodiment each animal is provided with its own individual gated area. In another embodiment, side doors can be provided in addition to the cargo gate 24. Side doors can provide a means for loading individual livestock into the shipping container 10. In an alternative embodiment livestock can be individually partitioned in a shipping container 10 having multiple side doors. By way of an example, each animal could have an individual partitioned space with its own gate to the exterior of the shipping container 10. The enclosure gate 110 can also be used to separate sick livestock to provide them with more space or easier access for treatment, but also provides a health benefit to the remaining healthy animals.

Figure 3:
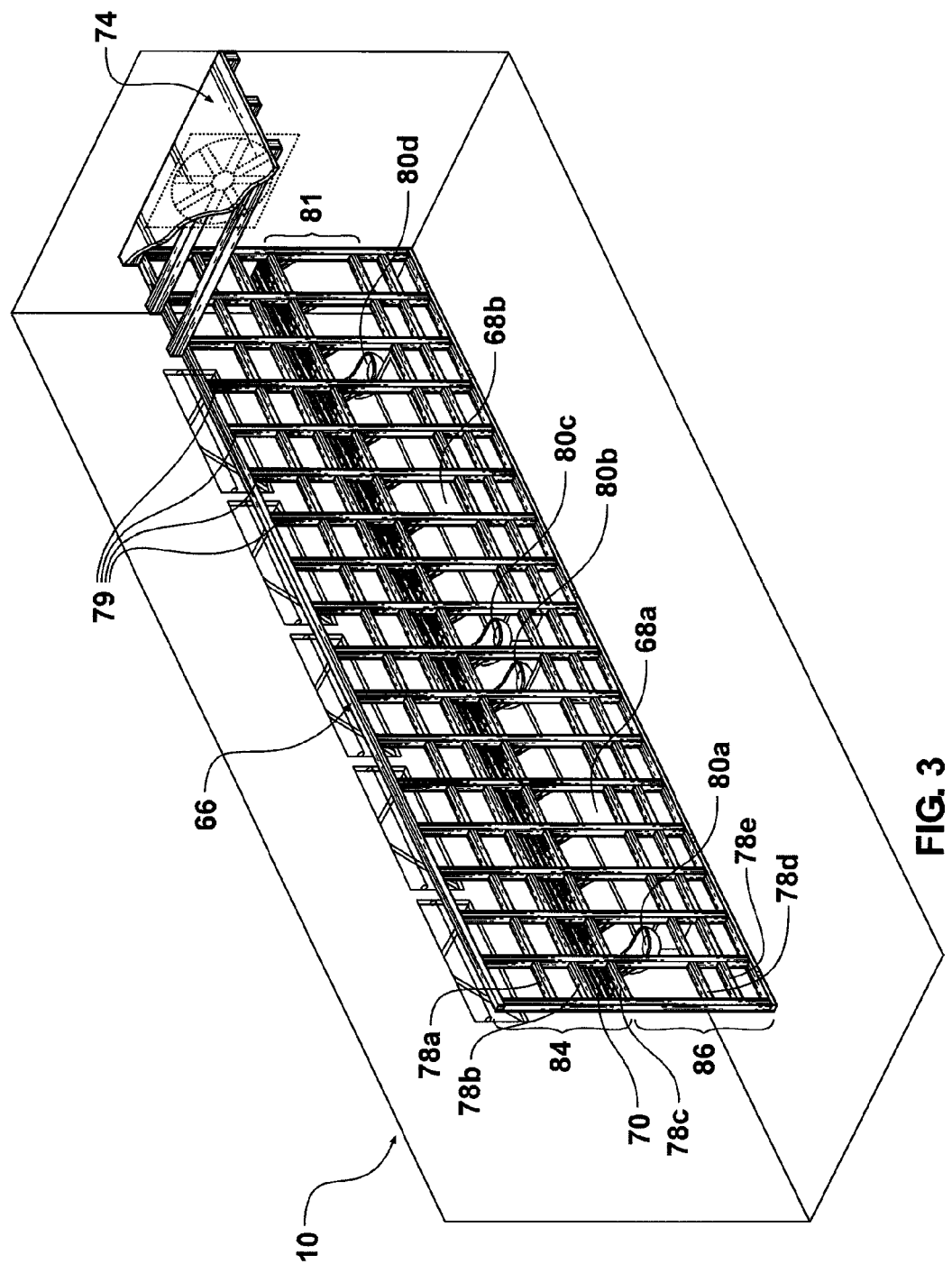
FIG. 3 illustrates an internal isometric view of a shipping container in accordance with certain aspects the present invention.

FIG. 3 illustrates a more detailed isometric view of an embodiment whereby similar elements previously described are illustrated with the same reference numbers. In this isometric view, the horizontal partition 74 is broken away in order to provide a better view of the feed partition 66 including the pieces making up the vertical partition 76. The vertical partition 66 can generally be seen within a shipping container 60, separating a livestock storage area 62 from a feed storage area 64. The vertical partition 76 is illustrated along a vertical axis, but the vertical partition 76 can be tilted between about 1 and 20 degrees off the vertical axis, in order to provide more floor space to livestock and more room for retrieving feed above the feed partition 66. Similarly, the horizontal partition 74 can be slanted to promote gravity feeding into the substantially vertical sidewall space 63. As such, the substantially vertical sidewall space the substantially horizontal overhead space should be understood to include partitions slanted up to 20 degrees off the vertical and horizontal respectively.

A first trough 68*a* and second trough 68*b* can be seen along with a first, second, third, and forth nose operated water bowl. The vertical partition 76 can more clearly be seen as a collection of vertical spaced members 79 and crossbeams 78. The crossbeams 78 are specifically illustrated as a first crossbeam 78*a*, a second crossbeam 78*b*, and a third crossbeam 78*c*, a fourth crossbeam 78*d*, and a fifth crossbeam 78*e*. In one embodiment, the feed partition 66 can be viewed as an upper portion 84 from about the third crossbeam 78*c* upwards and as a lower portion 86 from about the third crossbar 78*c* downward. In one non-limiting embodiment, the distinction between the upper portion 84 and the lower portion 86 can be either in about the center of the vertical partition 76, or can be at the height of the catwalk 70.

As previously described, each of the vertical spaced members 79 can provide sufficient spacing for livestock to access the first trough 68*a* and the second trough 86*b* in the substantially vertical sidewall space 63 of the feed storage area 64. FIG. 3 further illustrates lower portion 86 having the third crossbeam 78*c* and the fourth crossbeam 78*d* sufficiently vertically spaced to enable livestock, such as bovine, to access each of the troughs 68 in a feed space opening 81. The lower portion 86 can be configured in any number of ways so long as feed space openings 81 exist in the vertical partition 76 through which livestock can access the troughs 68. The feed space openings 81 can be coordinated in size and spacing according to the livestock being transported helping to ensure measured portions of feed can be accessed by livestock. In one embodiment, the vertical spaced members 79 can be slidably adjustable within the feed partition 66 and lockable into different configurations. In this way feed partition 66 can be reconfigured, or customized, for the specific species of livestock being transported.

The upper portion 84 provides smaller spacing between the first crossbeam 78*a* and the second crossbeam 78*b* as compared to the third crossbeam 78*c* and the fourth crossbeam 78*d* and can serve to protect personnel, such as attendants, on the catwalk 70 from livestock in the livestock storage area 62. Other configurations are contemplated for use herein. For example, the first crossbeam 78*a* and the second crossbeam 78*b*, as well as the vertical spaced members 79 in the upper portion 84 can be replaced with diagonal members, just vertical members, just horizontal members, or any combination thereof. The upper portion 84 could be replaced with a solid material, such as plywood or sheet metal, or with a mesh or chain link, or an appropriate combination thereof. In another embodiment, regardless of the material used, the upper portion 84 can contain additional openings which can allow attendants to access the livestock storage area 62 from selected locations on the catwalk 70.

In an alternative non-limiting embodiment, the feed partition 66 can be provided with a mechanical or automated means for actuating feed 72, such as pellets or gain, from the substantially horizontal overhead space 61 of the feed storage area 64 into the trough 68 in the substantially vertical sidewall space 63 of the feed storage area 64. As one example, a mechanical lever can be operatively connected to a mechanism for gravity feeding the trough 68 from the substantially horizontal overhead space 61, or for releasing feed 72 from the substantially horizontal overhead space 61. The mechanism can include an auger along the length of the substantially horizontal overhead space 61, wherein the auger can be dimensioned to pick up feed or pellets as it turns and drop the feed or pellets from the substantially horizontal overhead space 61 into the feed trough below. The auger can include a manual means for actuation or an automated means for actuation.

In another non-limiting embodiment, the first 20 or the second 22 sidewall of the shipping container 10 can include a plurality of doors. Additional internal partitions can be included on the interior of the container corresponding to these doors for creating a plurality of smaller, or even individual, livestock storage spaces. Such an embodiment would permit loading and unloading containers by individual animal, or by small groups of animals, and may be desirable if more than one type on animal is loaded on one container, or for shipping containers to be loaded or unloaded at more than one location.

Other embodiments can relate to increasing the efficiency of the shipment process. For example, in one embodiment, the livestock can be shipped with milking machines. In another embodiment, the process of identifying the livestock can be improved by the inclusion of radio frequency identification tags ("RFID tag"), thereby reducing down time at ports or other locations where livestock must be inventoried by allowing animals to be identified from the exterior of the shipping container. RFID tags 440 (seen in FIG. 9) used in conjunction with a detector and software can provide information about livestock thereby speeding up, loading times, unloading times, and any checks that might be run at various stages of the trip. In order to facilitate the use of RFID tags, additional hardware and software can be installed in the control box 30 (seen in FIG. 1A) including at least a radio frequency transceiver, for both detecting RFID tags 440 (seen in FIG. 9) on the livestock within the shipping container 10 and for transmitting container specific information to second location.

Figure 4B:
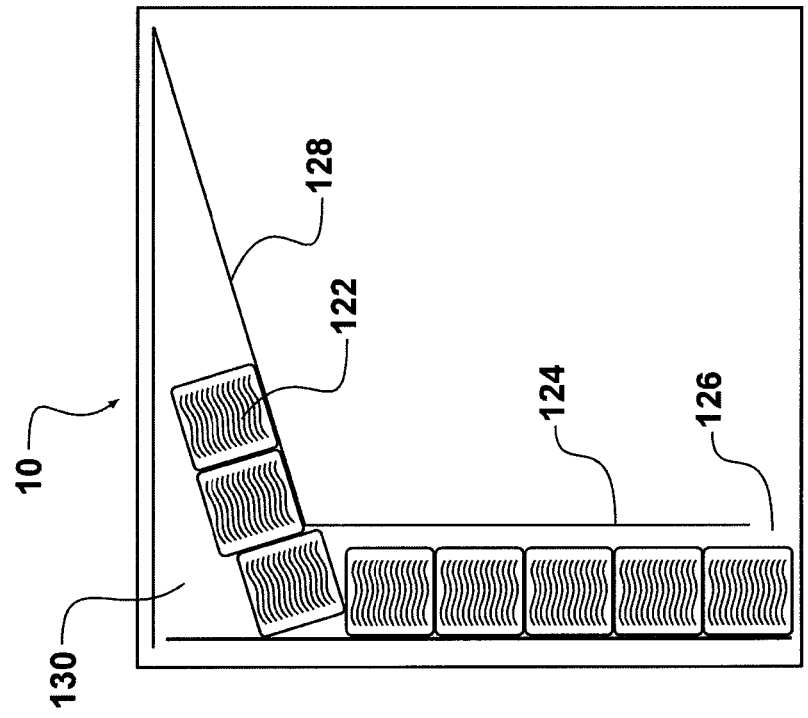
FIG. 4A-B illustrate cross sectional views in accordance with certain aspects of the present invention.
Figure 4A:
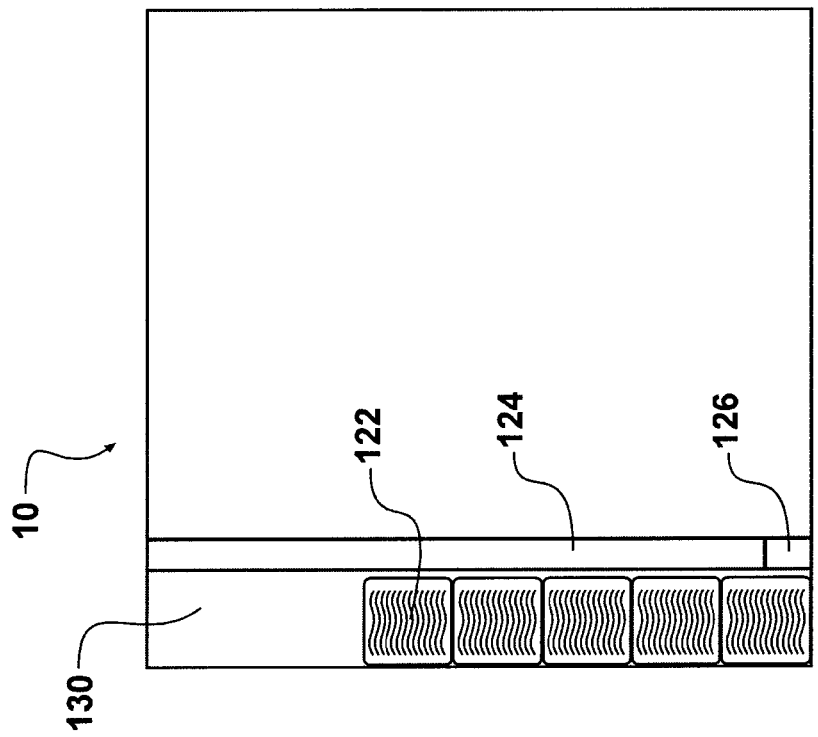

FIG. 4A illustrates an alternative embodiment where feed in a shipping container 10, such as hay or compressed hay 122, can be stored along an interior wall 124, similar to the vertical partition previously described, in a sidewall storage space 130. Like the vertical partition, the interior wall 124 can have a feed space opening 126 towards the bottom permitting livestock to feed from hay gravity fed to that area. In one embodiment the entire interior wall 124 can provide openings for livestock to feed on the hay or compressed hay. For example, the interior wall 124 can be constructed from a ladder like configuration of metallic members providing access to the sidewall storage space 130 along the entire length of the interior wall 124. The members can be spaced to permit livestock to access the feed and a wide variety of materials can be in their construction. In one embodiment the interior wall 124 can be constructed from a relatively solid material, the hay can be locked into position allowing the periodic release of measured portions of hay into the feed space opening 126.

In a similar embodiment, a first stop can be formed in the interior sidewall space to prevent the gravity feeding of pellets, grain or hay into the area accessible by livestock. A second stop can be configured for releasing a measured amount of feed for release by the first stop. In one non-limiting embodiment with pelletized feed, the stops can be valves for releasing measured amounts of feed. The valves can be mechanically or remotely actuated.

FIG. 4B illustrates an embodiment with horizontal component, similar to the horizontal partition, in the form of a slanted ceiling 128 for storing a larger volume of feed such as hay, similar to a horizontal partition discussed with other embodiments. The slope of the ceiling can be adjusted so gravity urges hay or compressed hay 122 towards the storage area as the accessible hay is consumed. A further embodiment is envisioned where feed such as hay can be stored on the floor.

Figure 5B:
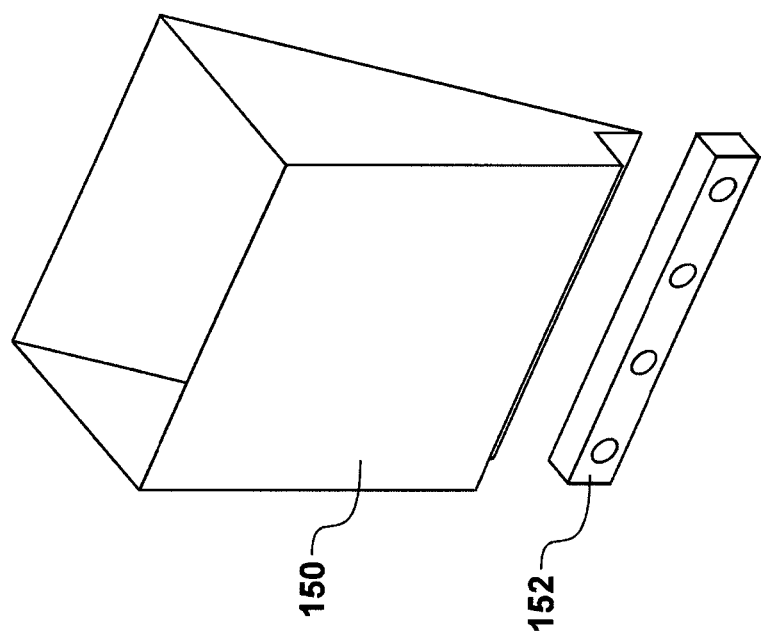
FIG. 5A-B illustrates a hopper in accordance with certain aspects of the present invention.
Figure 5A:
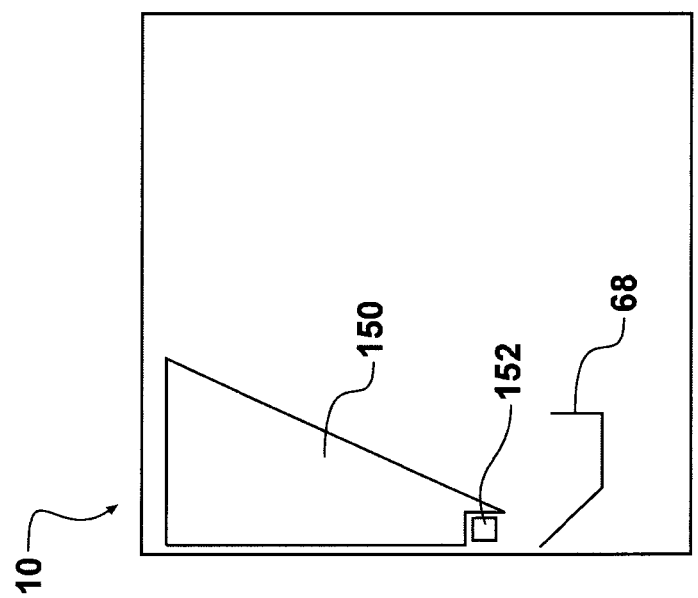

FIGS. 5A and B illustrate a non-limiting embodiment of the shipping container 10 comprising a hopper 150. The hopper 150 can be located with a trough 68 on the exterior of a feed partition 66, as illustrated in FIG. 2A-C. The primary difference in the embodiment of FIG. 5 is the inclusion of pelletized feed or grain in a hopper 150 for gravity feeding into the trough 68. In the depicted embodiment, feed can be released without necessitating an attendant accessing feed 72 stored above the livestock storage area. Instead, feed can be store in a hopper for a measured delivery. Feed from the hopper can be released manually or automatically. As one example, the release of feed from the hopper 150 can be regulated by a stopper 152 in the form of an adjustable cover. The stopper 152 can include a plurality of openings which can align with openings in the hopper 150 for releasing feed into the trough. The stopper 152 can be manually manipulated into an open position for releasing feed, or can be actuated by a timer 25 (Seen in FIG. 1). In one embodiment, the hopper 150 can be fitted with a servo motor on a timer for releasing measured amounts of feed at regular intervals. This embodiment can provide for a more automated method of feeding livestock during a long shipment. FIG. 5B illustrates but one embodiment of a hopper 150 for use with the shipping containers, however, other hopper designs and configurations are contemplated for use in conjunction with the other features of the shipping containers presented herein. For example, the hopper 150 can be replaced with a gravity feed feeder, or with a volumetric feeder, which permits a designated amount of feed to pass hourly. Similarly, auger feeders can be used in conjunction with the embodiments presented herein.

In one non-limiting embodiment, the hopper 150 further comprises a timing mechanism for releasing predetermined amounts of feed at predetermined intervals. For example, a timer and an actuating arm can be used wherein the actuating arm is adjusted at predetermined intervals for moving the adjustable cover in order to allow feed to pass through the outlet of the feed holding container. Alternatively, hoppers and augers, such as those available from Auger Feeders, of Westchester Pa., US can be used.

In still another embodiment, an automated system can include a scanner for scanning, bar codes, RFID tags or other indicators with each animal. A predetermined amount of feed can be released for livestock per hour as the animal attempts to access the feed trough and is identified. In this manner, feed can be conserved and each animal is provided an improved opportunity with the available feed.

Certain aspects contained herein relate to the sharing of common resources between at least two shipping containers, and particularly multiple shipping containers for shipping livestock. For example, a common source of drinking water and/or electricity can be provided to an array of livestock shipping containers. In one embodiment, the common resource comprises fresh drinking water delivered to a plurality of shipping containers through a water delivery system. In order to achieve this system, shipping containers can be configured into an array of containers or multiple arrays of containers, whereby a pressurized water source continuously supplies each of the connected shipping containers within the array or multiple arrays. Such a system can include a water source connected to a pressure source for pressurizing the water in a delivery line to the shipping containers.

The water source of the water delivery system can include a modified ballast tank of the shipping vessel or other water tanks brought aboard the shipping vessel, such as a liquid shipping container, a container housing a plastic tank, or a container housing a bladder. In order for the ballast tank of a shipping vessel to be used as a source of drinking water, the ballast tank must be pressure washed to remove contaminants and microorganisms present in the previous ballast water. Optionally, the interior of the ballast tank can be coated or painted in order to further maintain the purity of fresh drinking water. New ballast water can then be added at a port in the form of fresh water to any embodiment of the water tank. In another aspect plastic tanks or bladders pre-filled with drinking water can be loaded into shipping containers. These tanks and bladders can be secured within shipping containers to prevent damage. In yet another aspect, liquid shipping containers can be filled with water and loaded along with the other shipping containers.

The pressure source of the water delivery system can be a ballast pump in communication with the ballast tank for pumping the water to either a deck, to individual shipping containers, or to an intermediate water tank. An intermediate water tank can be stored on the same level as, or above, the shipping containers for supplying the shipping containers with water or for circulating water through the shipping containers. The intermediate water tank can be stored within a shipping container, or may comprise a bladder stored within a shipping container. In another embodiment, the pressure source can comprises a circulation pump in communication with a liquid shipping container, or a water tank or bladder housed in a shipping container. In one embodiment, where the pump is electrically powered, a second back up source of power can be provided so as to keep the pump active in the event the primary source of power is lost during shipment. In another embodiment, a second pump can be provided for redundancy in case the first pump is lost or damaged during transport.

A delivery line can then supply water to the at least two shipping containers in the array of shipping containers. The delivery line can run to the at least two shipping containers in parallel or in series. The delivery line can connect directly to piping or hoses within shipping containers or can be connected through supply lines with a shut off valves. The delivery line can include a single delivery line for supplying a plurality of shipping containers, or the delivery line can comprise a number of lines which each supply single shipping containers or groups of shipping containers. The delivery lines can include, or be branched into, one or more supply lines. The supply lines can each include shut off valves allowing for water to be cut off to one particular shipping container in the event of a leak, while the water supply continues uninterrupted to the remaining shipping containers. The delivery lines can be constructed from cross linked polyethylene tubing, polypropylene, or from other corrosion resistant polymers and polymers with a relatively low glass transition temperature so they retain their flexibility at or below freezing temperatures. Other corrosion resistant and freeze resistant materials known for circulating water are also contemplated for use herein.

In one aspect the delivery lines can connect to individual shipping containers through supply lines, which can either be connected the shipping container in series or in parallel. Each of the supply lines can be connected through a shut off valve. In this way, shipping containers presenting leaks or other problems can individually be shut off while the leaks are fixed. The supply lines can be connected to individual shipping containers or can supply groups of shipping containers, such as rows of shipping containers.

Figure 6:
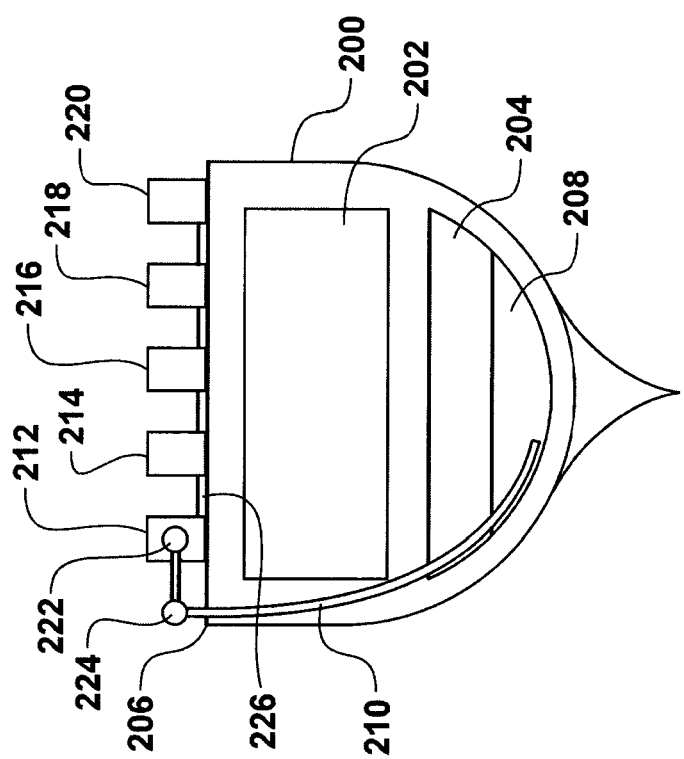
FIG. 6 illustrates a diagram of a system of shipping containers on a shipping vessel in accordance with certain aspects of the present invention.

Turning now to FIG. 6, which is a schematic representation that illustrates an embodiment of a water delivery system on board a shipping vessel 200. The shipping vessel 200 is illustrated with a hull 202 and a ballast tank 204 filled partially with ballast water 208. In this particular embodiment, the ballast tank 204 comprises the water source. In order to use ballast water 208 as suitable drinking water, the ballast tanks 204 must be cleaned and filled with fresh water. Typically, ballast tanks 204 are filled with seawater when in port and this will not provide suitable drinking water. The pressure source is illustrated as a ballast pump 224 connected to a water line 210 for pumping ballast water 208 to the surface 206 of the shipping vessel 200. Once at the surface 206, ballast water 208 can be pumped to a first shipping container 212 having an intermediate water tank 222. In other embodiments, the intermediate tank can comprise the water source and can be loaded onto the shipping vessel filled with a quantity of water. From there, a delivery line 226 delivers water to each of a second shipping container 214, a third shipping container 216 and a fourth shipping container 218 and a fifth shipping container 220. The second container 214 and each subsequent container can be livestock containers, like those previously described.

FIG. 7A illustrates one arrangement of shipping containers in an array of columns and rows whereby the ballast pump 224 can supply a plurality of supply lines 230 in parallel through a single delivery line 226, including a first shipping container 212, which may include a water tank or a water bladder. Optionally, a return line 232 can connect back to the first shipping container 212 creating a closed circuit. The closed circuit created by the return line 232 allows water to be continuously circulated through the delivery line 226. Continuously circulating water in this fashion provides an advantage by helping to prevent water from freezing and damaging the water lines.

FIG. 7B illustrates an embodiment where a manifold 228 enables multiple delivery lines 226 from the first shipping container 212, one for each illustrated row of shipping containers. Each delivery line 226 still has parallel supply lines 230 for each shipping container in the respective rows. The number of shipping containers in a row is not limited to four, as illustrated, but will be a function of the space available on a shipping vessel for shipping containers. Similarly, the numbers of rows are not limited to three, but any number of rows suitable for shipping can be employed. A manifold 228, or a series of manifolds, can be used to divide a delivery line 226 into groups of parallel delivery lines. In one aspect, manifold 228 can be used in place of, or in conjunction with, the intermediate water storage tank 222. In one aspect, the first pump can provide pressurized water from the water source, such as the ballast tank or liquid shipping container, to the manifold which can subsequently delivery water through a plurality of delivery lines to individual shipping containers or groups of shipping containers. Shut off valves 231 are illustrated with one row of shipping containers, but they can be used with each shipping container, or at each manifold in the event of multiple manifolds. In another aspect, water can be pumped to the intermediate water tank then through the manifold for splitting into a plurality of delivery lines.

FIG. 7C illustrates an alternative embodiment, where each of the each shipping containers, including the first shipping container 212, can be supplied in series with a single delivery line 226. This embodiment can include a return line for continuously circulating pressurized water in the delivery line and a pump for supplying water or for continuously circulating water.

FIG. 8A relates to a schematic representation of the water delivery system in accordance with particular embodiments of the present invention. The ballast tank 312 can be filled with fresh water prior to shipment. The ballast tank 312 can include the ballast tank of a shipping vessel as well as a liquid shipping container, such as those used for shipping liquids. In order to ensure the fresh water is not contaminated, previous water can be drained from the ballast tank 312 and the interior of the tank can be pressure washed. In some embodiments, the interior of the ballast tank can be painted or repainted after a certain number of uses or at specified intervals of time. Fresh water can be drawn from the ballast tank 312 through a ballast pump 318. A filter or a filtration system 320 can be connected to the ballast tank 312, to help ensure metals, sediment, debris, microorganisms, and other potential health threats are removed from the drinking water. The water filtration system 320 can comprise a single stage, or multiple stage system which can be selected from: carbon filters, reverse osmosis, a distiller, an alkaline water machine, ultraviolet light, and other known water filters and filtering devices. In an alternative embodiment, such a system can be located within, or in line with, each shipping container to which water is supplied. This can be done in addition to, or in lieu of, illustrated filtration system 320.

After passing through the filtration system 320, water can be passed to the intermediate tank 310. The intermediate tank 310 can be contained within a standard shipping container. Such a tank can include a rigid plastic water tank, or a bladder. The water tank can hold thousands to tens of thousands of gallons of water. A bladder can be a flexible, expandable pouch which remains flat until filled with water. Each bladder or the rigid plastic container can be secured within the shipping container to prevent movement. Rocking of the shipping vessel at sea can put a great deal of stress on the rigid plastic container and the forces generated by water sloshing around within a shipping container can cause damage to the shipping container so care should be taken to secure these shipping containers. The intermediate water tank 310 can also be shipping container designed for liquids.

The intermediate tank 310 can be loaded onto the shipping vessel filled with drinking water thereby bypassing the need for the ballast pump and for storing drinking water in the ballast tank. In one embodiment, shipping containers with plastic tanks or bladders are loaded onto the shipping vessel filled with drinking water. Similarly, in another aspect, liquid shipping containers 340 can be cleaned and filled with drinking water for supplying drinking water to each of the shipping containers housing livestock. The number of tanks or containers will vary based upon the number and size of livestock, the weather conditions, and the duration of transport. Livestock, cattle specifically, consume roughly between about 5-20 gallons of water per animal per day. Therefore, the number of required tanks can be determined based upon the number of livestock and on the expected duration of the shipment.

The ballast pump 318 can be run continuously or can be automatically or manually activated based on the water level of the intermediate tank 310. Circulation pump 316 can draw water out of the intermediate tank 310 for supplying one or more shipping containers 314. The one or more shipping containers 314 are represented as single block but should be understood to include multiple shipping containers supplied in series by a single pressurized line, multiple shipping containers supplied in parallel by multiple pressurized lines, or multiple shipping containers supplied by a combination of lines in parallel and in series. The shipping containers 314 can be any of those previously described. Regardless of the exact configuration with which shipping containers are supplied, a return line 322 can connect back to the intermediate tank 310. The return line 322 allows water to be continuously run through the pressurized lines.

FIG. 8B illustrates an alternative embodiment where similar parts receive the same numbers as in FIG. 8A. In FIG. 8B, a ballast pump 318 draws drinking water from the ballast tank 312 through a filtration system and directly into delivery line 326 and to a tank 330 which can be contained in a shipping container with livestock. Delivery line 326 can supply a plurality of tanks 330 within a plurality of shipping containers in series. Individual tanks can them be filled by running the ballast pump 318 and opening a valve at the desired tank 330. FIG. 8B illustrates an alternative embodiment where a manifold 328 splits the delivery line 326 into at least a second delivery line 336 and a third delivery line 338. The second delivery line 336 is illustrated supplying a second tank 332, which should be understood to include a second plurality of tanks supplied in series or in parallel. Similarly, a third delivery line 338 is illustrated supplying a third tank 334, which should be understood to include a single tank or a plurality of tanks supplied in series or in parallel.

It should be appreciated the manifold 328 can have more than two extra branches. For example, the manifold 328 can be used to supply as many as sixteen delivery lines. Further, additional manifolds can be used in order to further split the water delivery lines dependent upon the arrangement of contains on a shipping vessel, as many manifolds can be used as needed to supply each shipping container with its own tank.

FIG. 8C illustrates an embodiment where drinking water is not supplied from a ballast tank, but is supplied from a liquid shipping container 340, which can be loaded onto the vessel pre-filled with drinking water. Liquid shipping containers 340 are available from a number of manufactures including WEW Westerwälder Eisenwerk GmbH, of Weitefeild Germany. Such a liquid shipping container 340 can be loaded onto the surface of a shipping vessel or in the hull of a shipping vessel storing a predetermined amount of drinking water. While reference is made to a specific type of container, it should be appreciated a variety of shipping containers can house a variety of water tanks or bladders for the same purpose. The number of liquid shipping containers 340 that might be used on a particular trip can depend upon the capacity of the liquid shipping containers, the duration of the trip, and the volume of water required by the livestock per day. It should be understood, the shipping containers 314 are a schematic representation of a plurality of shipping containers which can be configured as an array of shipping containers 314 supplied water in series, in parallel, or in some combination thereof. Multiple arrays of shipping containers can be placed on the deck or in the hull of a shipping vessel, and each array can include one or more liquid shipping containers 340.

In the illustrated embodiment, a circulation pump 316 directs water to the shipping containers 314. As previously described, the shipping containers 314 can be arranged in any number of configurations or arrays. Water can be supplied to smaller tanks within each shipping container or can be supplied to pressurized water lines connected to nose operated water bowls. Each of these embodiments can include a return line 322. In one embodiment, purification units, or filters, can be provided with the liquid shipping container 340, or in the water lines connecting the shipping containers 314 to the liquid shipping containers 340.

Some embodiments described herein relate to a system of shipping containers, or arrays of shipping containers, which share common resources, such as a common supply of drinking water and a common supply of electrical power, which may interchangeably be referred to as a first common resource and a second common resource. The common supply of drinking water can be achieved through any of the systems previously described.

Figure 9:
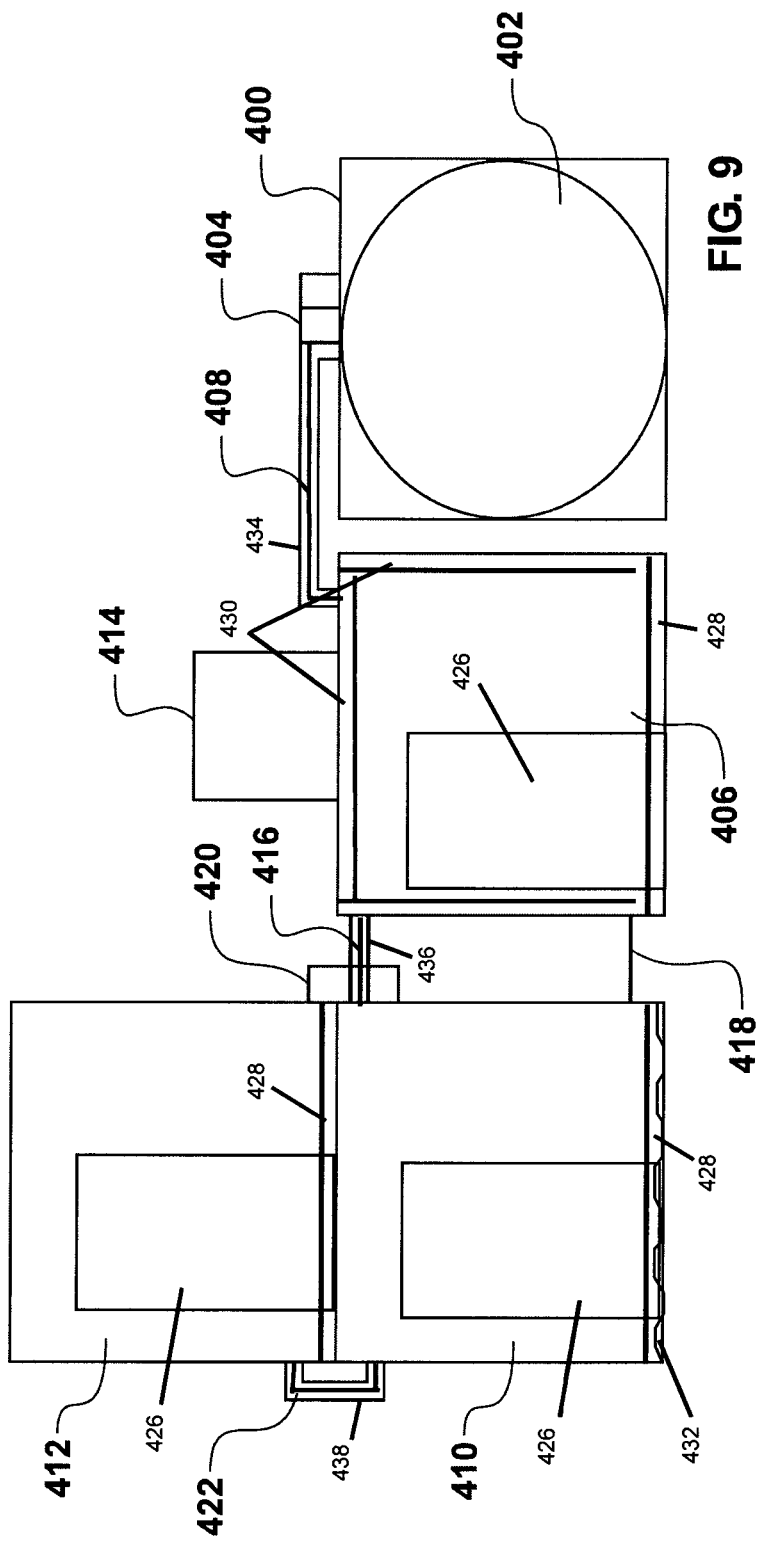
FIG. 9 illustrates an arrangement of shipping containers on a shipping vessel in accordance with certain aspects of the present invention.

FIG. 9 illustrates an example of multiple shipping containers interconnected to share both the common sources of water, such as drinking water, and electricity, or electrical power. Container 400 can be a water container housing a water tank 402 and a water pump 404 for supplying water to the remaining shipping containers. Each of a first container 406, second container 410, and a third container 412 are illustrated with a schematic representation of livestock 426. By way of an example, the water container 400 can be directly linked to a first container 406 through a pipe or a hose 408. The first pipe or hose 408 is illustrated with an insulating material 434 to help prevent water from freezing. Any suitable plumbing or piping known to those of ordinary skill in the art can also be used. Any water connections can further be heated with heating coils to prevent problems with water supply to the livestock. Pipes external to the shipping containers can be insulated by tape, a coating or sheath, as well as, constructed from cross-linked polymers, such as cross linked polyethylene to prevent freezing and associated disruptions to the water supply. In the alternative to a water tank, water can be supplied from the water ballast tank of the shipping vessel. In the event water is used from the ballast tank, it must be processed or purified in order to remove salt, sediment, and/or microorganisms before being supplied to the livestock as drinking water.

Water can also be stored internally with each shipping container. Water can be stored in a large tank, in a bladder, or in several smaller tanks. The amount of water in each tank should be sufficient for the number of livestock supplied by each tank and the length of the voyage. Those in the livestock industry can further appreciate the water needs of individual animals can vary with the weight of the livestock, as well as with the temperature and weather exposure of the livestock. Each of these factors should be considered when providing an external water source to the shipping containers, or internal water sources to the shipping containers.

A generator 414 can be located on top of the first shipping container 406 and can be connected at an electrical panel as previously described. In the alternative, the first shipping container 406 can be supplied power from a source on the shipping vessel. The power can be networked in series, in parallel, or in a combination thereof to each of the remaining shipping containers. In an alternative embodiment, power can be supplied from the shipping vessel, eliminating the need for the generator 414. In such an embodiment, the container 400 can be a utility container including each of the water tank 402, a transformer for stepping down power received from the shipping vessel, and pumps for circulating water from the water tank 402.

The first shipping container 406 is illustrated with a layer of padding 430 on the interior walls. The padding 430 can serve to protect livestock 426 within the container 406 from impacting metallic walls pipes and connections through transport. An absorbent bedding layer 428 is also illustrated within the containers for absorbing waste produced by livestock 426 in transit. The absorbing bedding layer 428 can be constructed from any of saw dust, wood shavings, pine chips, rice chips, hay, straw, powder, combinations thereof, and layers thereof.

The second shipping container 410 can be located in horizontal relationship to the first shipping container 406, as illustrated in FIG. 9. The second shipping container 410 can be supplied with electricity by an electrical connection 418 to the first shipping container 406 and can be supplied with water from the first shipping container 406 through a waterline 416. The waterline 416 can be a pipe or hose constructed from a galvanized metal or a polymer or rubber. The waterline 416 can be covered with an insulating material 436, or can be configured with a heating means, such as a heating coil, or an insulating layer. In the alternative, the water can be heated in order to prevent the formation of ice. Alternatively, the second shipping container 410 can be supplied with water and electricity in parallel with the first shipping container 406. The second shipping container 410 can include a traction surface 432 to help provide livestock with sturdy footholds in the shipping containers. The traction surface 432 can include a corrugated surface, a metal or rubber mesh, or other surfaces including bars, crossbars, or half bars on the floor.

A third shipping container 412 is illustrated in a vertical relationship to the second shipping container 410. In one aspect the third shipping container 412 should include a liquid tight seal beneath the absorbent bedding layer 428 to prevent waste from leaking into the second shipping container 410. By way of a non-limiting example, a plastic layer can be placed under the absorbent bedding layer for the purpose retaining fluids. In the alternative, a drain pan can be implemented for the controlled draining of waste materials. The third shipping container 412 can be connected to the second shipping container 410 by a hose 420, and by an electrical connection 418, but can also be supplied in water and/or electricity in parallel with the first and the second shipping containers. The hose 420 can be supplied within an insulating material 438 to help prevent water from freezing. The livestock 426 illustrated in the third contained is illustrated with an RFID tag 440, or radio frequency identification tag 440. It should be appreciated each livestock 426 can similarly include a tag.

The configuration illustrated in FIG. 9 serves as an example, and various arrangements of water delivery systems disclosed herein are contemplated for use with various electrical systems disclosed herein for supplying arrays of containers with multiple resources.

Each shipping container can include a number of electrical devices requiring a supply of electric power. These devices can include, but are not limited to internal lights, heating devices, cooling devices, and fans. Each electrical device can require 440, 220, 110, or any other standard voltage to operate. Cargo vessels, on the other hand, tend to generate power at 440 volts and most electrical devices may not be adapted for use with such a high voltage. Some electrical devices, such as certain fans, can operate at 440 volts, but often the shipping container will be provided electrical power on the ground from a different source, which may run at 220 volts. Turning now to FIG. 10A, a schematic for supplying each of a plurality of shipping containers with electrical power is illustrated. An external power source 500, which can generate power, such as three phase 440 or 220 volt electrical currents, is depicted in communication with a transformer 502. The transformer 502 is illustrated as a single unit, but can comprise a plurality of units for receiving power at different voltages and outputting power at different voltages by stepping up or stepping down the power supply. In this way, must standard electrical devices can be assured to receive power in the shipping containers so long as a connection is available to a conventional power source, regardless of whether the source of power is 220 volts or 440. The external power source 500 can include a power source located on the shipping vessel or generators brought onboard with the shipping containers. For example, the external power source 500 can be one selected from a gas powered generator, a solar powered generator, a hydrogen powered generated, or combinations thereof. This single transformer 502 can step the voltage down and can be used to supply multiple shipping containers, such as a first shipping container 504a, a second shipping container 504b, a third shipping container 504c, and a fourth shipping container 504d. The first shipping container 504a can be like the one depicted in FIG. 1 having an electrical connection 32 for receiving a power supply at a control box 30. The control box 30 can include fuses and switches and output lines for powering electrical devices within the shipping container such as lights 506a, a heating element 508a, a first fan 510a and a second fan 512a. The embodiment depicted in FIG. 10A illustrates each of the shipping containers being supplied in parallel from the transformer 502.

FIG. 10B illustrates an embodiment where each shipping container is supplied power in parallel directly from the generator 500. In this embodiment, the first shipping container 504a includes a first transformer 502a, while the second shipping container 504b includes a second transformer 502b, and the third 502c and fourth shipping containers 502d include third 502c and fourth transformers 502b, respectively. Each shipping container can include individual transformers for powering each electrical device in the respective shipping containers. In another embodiment, the configuration of FIG. 10A can be supplemented with second transformers in individual shipping containers. In such an embodiment, the first transformer can step down the power produced by the generator, and second transformers, located with each shipping container, can further step the power down, or step the power up, depending on the power requirements of the electrical devices within the shipping containers.

FIG. 10C illustrates another embodiment where the generator 500 communicates directly with a transformer 502, for stepping down the power. The transformer 502 then feeds each of the first shipping container 504a, second shipping container 504b, third shipping container 504c, and forth shipping container 504d in series.

Similarly, FIG. 10D illustrates a generator 500 connected in series with each of the shipping containers. Like the embodiment described in FIG. 10B, each shipping container can include a transformer for stepping down power delivered from the generator 500.

Regardless of the configuration used to supply power to the containers 504, or to the electrical devices in the containers 500, it may be desirable to have water tight seals at each electrical connection. It may further be desirable to use waterproof lines from the generator 500 or transformer 502 to the container 504 and from the containers to their respective electrical devices. Otherwise, these lines and connections may be at risk from exposure to the elements, such as rain and ocean water. The connections can be further reinforced, particularly those on the interior of a container, to prevent damage from livestock which can chew on, or play with, lines and connections. In the event electrical lines are run within a shipping container, they can be set as flush as possible with the interior surface of the shipping container to minimize contact with livestock. For example, some lines may be run on the interior of the container for powering internal light sources. These connections can be waterproof, and the lights themselves can construct in a water resistant configuration.

FIGS. 11A-B illustrates a non-limiting embodiment of shipping container systems for stacking shipping containers carrying livestock including a spacer with an external catwalk and railing. A first container 612 with an opening 622 can be loaded onto the deck of a shipping vessel. The opening 622, can be like the personnel openings described in embodiments of specific shipping containers previously discussed, and can be accessible from the deck of the shipping vessel. A second shipping container 610, with a similar opening 620 can be stacked on top of a spacer 614, which can be itself stacked on the first container 612. The spacer 614 can extend further than each of the containers providing an external catwalk convenient to the personnel opening 620 of the second container 610. As one example, the spacer 614 can substantially match the length and width of the shipping container, except that it can extend outwards at a front portion. A major drawback to stacking shipping containers for livestock can be that an attendant must generally access each container in order to ensure livestock have access to food and water and to monitor the health of the livestock during shipment. Scaffolding and other ladders may not provide the sturdy support necessitated by the motion of a shipping vessel in combination with the potentially hazardous weather on the open sea.

The spacer 614 nested or mated with the top surface of the first container 612 and can further be secured by the weight of the second container 610 to ensure the external catwalk provides a sturdy elevated surface. Rails 616 can provide some protection from falling, however, a safety harness may also be used with the disclosed embodiment to further reduce the potential injuries. The railing 616 can be provided with a left rail 626, a back rail 628 and a right rail 630 and generally outlines the external catwalk portion of the spacer 614. Each portion of the railing 616 can be rigidly affixed to the spacer 614 by welding or other means, or each section of railing 616 can be removably attached to the spacer 614.

A ladder 618 can pass through the spacer 614 at an opening 624. The ladder 618 and opening 624 provide access to the external catwalk portion of the spacer 614 for entry into the second container 610.

FIG. 11C illustrates a non-limiting embodiment having three groups of stacked containers with a common ladder 618.

The first container group 610 includes a spacer 614 having an opening 624 for a ladder, but only with the left railing 626 and the back railing 628. A bridge 632 can be provided to a second container group 640 which has a spacer 644 illustrated with a railing 646 having only a back railing. The bridge 632 can be locked into place once the containers and spacers are stacked into place. The bridge 632 can also include rails in order to help prevent falling injuries between the container stacks.

A second bridge 648 can connect the second container group 640 to a third container group 650, the third container 650 having a spacer 654 and a railing 656. The illustrated arrangement of railing and bridges provides a single entry for accessing the personnel openings of multiple containers on a second level of containers.

Standard openings or slots on each corner of the shipping container enable secured stacking and locking. However, stacking livestock shipping containers presents an additional hazard to personnel responsible for entering the shipping containers to feed livestock. A ladder can be provided adjacent to the personnel opening welded to the exterior of the shipping container. Harnesses and other additional precautions may be taken for accessing any such shipping container above the bottom level.

Methods of Shipping Livestock

One non-limiting embodiment relates to a method of transporting livestock. An example of this embodiment will be described, primarily with reference to FIG. 2A-D, although features from other figures can readily be implemented with this method. The method can include the step of separating a shipping container 10 into a livestock storage area 62 and feed storage area 64. This step of separation can be achieved with the installation of a feed partition 66 dividing the interior of a shipping container 10 into separate areas. The feed storage area 64 can comprise a continuous opening formed from a substantially horizontal overhead space 61 and a substantially vertical sidewall space 63. Feed 72 can then be loaded in the feed storage area 62 for storage, and more specifically can be stored in the substantially horizontal overheard space 61. Livestock 426 (seen in FIG. 9) can be loaded into the livestock storage area 64 for transport. Separation can be maintained between the livestock 426 and feed 72 stored in the substantially horizontal overhead space 61. A trough 68 can be provided in the substantially vertical sidewall space 63 of the feed storage space 64, accessible by livestock 426 in the livestock storage space 62. Periodically, measured amounts of feed 72 can be released from the inaccessible position in the substantially horizontal overhead space 61 to the accessible location in the trough 68. This inaccessible position in the substantially horizontal overhead space 61 can be reached via a catwalk 70 connected to a feed partition 66, and this catwalk 70 can be accessed from a personnel opening 38 (Seen in FIG. 1) to the exterior of the shipping container 10. The feed 72 can be released in roughly equal portions throughout the duration of a trip. These allocated portions of feed can be considered measured portions of feed and can be rationed out in equal volumes each day during shipment. The volume of the measured portion of feed can depend on the weight of livestock in a particular container and can be sufficient to facilitate weight gain by the livestock throughout shipment. The feed portions can be measured and adjusted for consuming the majority of feed during a trip, and particularly can be adjusted to promote healthy weight gain while minimizing the waste produced during transport. In one non-limiting embodiment the feed can be sufficient for a one week trip. In another embodiment feed can be supplied for a two week trip, and in yet another embodiment feed can be provided for three weeks of transport, or even up to a forty five day trip. The number of livestock and the weight of livestock in each container should dictated the amount of feed each container is provided on a daily basis.

In another embodiment, bedding, such an absorbent bedding layer 428 (seen in FIG. 9) can be applied at the bottom of the shipping container. Any of the bedding materials previously described can be used, and can be applied in multiple layers. In this embodiment, the absorbent bedding layer can be initially laid down before cattle enters the container, and additional layers can be subsequently added throughout the shipment.

For the purpose of periodically releasing measured amounts of feed 72, pelletized feed 72 can be stored separately from the livestock for periodic release in measured amounts. The feed 72 can be released manually, by an automated means, or can be actuated with a device providing a mechanical advantage. As one example, feed 72 can be stored in a side wall or above the livestock and can be released. Additionally, feed 72 can be released from the wall or from above the livestock by the actuation of a mechanical means, such as a lever or a crank, adapted for releasing feed 72. The feed 72 itself, in one embodiment, can be pelletized feed 72 fortified with nutrients and/or antibiotics. For this embodiment, any of the previously described shipping containers can be used, even those adapted for the serial delivery of water and electricity.

Figure 12:
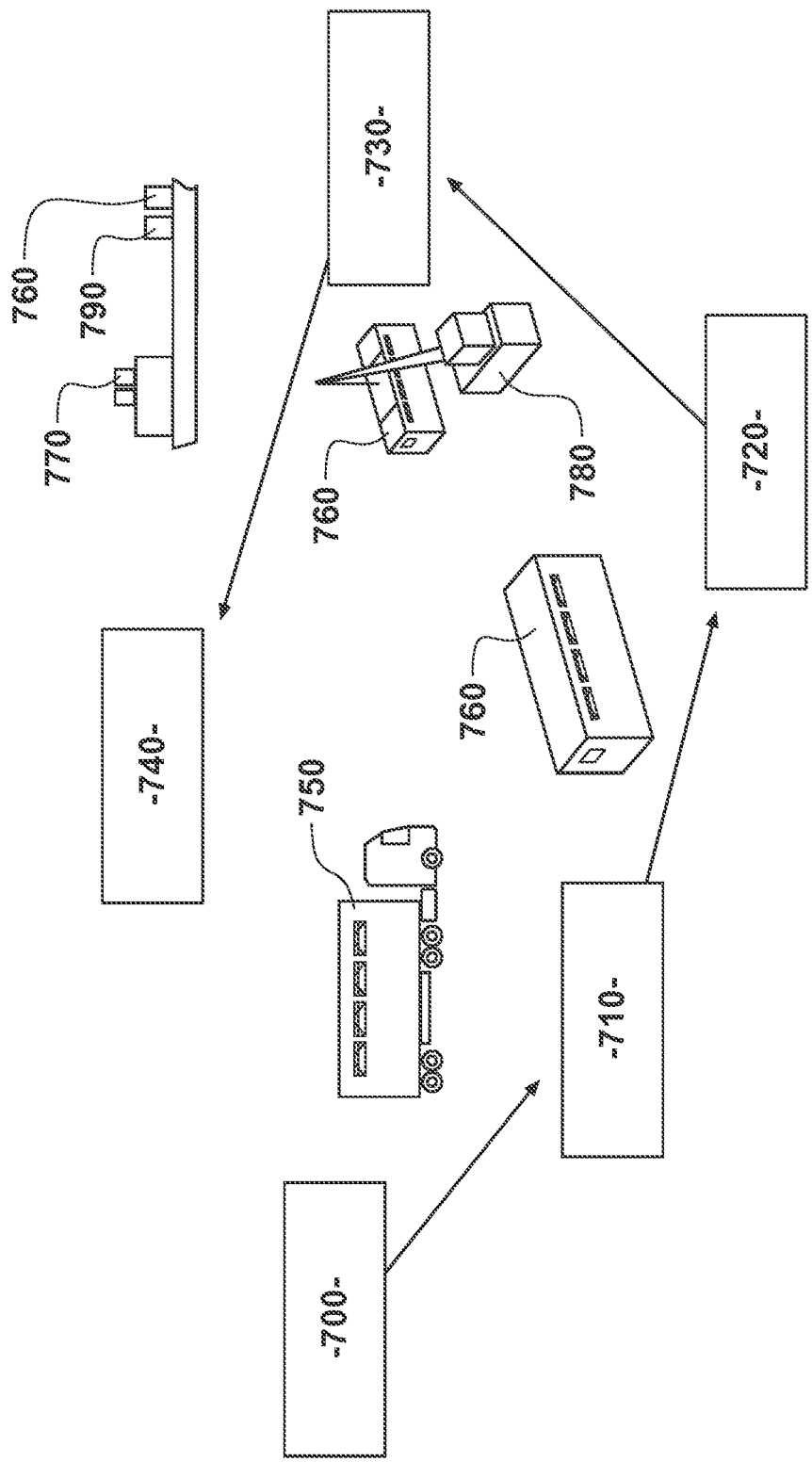
FIG. 12 illustrates a flow chart embodying certain aspects of methods relating to the shipping containers described herein.

Another non-limiting embodiment relates to an improved method of transporting livestock and can be discussed primarily with reference to FIG. 12. This method can be used in conjunction with the previously described methods of shipping and with previously described shipping containers 760. The method can include the first step of loading livestock onto a plurality of ground transports 750 at a first destination 700. The first destination 700, in one embodiment, can be a quarantine location; however, ports and other destinations are envisioned with embodiments of this method. The ground transports 750 can take the livestock to an intermediate destination 710, such as a port. At the intermediate destination 710 the livestock can be unloaded from the ground transport 750 and loaded into shipping containers 760. As but one example, the ground transports 750 can be unloaded individually for filing livestock single file into a series of shipping containers 760 lined up in a row for loading. The livestock can be sequentially unloaded from a series of ground transports 750. When a shipping container 760 in the row is full, that shipping container 760 can be closed and livestock can then be directed to a subsequent shipping container, until the subsequent shipping container is also full. The loaded shipping containers 760 can be transferred to a shipping vessel 770.

In another embodiment, the ground transports 750 can be loaded with the same shipping containers 760 for a direct transfer onto the shipping vessel 770. In one embodiment, the shipping containers 760 can be unloaded from the ground transport 750 and placed on a dock 720 to await lifting onto a shipping vessel 770, while in another embodiment the shipping containers 760 can be lifted directly onto the shipping vessels 770. The shipping containers 760 can be lifted with cranes 780 directly on the deck 730 of the shipping vessel, or with cranes 780 located on the port 730. The shipping containers 760 can be configured on the deck 730 of the shipping vessel 760 or in the hull of the shipping vessel 770 in rows with at least about 18 inches between the containers, with at least about 12 inches between the containers, with at least about 6 inches between the containers. The shipping containers 760 can be arranged on the deck 730 of the shipping vessel 770 into two or more rows, which can have between about two and eighty containers. Once loaded onto the shipping vessel 770, the shipping containers 760 can be carried to the second destination 740.

The method can include providing a shipping container 760 configured for providing livestock with food, water, protection from the elements, and an air exchange. The method can include the step of providing an at least one generator for supplying power to shipping containers. The method can also include the step of supplying each shipping container 760 with drinking water.

The shipping vessel 770 can be a small vessel, a large vessel, a vessel designated solely for shipping livestock, or a vessel carrying bulk goods in addition to livestock. Once the shipping date is set, the livestock can be quarantined at a first destination 700, such as an offsite location, in accordance with any local or international livestock shipping requirements. The quarantine can begin the required number of days before the shipment date. Optionally, female livestock can be cycled with hormones and other treatments prior to the quarantine, then artificially inseminated a predetermined time before the designated shipment. Depending on the intended purpose of the livestock at their destination, the cycled females can be inseminated with conventional sperm, or with sex sorted sperm. For example, if the livestock comprise dairy cattle, they can be inseminated with sex sorted sperm for the purpose of producing female offspring. In another example, the female livestock can be inseminated with sex sorted sperm in order to produce male offspring. The insemination can be timed such that the livestock have a low chance of giving birth during shipment. Instead, the insemination can be timed so that the livestock produce their offspring after they have arrived at their final destination. It should be appreciated for the shipment of impregnated livestock, particularly heifers gestating embryos, temperatures and conditions become more relevant to the health of the livestock and potential offspring.

Livestock can be loaded into specialized shipping containers 760 at the quarantine area 700, which are subsequently loaded onto ground transports and taken to an intermediate destination 710, which can be a departure port for the shipping vessel 770. In one embodiment, the shipping containers 760 can be lifted directly from the ground transports onto the shipping vessel 770. In a different embodiment, the livestock can be unloaded from the ground transports 750 into the shipping containers 760 previously described for loading onto the shipping vessel 770. The lifting of the shipping containers 760 can be achieved by either a crane 780 on the shipping vessel 770 or by a crane 780 at the dock 720. In one aspect, the step of loading the shipping containers 760 onto the shipping vessel 770 can include, sequentially driving the ground transports up to the loading area 720 for the shipping vessel and individually lifting the shipping containers 760 directly off each sequential ground transport 750 for placement on the deck 730 of the shipping vessel 770 or in the hull of the shipping vessel 770. The shipping container 760 can be loaded onto the shipping vessel 760 in at least one row of two to eighty containers. The shipping containers 760 can be spaced about twelve inches apart in one embodiment, or about six inches apart in another embodiment.

In another non-limiting embodiment the containers 760 can be evenly loaded with livestock in order to reduce potential problems loading the containers onto the shipping vessel. Proportional numbers of livestock can be loaded into proportional sections of the shipping containers sequentially. For example, one half of the livestock can be stored in the back half of the shipping container 760, and then the second one half can be loaded into the front half of the container.

Another aspect relates to a method of transporting livestock over long distances or long periods of time, and will be discussed primarily with reference to FIG. 1. The method can begin by providing at least one modified shipping container 10. The modified shipping container 10 can be modified to have ventilation openings 44, 46, 48, where the ventilation openings can be reinforced. A portion of the shipping container 10, or the entire bottom surface of the shipping container 10, can be sealed for preventing liquid and solid waste from escaping the shipping container 10. Because livestock are shipped among other dry goods, relying on the same loading equipment and dock space, it may be favorable that the shipping containers themselves do not impact the dock space or the shipping vessel space. The shipping containers 10 can then be further modified for providing airflow. Livestock can then be loaded onto the modified shipping container 10, and the loaded shipping container 10 can then be loaded onto a shipping vessel 770 (seen in FIG. 12). These modifications can include providing an enclosure gate 110, as well as a water connection 52 for receiving a supply of water and an electrical connection 32 for receiving an electric supply of power.

In another embodiment, which can be used in combination with various other methods described above, a method of transporting livestock on a shipping vessel 770 can begin with the step of accommodating at least one shipping container 760 containing livestock on the deck of, or in the hull of a shipping vessel 770. The method can continue with the steps of generating a source of electricity supplied to the shipping containers and holding a supply of fresh water for supplying to the at least one shipping container 760. Holding a supply of fresh water can comprise the step of filling the ballast tank of shipping vessel with fresh water. The method can further comprise the steps of transporting the at least one shipping container 760 from an intermediate destination, such as a departure port, to a second destination 740, such as a destination port, and maintaining the supply of electrical power and drinking water to the at least one shipping container 760. The method can further include the step of selecting one of multiple ballast tanks for supplying the drinking water to the at least one shipping container 760. For example, a shipping vessel may include more than one ballast tank, and the selection of the ballast tank for supplying water to the shipping containers may be performed in order to maintain balance between the ballast tanks.

Figure 13A:
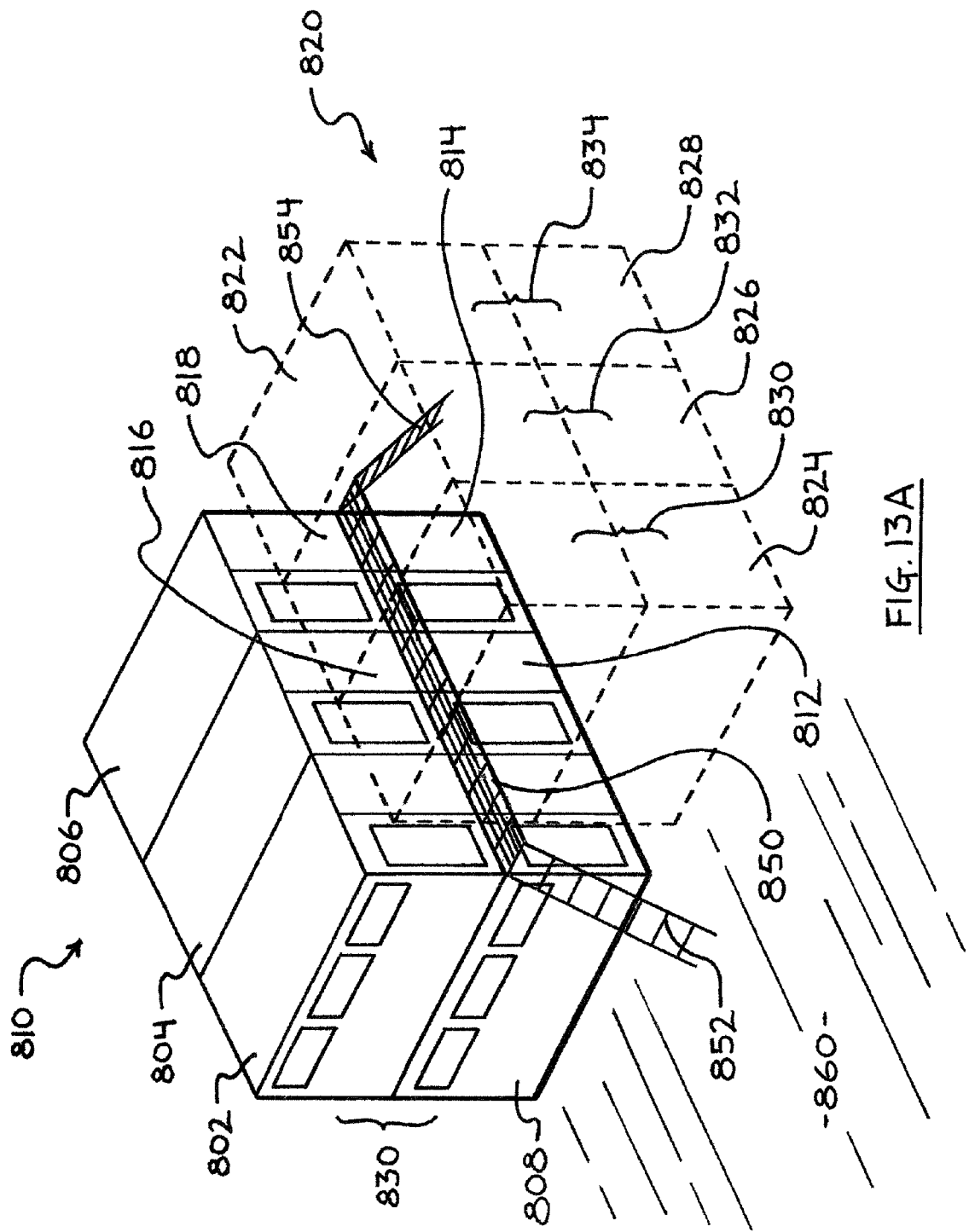
FIG. 13A provides an isometric view of a plurality of stacked containers sharing a catwalk.

Turning now to FIG. 13A-C, a first group of shipping containers 810 is illustrated adjacent to a second group of shipping containers 820. Each shipping container can include livestock, and can be modified for the purpose of transporting livestock. Each group includes a series of rows stacked two containers high, specifically a series of bottom containers stacked on a series of top containers. The bottom containers can rest on a supporting surface 860, which can be the deck of a shipping vessel, the hull of a shipping vessel, or another surface on a shipping vessel providing support for stacks of shipping containers. The bottom containers can provide elevation to the top containers relative to the supporting surface of the shipping vessel. In other embodiments the shipping containers can be stacked three, four, or even up to eight containers high. The first group of shipping containers 810 is separated from the second group of shipping containers 820 by, and is adjacent to, a catwalk 850. For embodiments including additional levels of shipping containers the catwalk 850 can include additional levels providing access to shipping containers on every level. The catwalk 850 can include a first ladder 852, or a first ladder 852 and a second ladder 854, in communication with the supporting surface 860 of the shipping vessel.

In one embodiment, a bottom container can be located at the outer perimeter of a shipping vessel. The supporting surface 860 can include a portion of the deck on a first side of the bottom shipping container and one or more pillars extending from a lower surface on a second side of the shipping container. In this embodiment the catwalk 850 can be connected directly to the supporting surface near the first side of the bottom shipping container and can extend to the personnel opening.

Figure 13D:
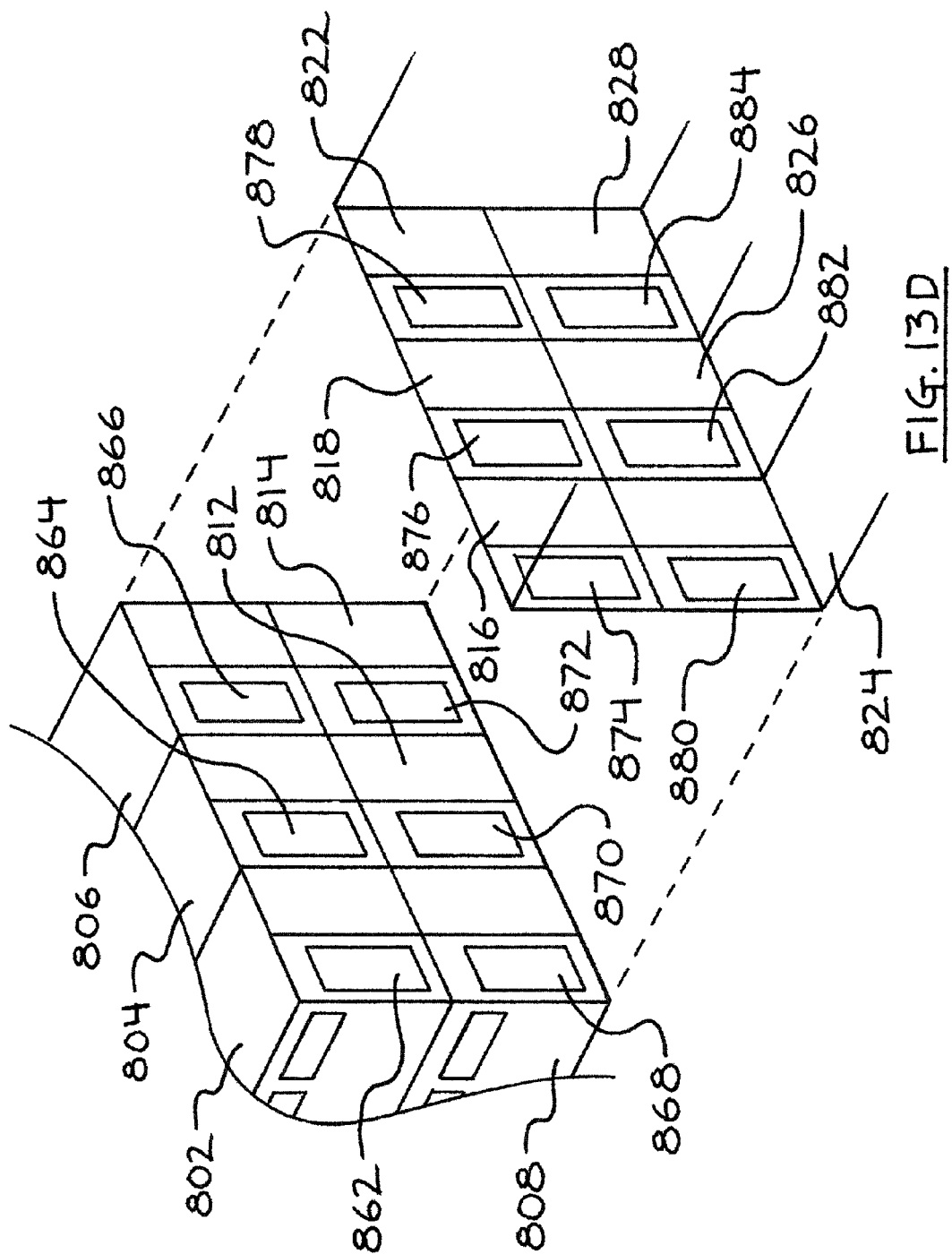
FIG. 13D provides an isometric view of a plurality of stacked containers.
Figure 14A:
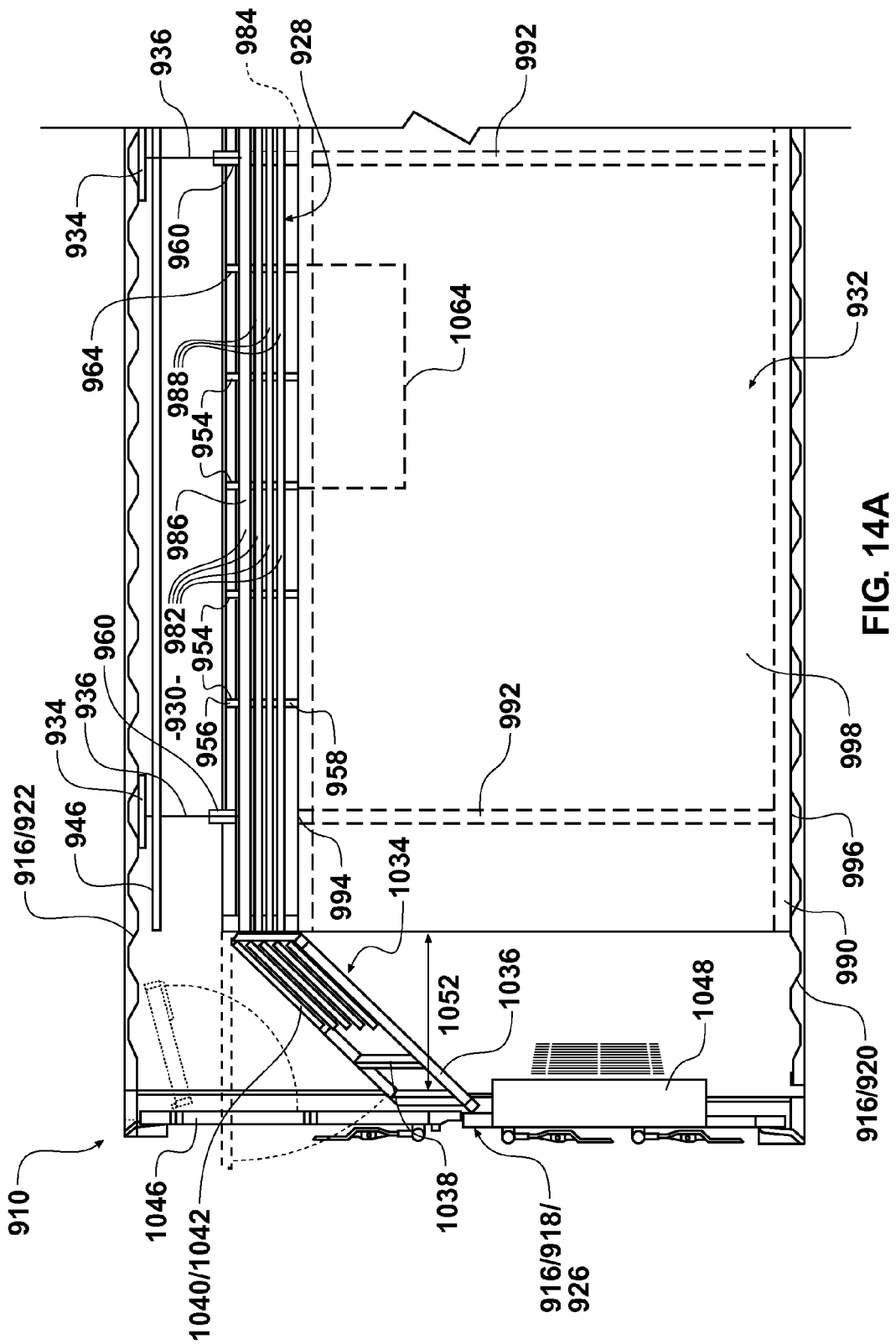
FIG. 14A illustrates a downward sectional view of the front portion of a shipping container in accordance with certain embodiments described herein, the sectional view being taken from above the loft.
Figure 14B:
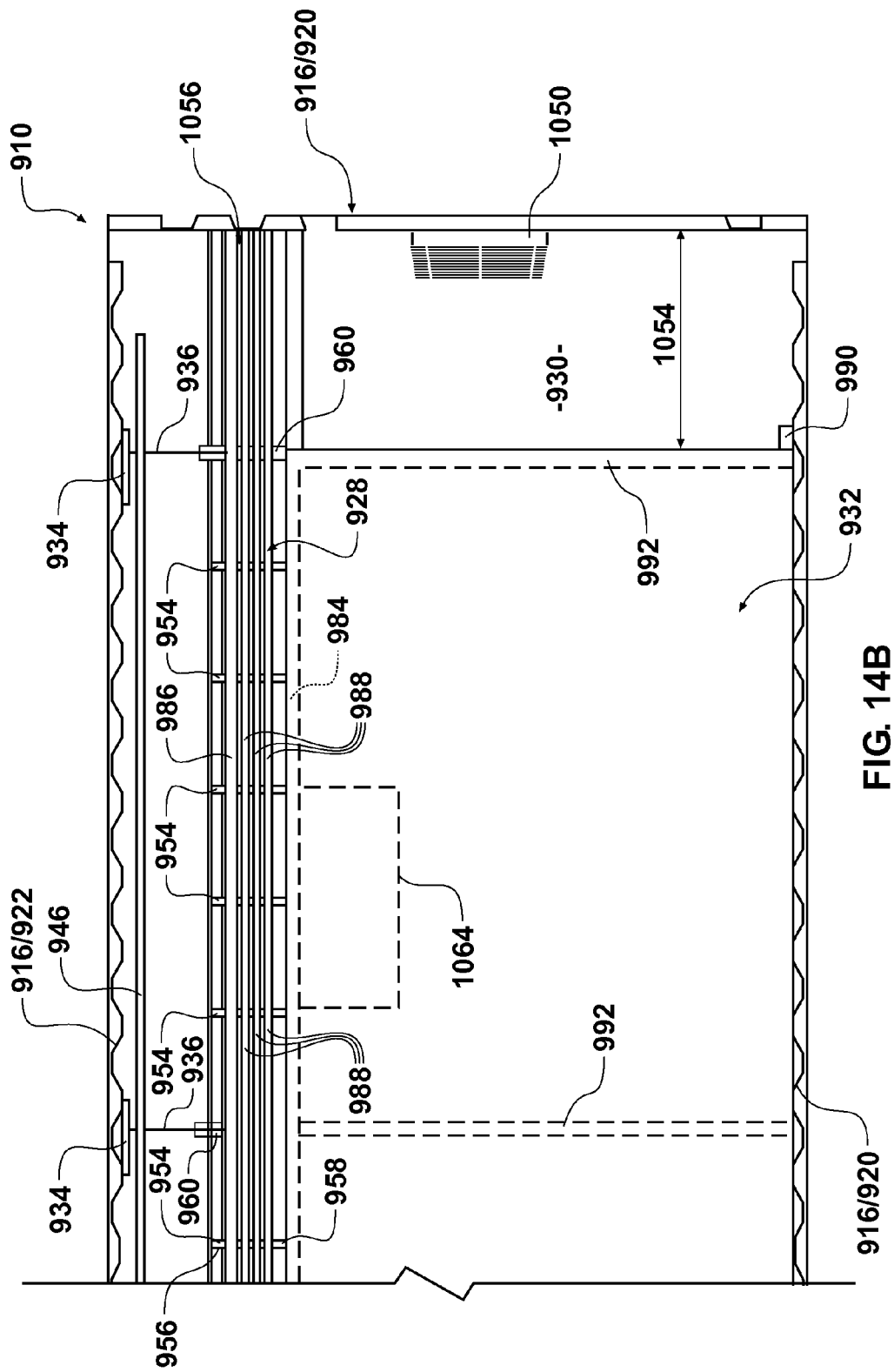
FIG. 14B illustrates a downward sectional view of the back portion of a shipping container in accordance with certain embodiments described herein, the sectional view being taken from above the loft.

FIGS. 13A-D illustrate a first group of container 810 facing a second group of containers 820 separated by a catwalk 850. In particular, FIG. 13D illustrates a first row 830 having a bottom container 808, with a personnel opening 868, in the first group 810 upon which a top container 802, having a personnel opening 862, is stacked. In the second group 820, the first row 830 includes a bottom container 824, having a personnel opening 880, upon which a top container 816, with a personnel opening 874, is stacked.

Similarly, a second row 832 includes a portion in the first group of containers 810 having a bottom container 812, with a personnel opening 870, and an top container 804, with a personnel opening 864, and a portion in the second group of containers 820 having an top container 818, with a personnel opening 876, stacked on a bottom container 826 with a personnel opening 882. A third row 834 is illustrated having a portion in the first group of containers 810 with an upper container 806, with a personnel opening 866, stacked upon a lower container 814, with a personnel opening 884. Another portion of the third row 834 in the second group of containers 820, adjacent to the first group, includes a top container 822, with a personnel opening 878, stacked upon a bottom container 828, with a personnel opening.

Each of the containers can include a side, which can be considered the front of the container, where the front of each container can include a personnel opening. Each personnel opening can be latchably sealed with a door. In certain embodiments, the front side of each top container in both the first group of containers 810 and the second group of containers 820 can be oriented adjacent to the catwalk 850. In this way, a single catwalk 850 can provide access to the top level of containers in both groups of containers. The catwalk 850 can include a first ladder 852 and a second ladder 854 providing access to the top containers. The personnel openings of the bottom containers can also be orientated on the same side as the catwalk 850, or they can be oriented on the opposite side, or they can be oriented in some combination thereof.

The catwalk 850 can be secured into place between the first group of shipping containers 810 and the second group of shipping containers 820. The catwalk 850 can be secured to the supporting surface 860 of the shipping vessel, to another surface of the shipping vessel, or to one or more of the shipping containers. For example, the catwalk 850 can be suspended from the top containers, through the personnel openings or at the corners of the shipping containers. The catwalk 850 can be stacked with portions resting between the top and bottom containers of the first and/or second groups of shipping containers 820.

The first ladder 852, the second ladder 854 and the catwalk 850 can include attachment points for a safety harness. A safety harness can be provided for personnel which access elevated shipping containers from the catwalk.

FIGS. 14-18 illustrate various aspects of a floating feed partition which may be incorporated with various features previously described for shipping livestock. Primarily with reference to FIGS. 14A and 14B, a downward sectional view of a shipping container 910 having a plurality of walls 916 is illustrated from above a loft 932. In FIG. 14A a front end of the shipping container 910 is shown with a front wall 918 consisting of a container door 926. The shipping container 910 and a container door 926 can represent any conventional shipping container and may incorporate any number of doors without departing from the scope of the invention contemplated herein. By way of a non-limiting example, the shipping container 10 may be 8 feet wide, 40 foot long and 9 and a half feet tall. As additional non-limiting examples, similar containers with metric dimensions, containers with less height, containers with less length, containers with more height, and containers with more length may also be used, so long as the container has an interior storage space 930 sufficient for transporting livestock.

The interior storage space 930 may be divided into a first portion 966 (seen in FIG. 16) and a second portion 968 (also seen in FIG. 16) by the combination of a floating partition 928, loft 932 and wing end 1034, each of which may be constructed, in large part, from tubular metal, such as tubular steel. Naturally, other construction materials of requisite strength may also be used. In the case of transporting livestock, the first portion 968 of the interior storage space 930 may be considered the livestock storage area 970 and may be so dimensioned to accommodate any of a number of livestock. For example, various national and international bodies require certain livestock to have specified amounts of area per animal for shipment. This area allocated to livestock may be considered the livestock storage area 970. The second portion 968 of the interior storage space 930 may be configured for the storage of feed or for access by various personnel and may be generally designated the feed storage area 972. The combination of the loft 932 and the floating partition 928 may provide a vertical partition and a horizontal partition, like those previously described, except that the vertical partition does not extend to the floor 914 of the shipping container 910. Similarly to previously described embodiments, a vertical sidewall space may be partially defined by the vertical partition and an overhead space may be at least partially defined by the horizontal partition within the second portion 968 of the interior storage space 930.

Each of a floating partition 928, loft 932 and wing end 1034 may be supported by a first sidewall 922 and a second sidewall 924 without touching the container floor 914 (seen in FIG. 3). In this configuration each of the floating partition 928, loft 932 and wing end 1034 may be considered to be "floating." As used herein with respect to internal container elements, the term "floating" shall be construed as not touching the container floor. Such a configuration may provide numerous advantages. For example, large livestock animals, such as cattle, may produce a significant volume of waste throughout the period of transport. Various human and livestock health issues arising from the collection of this waste may require that shipping containers utilized for shipping livestock are cleaned once the animals are discharged. Even with pressure washers, it may be difficult to thoroughly clean the interior surface of a container various items are connected directly to the floor. The floating configuration described herein provides an advantage over other pens or partitions contemplated on the interior of a shipping container because the container floor is free of obstacles or crevasses which may collect waste, or prevent waste from being washed out even with a pressurized washer.

Further advantages exist in a floating partition, particularly in transatlantic voyages, where livestock may be prone to injure their legs or other body parts on pen or support structures attached to the container floor. In particular, in the case of shipping containers on shipping vessels, large animals, such as cattle, may damage structures affixed to the container floor.

The combination of the floating partition 928, loft 932 and wing end 1034 may provide an internal structure which provides a safe isolated space for livestock in addition to an accessible storage area for feed. Personnel may access the feed and distribute it to a feed trough 948 (illustrated in FIGS. 15-18) accessible to the livestock, while remaining physically separated from the livestock. The loft 932 may provide an area for storing hay, compressed hay, bags of grain, or pellets of feed above the livestock storage area 970 in a manner which is inaccessible to the livestock. The end wing 1034 is connected to the floating partition 928 and in combination they may provide a vertical barrier along the entire length of the container 910, or perhaps along the majority of the length of the container 10. This vertical barrier serves to isolate personnel from livestock, as personal may periodically access feed and for distribution into feed troughs. In this manner feed is accessible to be distributed evenly amongst troughs spaced along the entire length of the container 910. Personnel may access this feed storage space 968 through a personnel door 1046 which may itself be located in the container door 926 of the front wall 918.

The wing end 1034 may provide a widened space in the feed storage area 968 allowing space for the personnel door 1046 to swing open and providing more room for access to various items and features within the container 910. The winged end 1034 may include a wing gate frame 1036 hinged to the floating partition 928. When in use, the container doors 926 will be closed and the winged gate may be latched in a position near or touching the front wall 918 of the container 910. The wing gate 1034 may further include wing gate stanchions 1038 in the form of vertical posts affixed within the wing gate frame 1036. The wing gate 1034 may further include wing gate cross members 1040. The wing gate cross members 1040 may serve as ladder steps 1042 providing access to a loft floor 998 located a top the loft 932. The wing gate 1034 may be constructed at a slight tilt in order to present ladder steps 1040 in a more user friendly configuration.

When the container door 926 is opened, the wing gate 1034 may be swung into a second position which may be viewed as a continuation of the feed partition structure 928. In this configuration, the wing gate 1034 may extend beyond the border of the front wall 918. This configuration of the wing gate 1034 provides for a significantly wider clearance when the container door 926 is open and may be particularly advantageous for loading livestock into the container 910 prior to shipment. This configuration may also be advantageous for cleaning the container 910 and for brining equipment into the container 910 for cleaning, such as after livestock are unloaded from the container after shipment.

The wing gate 1034 may be supported entirely by the floating partition 928 without any portions extending to the container floor 914 (illustrated in FIGS. 16 and 17) and may thus be considered to be floating.

Column support plates 934 (seen best in FIG. 18) may be welded to the interior of the first sidewall 922 and the second sidewall 924 of the container 910, or affixed by some other means, such as an epoxy adhesive or with fasteners, such as bolts. Some shipping containers are constructed with corrugated steel walls, and the column support plate 934 may be wide enough to span across a portion of the surface to contact and be welded to at least two surfaces generally in the same plane. However, other materials are contemplated for use herein, the width of the column support plates 934 may be selected as appropriate for the material of the column support plate and the container sidewall. The column support plates 934 may run the entire interior height of the container 910 and hence may contact the container floor 914 and the container roof 912 but are not considered part of the floating partition 928.

Web support plates 936 can be steel plates mounted on the column support plates 934 for the purpose of supporting the floating partition 928, troughs 948, a catwalk (Seen in FIGS. 16, 17, and 18) and other structures above the container floor 914. As one non-limiting example, each of the column support plates 934 and the web support plates 936 may be constructed from pieces of quarter inch plate steel. However, other materials and thicknesses of requisite strength will be readily apparent for mounting the described structure and these materials and thicknesses are also contemplated for use herein.

The floating partition 28 may be mounted at a plurality of floating partition columns 960 which may be welded directly to the web plate supports 936. The floating partition columns 960 may be connected to a plurality of floating partition cross members 982, including a top floating partition cross member 984 mounted at the top of each of a plurality of floating partition support columns 960 and a bottom floating partition cross member 986 (seen in FIGS. 15, 16, 17 and 18) having segments mounted between floating partition columns 960. Floating partition stanchions 954 may be mounted generally in parallel with the floating partition support columns 960 and may have first ends 956 mounted to the bottom floating partition cross member 986 and second ends 958 mounted to the top floating partition cross member 984. Similar structures may also be used that, for example, provide a generally planar partition structure having a top a bottom and columns, which may be constructed from tubular metals.

The illustrated embodiment further includes mid floating partition cross members 88 mounted in parallel across the floating partition support columns 960 and floating partition stanchions 954. These floating partition cross members 988 may provide access to the loft 932 from portions of the feed storage area 968.

The loft 932 may include a loft floor 998 generally supported by loft joists 92. The loft joists 992 may have firsts ends 994 supported at, or mounted with, the top floating partition cross member 84 of the floating partition 928 and second ends 996 mounted with a loft support beam 990. The loft support beam 990 may be an L shaped bracket or other beam being counted to a plurality of spaced column support plates 934 on the second sidewall 924. Alternatively, the loft support beam 990 may be replaced with a series of independent support brackets for each loft joist 990. The loft floor 998 may further include cutouts 1064 for the purposes of promoting air circulation throughout the shipping container 910.

To further promote air circulation, a first circulation spacing 1052 may be seen between the front wall 918 and the loft 932. The first circulation spacing, in combination with a first ventilation fan 148, can help promote air circulation throughout the shipping container 910 and particularly promote air circulation above the loft 932. Referring to FIG. 1B, a second circulation spacing 1054 is illustrated for the purpose of prompting air circulation above the loft in conjunction with a second ventilation fan 1050 mounted with the back wall 920.

Each of the first circulation spacing 1052 and the second circulation spacing 1054 in combination with the first ventilation fan 1048 and the second ventilation fan 1050 provides for improved air flow. Otherwise, in shipping vessel transports utilizing water routes collection of moisture and/or condensation is possible in the loft area which may result in mold or in the spoliation of stored feed.

Figure 15A:
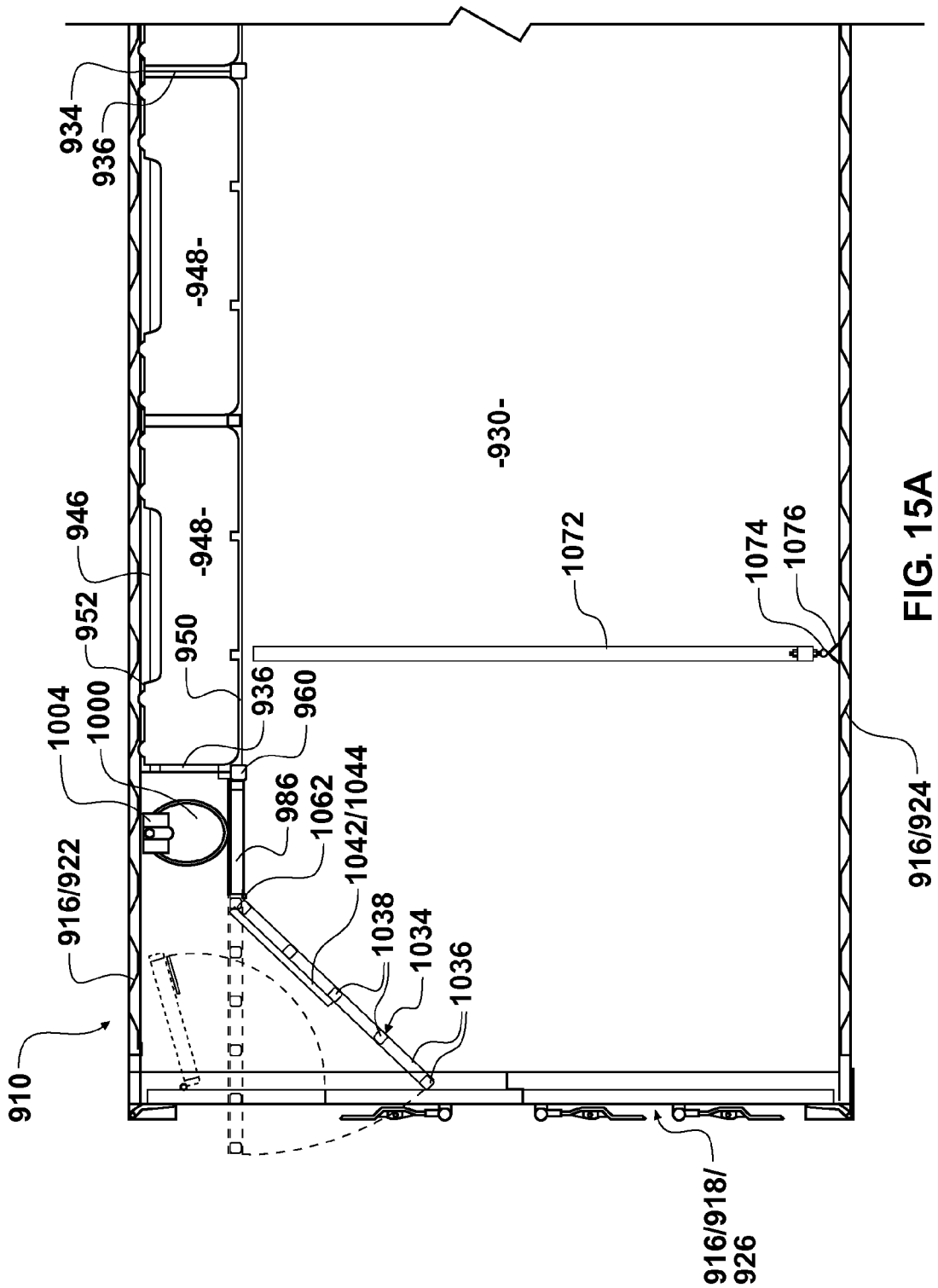
FIG. 15A illustrates a downward sectional view of the front of a shipping container in accordance with certain embodiments described herein, the sectional view being taken from above the feed troughs.
Figure 15B:
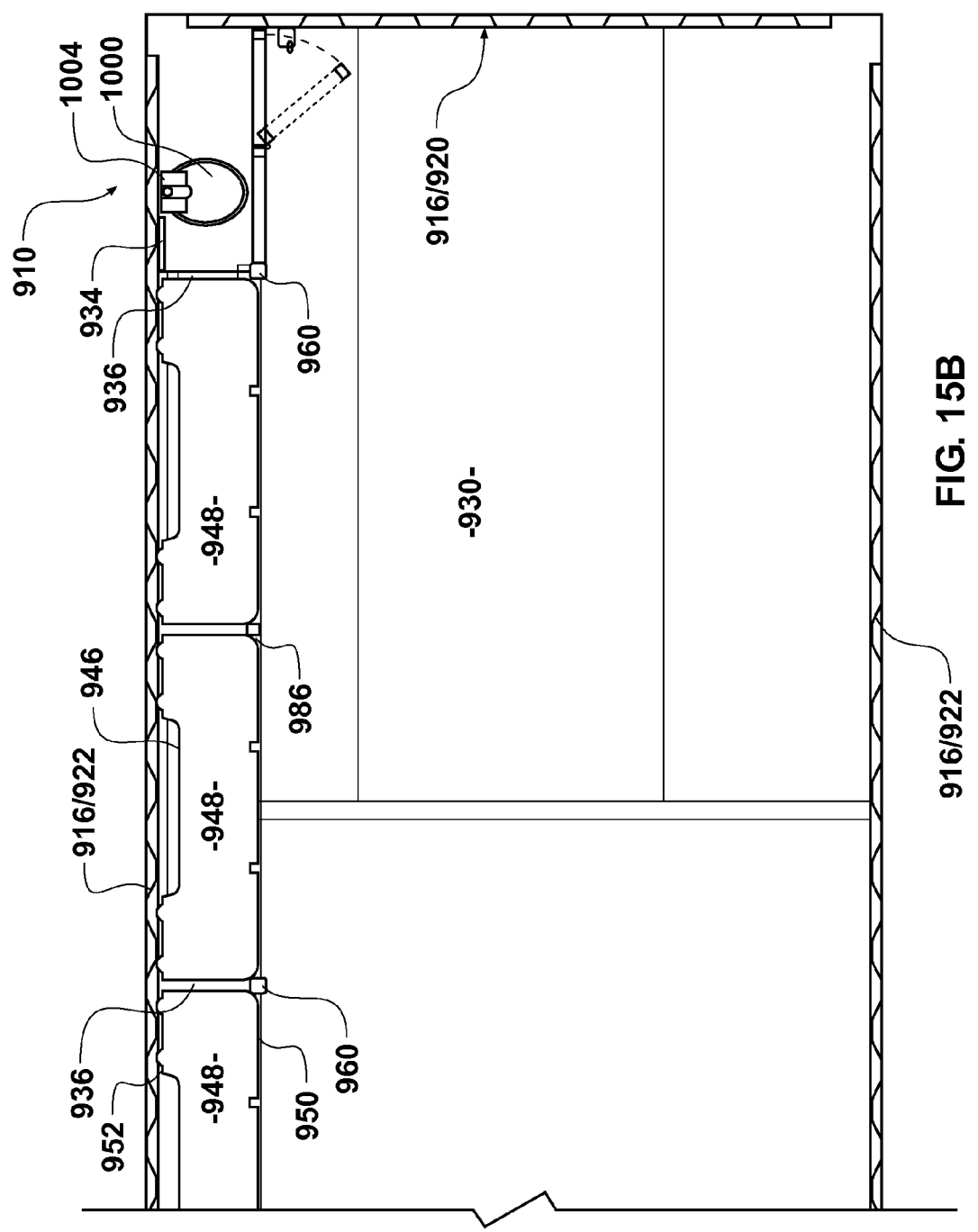
FIG. 15B illustrates a downward sectional view of the back of a shipping container in accordance with certain embodiments described herein, the sectional view being taken from above the feed troughs.

Referring to FIGS. 15A and 15B, further features may be seen from a top down sectional view taken from below the level of the catwalk 970. A water bowl mount 1004 may be mounted either directly to a wall 916 of the container 910, or to one of the column support plates 934. A water bowl 1000, such as an automated or actuated water bowl, maybe mounted at the water bowl mount 1004 and supplied with a source of water.

Feed troughs 948 can also be seen with a water trough front 950 that overlaps the bottom floating partition cross member 986. A water trough back 952 may rest on the trough support beam 946. The feed troughs 948 may be constructed for a polymeric material, such as a rubber or plastic. Such a construction may be light, easy to clean and easy to remove from the container 910. It may be desirable to have feed troughs 48 which are easy to remove for the purpose of cleaning the feed trough as well as for cleaning the container 10.

Figure 16:
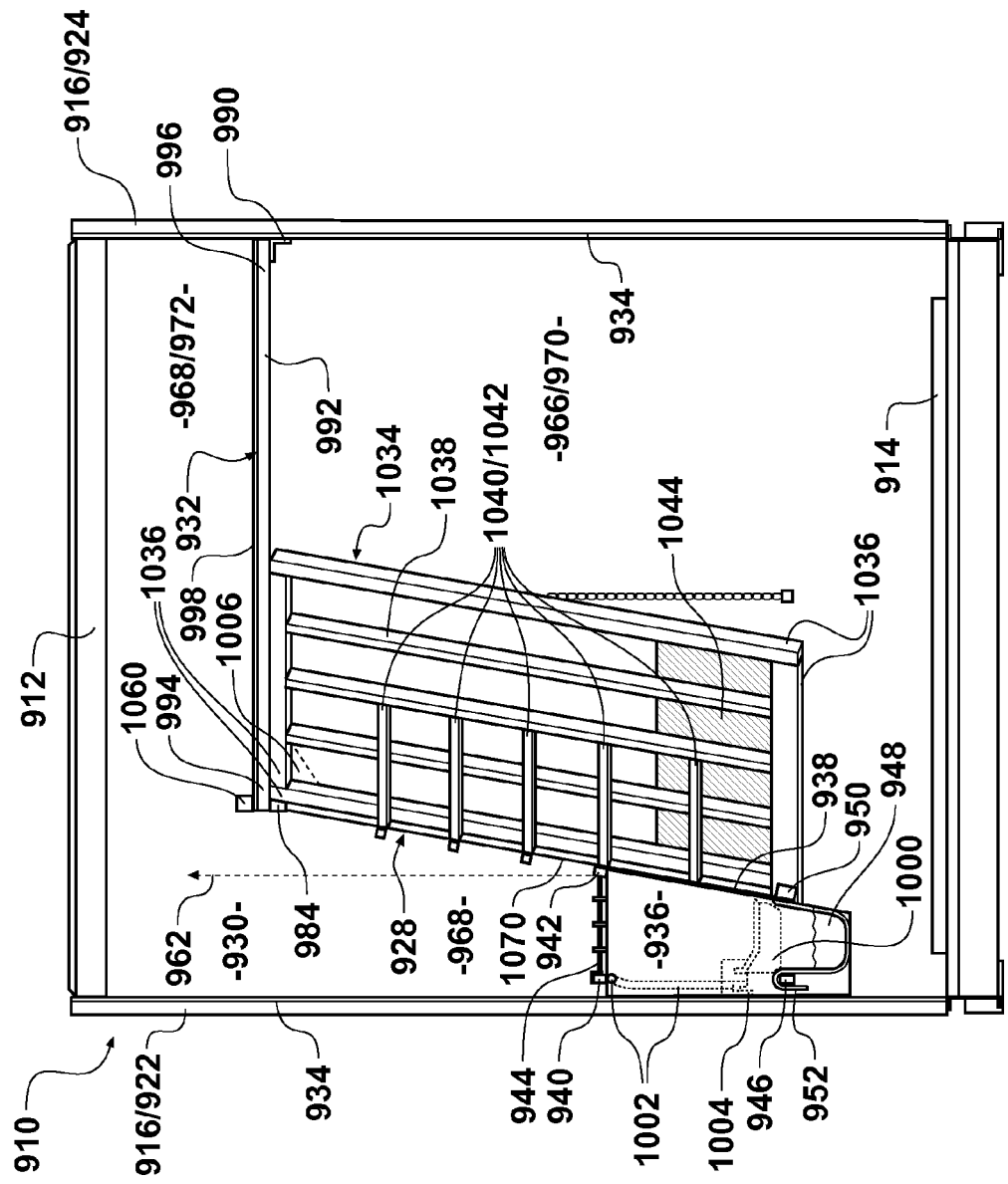
FIG. 16 illustrates a back sectional view of a shipping container in accordance with certain embodiments described herein, the sectional view being taken from in front of the wing end.

Referring now to FIG. 16, a front sectional view of the container 910 interior is shown from the front wall more clearly demonstrating the floating nature of the depicted embodiment at each of the floating partition 928, loft 932 and end wing 1034 are elevated from the container floor 914. Additionally, the front view provides a view of an angle of tilt 1070 created by a distal end 938 of the web plate support 936 and the floating partition column 960 which is mounted thereon. In one embodiment, the angle of tilt 1070 may be between 2 and 20 degrees, in another embodiment the angle of tilt 1070 may be between 5 and 15 degrees.

The angle of tilt 1070 provides more space in the livestock storage area 970 at the floor level, where livestock need it the most. At the same time space in the feed storage area 968 is increased towards the loft floor 998 providing personnel retrieving feed more space to operate. Additionally, the combination of the tilt and the mid floating partition cross members 988 provide ladder steps for accessing feed located on the loft floor 998.

The end wing 1034 can be seen in greater detail, as having an end wing frame 1036 comprising four pieces of tubular metal forming a generally quadrilateral shape. End wing stanchions 1038 may be mounted in parallel within the frame 1036.

Additionally, a first catwalk beam 940 and a second catwalk beam 942 can be seen mounted atop the web support plates 936. Each support beam and the catwalk 944 may run the entire length of the floating partition 928. A water line 1002 may additionally run along a U shaped tub, or within a tubular beam, of the first catwalk support 940. Feed 974 is also illustrated within the feed trough 948.

Figure 17:
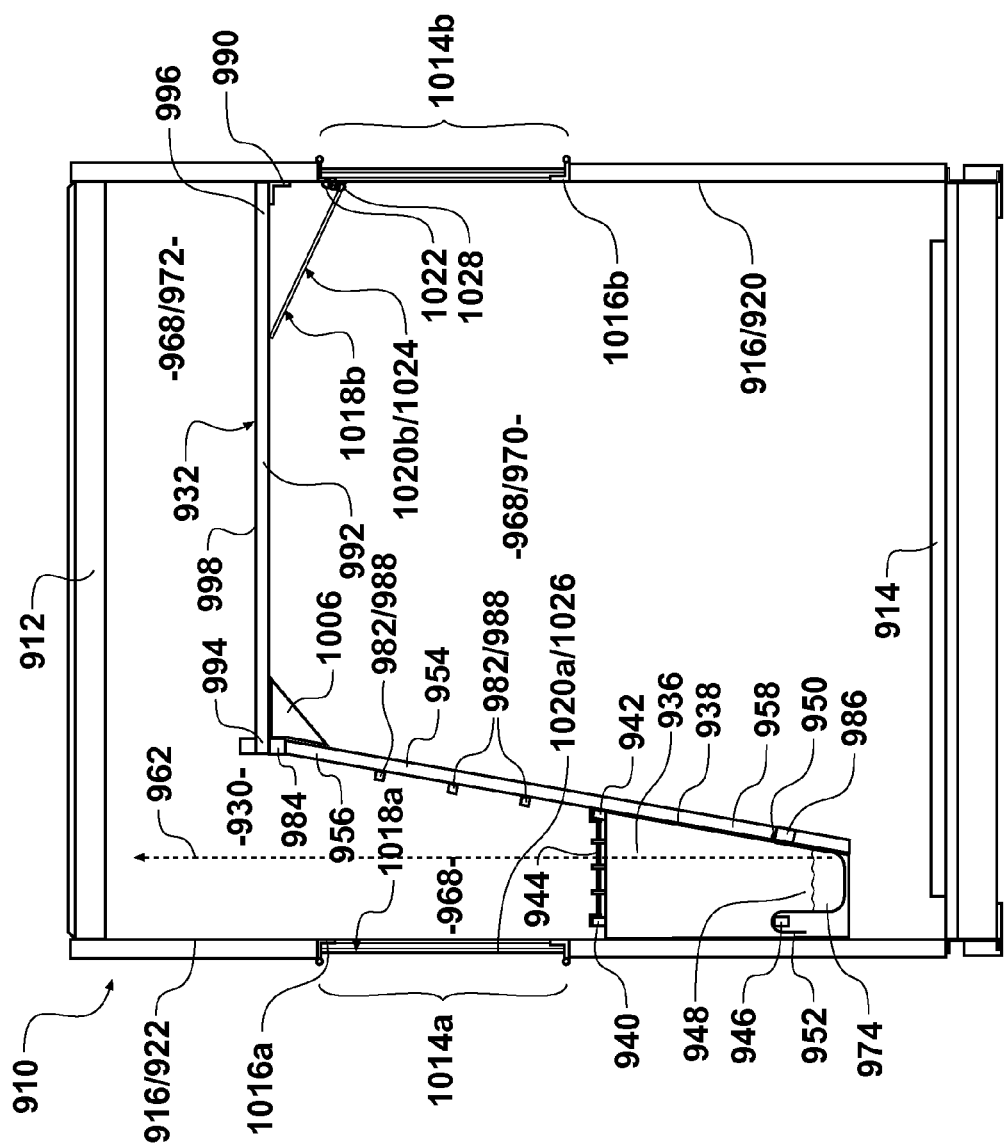
FIG. 17 illustrates a back sectional view of a shipping container in accordance with certain embodiments described herein, the sectional view being taken at a ventilation opening.

With reference to FIG. 17, a front section is taken from behind the end wing 1034 including illustrating a ventilation opening 1014a in the first sidewall 922 and a ventilation opening 1014a in the second sidewall 924 at a ventilation frame 1016a. The ventilation opening 1014a in the first sidewall 922 includes a shutter 1018a with a shutter cover 1020a in a closed position 1024 and the ventilation opening 1018b with a shutter cover 1020b in the second sidewall 924 is illustrated in the open position 1026.

With reference to the open shutter 118b, a shutter link 122 can be seen connected to a ventilation link 128. The slidable relationship between these lings allows the shutter to be locked into a shut position and unlocked and opened.

Figure 18:
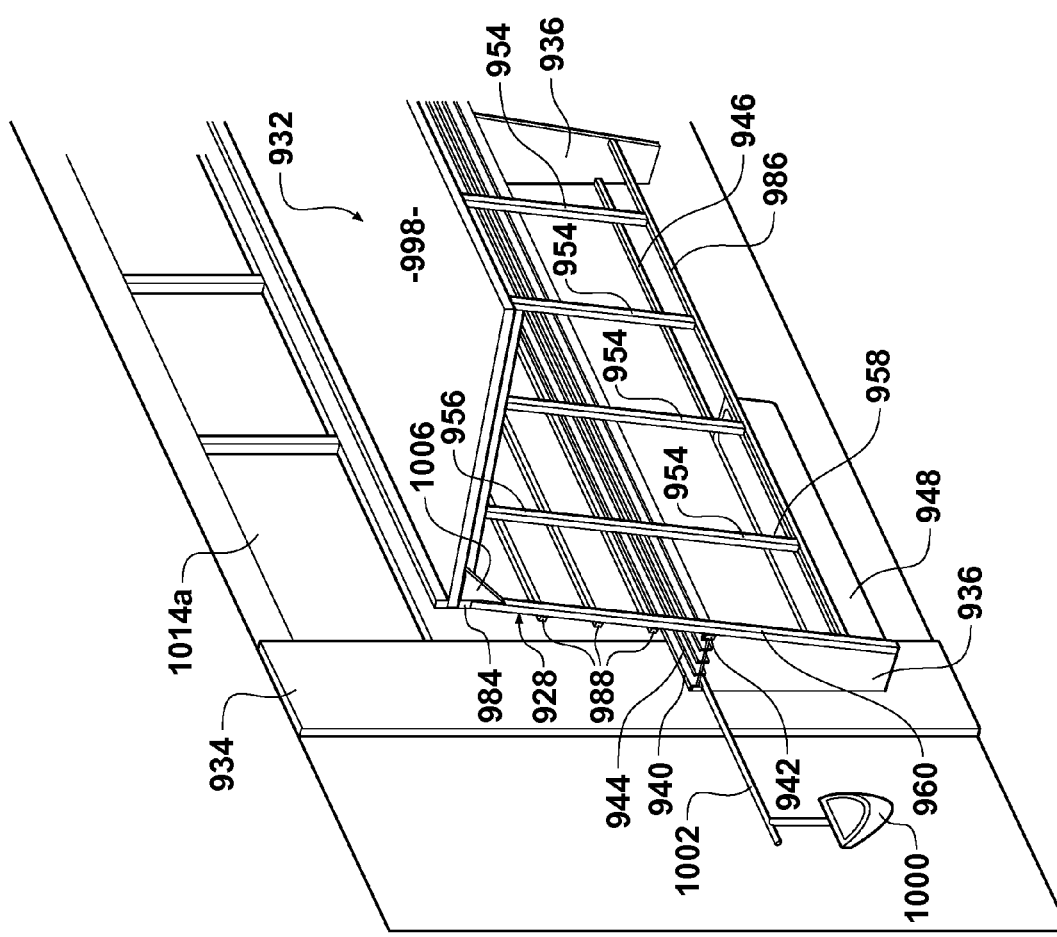
FIG. 18 illustrates a perspective view of a portion of the interior of a shipping container and a floating partition in accordance with certain embodiments described herein.

Referring to FIG. 18, a perspective view illustrates selected features and more clearly differentiates the floating partition columns 960 from the floating partition stanchions 954. The floating partition columns 960 are attached at the web support plates 936, while the floating partition stanchions terminate at the bottom floating partition cross member 986.

Method of Loading Livestock into Shipping Containers

In one embodiment livestock can be loaded by the process of first categorizing livestock by weight. The area required by animals in each weight category can then be determined. Referring primarily to FIG. 12, the capacity of the shipping containers 760 for each livestock category can then be determined based on the requirements of each livestock category. Livestock from a first category can then be loaded into a first shipping container, or a first group of shipping containers, not exceeding the determined capacity for each shipping container. Subsequent categories of livestock can then be loaded into subsequent shipping containers, or groups of shipping containers. This step can be accomplished at a first location 700, or at an intermediate location 710. In either case, each of the shipping containers 760 are then be loaded on a shipping vessel 770 at the intermediate location 710 then shipped to a second location 740. As one example, a row of shipping containers can be sequentially loaded onto the deck 730 of the shipping vessel 770 from the intermediate location 710 of a port. The shipping containers 760 can be transported and unloaded from the shipping vessel 770 at the destination location 740, where the livestock can either be unloaded, or trucked to a final destination. Once at the final destination, which could be another quarantine, the livestock can be unloaded from the shipping containers 760.

In one non-limiting aspect, the method of loading livestock onto shipping containers 760 can further include the steps of loading one half of a shipping containers capacity of livestock into one side of the shipping container, then isolating that livestock on one side of the shipping container. Next the remaining capacity of livestock can be loaded into the remaining space in the shipping container 760. The step of isolating can include shutting an enclosure gate 110 (seen in FIG. 2C), within the shipping container 760. For example, the enclosure gate can be located in roughly the middle of the shipping container 760 and can be closed when half of the desired livestock have entered the back half of the shipping container 760. The remaining livestock can then be led into the front half of the shipping container 760. Once the desired amount of livestock is loaded into the front half of the shipping container 760, the cargo doors can be closed. After the first shipping container is full, remaining livestock can be led from the trailer to an adjacent second shipping container.

In another aspect, the method of loading livestock into the shipping container 760 can include a providing a temporary partition, such as a gate for keeping live stock in place once loaded into a shipping container. The temporary gate can be slid into place along the length of the interior of the shipping container to prevent livestock from attempting to move back out of a shipping container. The temporary partition may be particularly useful in the event of delays in unloading livestock from subsequent trailers.

In yet another aspect, a method of loading livestock onto a shipping container can include the steps of loading a first portion of livestock onto the shipping container, and then isolating the first portion of livestock into a corresponding proportional section of the shipping container. Finally, the remaining proportional sections can sequentially be filled and isolated.

Each shipping container loaded with their respective animals can be lifted from land onto a shipping vessel 760. In one embodiment, the weight distribution of the livestock is kept relatively even within each shipping container.

In one non-limiting embodiment, the shipping containers 760 can each provide a source of food and water sufficient for each animal throughout the trip. The volume of food and water in each shipping container per animal can depend on the category of livestock in each shipping container in addition to the duration of transport. The food can be stored within the individual shipping containers as previously described and the drinking water can be by the systems previously described.

In one non-limiting embodiment, an additional category can exist for livestock which have been artificially inseminated. Livestock categorized as having been artificially inseminated, or in one embodiment heifers gestating embryos, before transport can be provided with shipping containers having circulation fans and access to water from anywhere in the shipping container. Additionally, shipping containers for this category of livestock can be provided with additional space in the event calves are birthed in transit.

In another non-limiting aspect the livestock can further be categorized by their health status. The health status of animals for the purpose of categorizing livestock can be understood as the presence or absence of any condition requiring veterinary attention, or the absence or presence of any contagious conditions. In this embodiment, livestock categorized as a negative health status, which can be those animals that require veterinary attention and/or those with contagious conditions, can be isolated from the remaining healthy livestock in order to reduce the spread of illness and provide easier access to livestock requiring attention. When loading the shipping containers livestock can be loaded with livestock of categorized with similar health statuses. In particular, livestock categorized with a negative health status can be isolated from the remaining livestock.

One non-limiting embodiment relates to a method of transporting livestock where a shipping container is configured for shipping livestock, livestock can be loaded into the shipping container 760, and the shipping container 760 can be loaded onto a transport, or a vessel, which was not designed to carry livestock. The vessel can be a boat, plane, train, trailer, truck, or the like.

Business Method for Facilitating the Shipment of Livestock

In one non-limiting embodiment the current invention relates to a method of doing business. The method of doing business can begin with the step of booking space on a shipping vessel 770 from an intermediate destination 710 to a second destination 740, or a desired destination, where the shipping vessel 770 can also carry non-livestock cargo 790, such as dry bulk goods. The business method can include the step of directing the modification of shipping containers 760 to accommodate shipping livestock. The business method can include the coordination of a quarantine of the livestock prior to the scheduled shipment in designated quarantine areas at a first destination 700 prior to arrival at the intermediate destination. The quarantine can be for thirty days or for an amount of time in compliance with any other shipping standards for the pertaining to the shipment of livestock. The method can continue with the scheduling the transport of the livestock to the shipping vessel 770 and arranging for shipping containers 760 filled with livestock to be transferred onto the shipping vessel 770. For example, ground transports 750 can be scheduled to pick livestock up from the quarantine area 700 and deliver them to the intermediate destination 710, where livestock can be loaded into the specialized shipping containers 760. The method can continue by arranging for the supply of drinking water and electrical power to the loaded shipping containers 760. The business method can include the step of coordinating ground transportation for receiving the livestock at the desired destination.

In one non-limiting aspect the method can include the step of coordinating the same shipping containers 760 for use in ground transport and sea transport on a shipping vessel 770. For example, livestock can be transported to the shipping vessel 770 loaded within shipping containers 760 where the shipping containers 760 are then directly loaded onto the shipping vessel 770. As another example, the method can include the step of scheduling the direct unloading of livestock containers 760 from the shipping vessel 770 to ground transports 750 and coordinating the unloading of livestock from the shipping containers 760 at a location off site from the second destination 740, or the destination port. Multiple ground transports 750 can be scheduled for arriving at the second destination 740, or the destination port, and lined up for the sequential unloading of shipping containers 760. As another non-limiting example, the livestock can be transported to the shipping vessel 770 within the shipping containers 760 for loading onto the shipping vessel 770.

In one non-limiting aspect an attendant can be sent on the shipping vessel 770 along with the shipping containers 760 in order to evaluate the health of the livestock being shipped, as well as, ensuring the water and electricity supplied to each shipping container 760 is not interrupted in transit.

In one non-limiting aspect, the bulk goods 790, or dry bulk goods, on a shipping vessel 760 can reduce the costs of shipping each shipping container 760. The livestock shipping containers can cost less than 1%, 5%, 10%, 20%, 50%, 80%, or 85% the total cost of the freight on the shipping vessel 770.

The shipping containers 760 can include animals of the same species, animals that have been artificially inseminated, or even animals that have been artificially inseminated with sex sorted sperm, particularly artificially inseminated heifers.

In one non-limiting aspect, the shipping containers 760 can be loaded directly from ground transports 750 onto the shipping vessels 770 before shipment, or the shipping containers 760 can be unloaded directly from the shipping vessel 770 to trucks after shipment.

In one non-limiting aspect, the step of directing the modification of the shipping containers can include, providing instructions to cut ventilation openings 40, 42, 44 (Seen in FIG. 1) in a standard shipping container 760 as well as providing instruction to reinforce the shipping container 760 at those ventilation openings 40, 42, 44 (Seen in FIG. 1). Instructions can be provided with respect to the size and number of ventilation openings with consideration given to the desired amount of airflow, or a desired air exchange. For example, an air exchange of 2.5 exchanges per minute may be desired for shipping containers on the deck of a shipping vessel while an air exchange of 12 exchanges per minute may be desired for shipping containers stored in the hull of a shipping vessel. The method can further include the step of providing instructions to seal at least a portion of the bottom of the shipping container 760 to prevent liquids and solids from escaping from the container. For example, a rubber or plastic material can line the bottom surface of the shipping container 760. This step can further comprise providing instructions to install a feed partition 66 (seen in FIG. 2) for separating livestock from livestock feed within the shipping container. Additionally, the method can include the step of providing instructions for arranging an area to store feed. The business method can also include the step of providing instructions to create a personnel opening with access to the feed.

In one aspect, at least six containers can be coordinated on a shipment, while in another aspect at least twelve or at least twenty containers can be coordinated for shipment on a single shipping vessel. In still another aspect at least forty containers can be coordinated in a single shipment, on a single shipping vessel.

A Method for Circulating Water from a Ballast Tank

Referring primarily to FIG. 6, certain aspects relate to a method of circulating drinking water to shipping containers 214, 216 on a shipping vessel 200. The method can begin with the step of emptying the ballast tank 204 of a shipping vessel 200. Once the ballast water is evacuated from the ballast tank, the ballast tank can be cleaned in order to reduce the sediment, microorganisms, salt, and other undesirable materials. The process of cleaning the ballast tank 204 can include pressure washing the interior walls of the ballast tank 204, as well as rinsing the walls of the ballast tank 204, with or without any type of cleaning agent or even coated with paint or another chemical. Once the ballast tank 204 is cleaned, it can be filled with fresh drinking water 208. Next a connection 210, and a conduit 210, can be made from the ballast tank 204 to the deck 206 of the shipping vessel 200, or to the hull 202 of the shipping vessel 200, where a pressure source 224, such as a ballast pump, can draw drinking water. The drinking water can be drawn to an intermediate storage tank 212 for temporary storage, then circulated to shipping containers 214, 214, 216, 218, 220 thereby providing a pressurized source of drinking water to livestock within each shipping container 214, 214, 216, 218, 220 throughout a shipment. The intermediate storage tank 212 can comprise a shipping container modified to house either a bladder or a plastic storage tank 222 for holding drinking water.

In aspect water can continuously be circulating between the shipping containers and the intermediate tank 212 to prevent freezing and to warm the water with the body heat of the livestock in their respective shipping containers.

Methods for Producing Shipping Containers for Livestock

One non-limiting embodiment relates to a method for producing a shipping container to accommodate the shipment of livestock. This method can be understood primarily with reference to FIGS. 1 and 2. Relating to producing a shipping container, the term "produce" or "producing" is intended to encompass at least the acts of: building a shipping container, retrofitting an existing shipping container, modifying an existing shipping container, and manufacturing a shipping container. The method can begin by acquiring a shipping container 10, which can have be a generally rectangular shipping container having a roof 12, a bottom 14, and at least four sides. The four sides can include a front wall 16, a back wall 18 and two side walls 20 and 22. The step of "acquiring" should be understood to encompass both the act of acquiring a previously manufactured shipping container 10 and producing or manufacturing a shipping container 10. Next, at least one ventilation opening 40, 42, and 44 can be cut into one of the sides of the shipping container 10. As previously described, the ventilation openings 40, 42, and 44 can be reinforced by welding a frame constructed from metal plates, tubular metal, or the like into place at interior surfaces of each.

Referring now primarily to FIG. 2 for reference to the internal modifications, a feed partition 66 can be installed in the shipping container 10 adjacent to one of the sidewalls and can be constructed with a fabricated vertical partition 76 and a horizontal partition 74 forming an enclosure. As previously described, the feed partition 66 can define a feed storage area 64 and a livestock storage area 62 within the shipping container 10, where the feed storage area 64 comprises a continuous opening formed from a substantially vertical sidewall space 63 and a substantially horizontal overhead space 61. At least one trough 68 and at least one water bowl 80 can be installed adjacent to the feed partition 66 in the feed storage area 64 formed by the feed partition 66.

In one aspect, the method can include the steps of fabricating a vertical partition 76 and a horizontal partition 74 and securing each within the shipping container 10. Each of the vertical partition 76 and the horizontal partition 74 can be constructed and installed separately into the shipping container 10, or they can be fabricated together and installed at one time. The shipping container 10 can be further modified to receive water with a water connection 52 and electrical power with an electrical connection 32. Additionally, the shipping container 10 can be further modified with the addition of first and second ventilation fans, which can be supplied electrical power through other modification to the shipping container 10. The first and second ventilation fans can be configured for maximizing the air flow through the shipping container 10. They can be configured opposite each other in a push-pull relationship, or they can be set off at angles for producing multiple air flows. The electrical connection for powering the fans can include a transformer for stepping down the power received from an external power source.

In one non-limiting embodiment, the shipping container 10 can be further modified by sealing the bottom of the container from leaking. A sealing layer can be added to the bottom 14 of the shipping container. For example, a layer of plastic or rubber can be lined at on the bottom 14 for containing fluids.

In another aspect a method of modifying a shipping container 10 can begin with the step of acquiring a shipping container 10. The shipping container 10 can then be configured for ventilation and for air flow. This configuration can be accomplished with the introduction of ventilation openings, the installation of ventilation fans, or a combination of both. The interior of the container can then be separated into separate livestock storage and feed storage areas. The step of separating can be accomplished with the introduction of a feed partition, like those previously described, which can be constructed in the manner previously described. This method of modification can continue with the installation of nose operated water bowls 80 and water connections 52 for receiving pressurized water for ensuring a steady supply of food and water to livestock in transit.

As can be easily understood from the foregoing, the basic concepts of the present invention may be embodied in a variety of ways. The invention involves numerous and varied embodiments of shipping container and methods of making and using the shipping container including, but not limited to, the best mode of the invention.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "container" should be understood to encompass disclosure of the act of "containing"—whether explicitly discussed or not—and, conversely, were there effectively disclosure of the act of "containing", such a disclosure should be understood to encompass disclosure of a "container" and even a "means for containing." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

Moreover, for the purposes of the present invention, the term "a" or "an" entity refers to one or more of that entity; for example, "a container" refers to one or more of the containers. As such, the terms "a" or "an", "one or more" and "at least one" can be used interchangeably herein.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

We claim:
1. A shipping container comprising:
   a. a front wall, a back wall, a first sidewall and a second sidewall connecting a container roof to a container floor enclosing an interior storage space, wherein the front wall further comprises a container door;
   b. one or more column support plates mounted to one or more of the first and second sidewalls;
   c. one or more web support plates connected to, and extending from, one or more column support plates without touching the container floor, the one or more web support plates each having a distal end extending away from the first sidewall;
   d. a floating partition mounted with one or more of the first and second sidewalls through the one or more column support plates and one or more web support plates, the floating partition further comprising a series of floating position columns, each floating position column having a first end in communication with a web support plate and a second end, wherein the floating partition separates the interior storage space into a first portion and a second portion without touching the container floor; and
   e. a loft mounted with one or more of the first and second sidewalls and connected to the floating partition through the series of floating partition columns at the second end of each floating partition column; and
   f. a catwalk mounted within the interior storage space of the shipping container.

2. The shipping container of claim 1, wherein the floating partition comprises a vertical partition and a horizontal partition, and wherein the vertical partition at least partially defines a vertical sidewall space and the horizontal partition at least partially defines an overhead space.

3. The shipping container of claim 1, further comprising: one or more ventilation openings in one or more of the walls.

4. The shipping container of claim 3, wherein the ventilation openings are spaced so as not to interfere with the column support plates.

5. The shipping container of claim 1, further comprising: a trough removably mounted on one or more trough support beams, wherein the one or more trough support beams are connected to one or more web support plates.

6. The shipping container of claim 5, wherein the floating partition further comprises a bottom floating partition cross member and wherein the trough further comprises a trough front end and a trough back end, and wherein the trough front is mounted with the bottom floating partition cross member and wherein the trough back is mounted with the trough support beam.

7. The shipping container of claim 6, wherein the feed trough further comprises a polymeric material.

8. The shipping container as claimed in claim 1, wherein the catwalk is mounted with one or more catwalk support beams connected to one or more web support plates.

9. The shipping container of claim 1, wherein the floating partition further comprises one or more floating partition stanchions generally parallel to the floating partition columns and one or more floating partition cross beams generally perpendicular to the floating partition columns.

10. The shipping container of claim 1, wherein the floating partition comprises one or more floating partition columns in communication with the one or more web support plates.

11. The shipping container of claim 10, wherein the floating partition columns are mounted at an angle of tilt relative to a horizontal axis as defined by the walls of the container.

12. The shipping container of claim 11, wherein the angle of tilt of the floating partition columns is between about 2 degrees and about 20 degrees off the horizontal axis, as defined by the walls.

13. The shipping container of claim 12, wherein the angle of tilt of the floating partition columns is between about 5 degrees and about 15 degrees off the horizontal axis, as defined by the walls.

14. The shipping container of claim 10, wherein the floating partition further comprises a plurality of floating partition cross members mounted with the floating partition, the floating partition cross members further comprising:
   a) a top floating partition cross member mounted across the tops of the floating partition columns;
   b) a bottom floating partition cross member mounted between each floating partition column; and
   c) one or more mid floating partition cross members mounted between the top floating partition cross member and the bottom floating partition cross member so as to overlie one or more floating partition columns.

15. The shipping container of claim 14, further comprising one or more floating partition stanchions, wherein each floating partition stanchion has a first end and a second end, and wherein the first ends of the floating partition stanchions are mounted to the top floating partition cross member and the second ends of the floating partition stanchions are mounted to the bottom floating partition cross members.

16. The shipping container of claim 1, wherein the loft further comprises:
   a) a loft support beam attached at one or more column support plates on the second sidewall;
   b) one or more loft joists having first ends and second ends, the first ends being mounted on the top floating partition cross beam and the second end being mounted on the loft support beam; and
   c) a loft floor mounted on the one or more joists, wherein the covering further comprises openings towards the second ends of the joists, the loft floor including cut out sections.

17. The shipping container of claim 16, further comprising a rail mounted on a top surface of the loft floor.

18. The shipping container of claim 16, wherein the loft floor further comprises cut away sections.

19. The shipping container of claim 1, wherein the first portion of the interior storage space comprises a livestock storage area adapted to store and transport livestock and wherein the second portion of the interior storage space comprises a feed storage area adapted to store feed.

20. The shipping container of claim 19, wherein the floating feed partition provides a barrier through which livestock access feed stored in a trough.

21. The shipping container of claim 1, further comprising at least one movable gate and a plurality of sets of gate hinges mounted with the second sidewall wherein the movable gate is moveable between each set of gate hinges.

22. The shipping container of claim 1, further comprising a water impermeable coating on the floor of the container.

23. The shipping container of claim 22, wherein the water impermeable coating comprises an epoxy coating.

24. The shipping container of claim 1, further comprising an end wing mounted with the floating partition.

25. The shipping container of claim 24, wherein the end wing is hinged to the floating partition to provide an end wing gate.

26. The shipping container of claim 25, wherein the hinged end wing is secured near the front wall in a first position and wherein the end wing can be put into a second position, when the container door is open, extending beyond the front wall.

27. The shipping container of claim 26, further comprising a wing gate barrier sheet connected with the wing gate frame.

28. The shipping container of claim 25, wherein the end wing further comprises an end wing frame.

29. The shipping container of claim 28, further comprising one or more end wing stanchions.

30. The shipping container of claim 29, further comprises one or more end wing cross members mounted across at least a portion of the end wing frame.

31. The shipping container of claim 30, wherein the cross members are spaced so as to provide ladder steps from the container floor to the loft.

32. The shipping container of claim 1, further comprising:
   a) a first ventilation fan mounted at the front wall;
   b) a second ventilation fan mounted at the back wall;
   c) a first circulation spacing formed between the first ventilation fan and the loft at the front wall; and
   d) a second circulation spacing formed between the second ventilation fan and the loft at the back wall.

33. The shipping container of claim 32, further comprising a back gate formed in the floating partition adjacent to the second circulation spacing formed between the second ventilation fan and the loft.

34. The shipping container of claim 1, further comprising: a personnel opening in the container door, wherein the personal door is positioned on the front wall of the shipping container to provide access to the catwalk and the end wing cross members while the container door remains shut.

35. The shipping container of claim 1, further comprising: one or more shutters mounted with one or more ventilation openings, the ventilation openings supported by a reinforcement frame.

36. The shipping container of claim 35, wherein the shutters further comprise:
   a) a shutter cover having an opened position and a closed position; and
   b) a shutter link fixed to the shutter cover.

37. The shipping container of claim 36, wherein the shutters further comprise:
   ventilation link fixed to the ventilation frame, wherein the shutter link is slidable between two positions relative to the ventilation link, and wherein in a first position the shutter cover extends past the reinforcement frame retaining the shutter cover in either the open or closed positions, and wherein in the second position, the shutter cover moves freely between the first opened position and the second closed position.

38. A livestock shipping container comprising:
   a) a front wall, a back wall, a first sidewall and a second sidewall connecting a container roof to a container floor enclosing an interior storage space, wherein the front wall further comprises a container door;
   b) one or more column support plates welded to the first sidewall and the second sidewall;
   c) one or more web support plates mounted at the column support plates on the first sidewall without touching the container floor, the one or more web support plates having distal ends extending away from the column support plates mounted on the first sidewall;
   d) a floating partition mounted with the distal ends of the web support plates, the floating partition comprising:
      i) one or more floating partition columns mounted at the distal ends of the web support plates, wherein the floating partition columns are mounted at an angle of tilt between about 5 degrees and about 15 degrees relative to the sidewalls;
      ii) a plurality of floating partition cross members mounted with the floating partition having:
         1) a top floating partition cross member mounted across the tops of the floating partition columns;
         2) a bottom floating partition cross member mounted between each floating partition column; and
         3) one or more mid floating partition cross members mounted between the top floating partition cross member and the bottom floating partition cross member so as to overlie one or more floating partition columns;
      iii) one or more floating partition stanchions, wherein each floating partition stanchion has a first end and a second end, and wherein the first ends of the floating partition stanchions are mounted to the top floating partition cross member and the second ends of the floating partition stanchions are mounted to the bottom floating partition cross members;
   e) a loft in communication with the floating partition and supported by one or more of the plurality of sidewalls, the loft further comprising:
      i) a loft support beam attached at one or more column support plates on the second sidewall;
      ii) one or more loft joists having first ends and second ends, the first ends being mounted on the top floating partition cross beam and the second end being mounted on the loft support beam; and
      iii) a loft floor mounted on the one or more joists, wherein the covering further comprises openings towards the second ends of the joists, the loft floor including cut out sections;
   f) one or more gussets at one or more junctions of the floating partition columns and the top floating member cross beam;
   g) one or more trough support beams connected between web support plates;
   h) one or more feed troughs having a front and a back, wherein the back of the one or more troughs is mounted at the trough support beams and wherein the front of the one or more troughs is mounted at the bottom floating partition cross member;
   i) a first catwalk support beam mounted across a top surface of more than one web support plate;
   j) a second catwalk beam mounted across a top surface of more than one web support plate;
   k) a catwalk mounted with the first catwalk support beam within the interior of the shipping container and the second catwalk support beam;
   l) an end wing connected to the floating partition, the end wing further comprising:
      i) an end wing frame connected to the floating partition, the end wing frame being tilted relative to the horizontal axis, as defined by the walls;
      ii) end wing stanchions;
      iii) end wing cross members mounted across one or more end wing stanchions, the end wing cross members being spaced so as to provide ladder steps to the loft; and
      iv) an end wing barrier sheet connected to the frame for covering a portion of the end wing cross members and end wing stanchions;
   m) a personnel opening in the container door, wherein the personal door is positioned on the front wall of the shipping container to provide access to the catwalk and the end wing cross members while the container door remains shut;
n) a first ventilation fan mounted in the front wall;
o) a second ventilation fan mounted in the back wall;
p) a first circulation spacing formed between the first ventilation fan and the loft floor at the front wall;
q) a second circulation spacing formed between the second ventilation fan and the loft floor at the back wall;
r) a back gate formed in the floating partition adjacent to the second gap formed between the second ventilation fan and the loft floor;
s) a rail mounted on the top surface of the loft flooring; and
t) one or more shutters mounted with one or more ventilation openings, the ventilation openings supported by a reinforcement frame, wherein the shutters further comprise;
  i) a shutter cover having an opened position and a closed position;
  ii) a shutter link fixed to the shutter cover; and
  iii) a ventilation link fixed to the ventilation frame, wherein the shutter link is slidable between two positions relative to the ventilation link, and wherein in a first position the shutter cover extends past the reinforcement frame retaining the shutter cover in either the open or closed positions, and wherein in the second position, the shutter cover moves freely between the first opened position and the second closed position.

39. A livestock shipping container comprising:
a) a front wall, back wall, first sidewall and second sidewall connecting a container roof to a container floor enclosing an interior storage space, wherein the front wall further comprises a container door;
b) one or more column support plates mounted with the first sidewall;
c) one or more web support plates mounted at the column support plates at the first sidewall without touching the container floor, the one or more web support plates having distal ends extending away from the column support plates mounted at the first sidewall;
d) a floating partition mounted with the web support plates, the floating partition further comprising a series of floating position columns, each floating position column having a first end in communication with a web support plate and a second end, wherein the floating partition separates the interior storage space into a first portion and a second portion and does not extend to the container floor;
e) one or more feed troughs mounted with the floating partition;
f) a catwalk mounted with the floating partition within the interior of the shipping container;
g) a loft supported by one or more of the plurality of sidewalls and connected to the floating partition through the series of floating partition columns at the second end of each floating partition column; and
h) an end wing connected to the floating partition.

* * * * *